(12) United States Patent
Carpenter et al.

(10) Patent No.: US 8,925,803 B2
(45) Date of Patent: *Jan. 6, 2015

(54) AUTOMATED BANKING MACHINE THAT OPERATES RESPONSIVE TO DATA BEARING RECORDS

(71) Applicant: Diebold, Incorporated, North Canton, OH (US)

(72) Inventors: Keith Carpenter, Akron, OH (US); Martin J. Brown, Canton, OH (US); Jonathan Soudry, North Canton, OH (US); James Meek, North Canton, OH (US); Todd Galloway, Canton, OH (US); Robert W. Barnett, Louisville, OH (US); Mike R. Ryan, Canton, OH (US); David A. Peters, Tallmadge, OH (US); Rafael Feijo, Raleigh, NC (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,882

(22) Filed: Mar. 6, 2014

(65) Prior Publication Data
US 2014/0254911 A1    Sep. 11, 2014

Related U.S. Application Data

(63) Continuation of application No. 13/317,612, filed on Oct. 24, 2011, now Pat. No. 8,695,873.

(60) Provisional application No. 61/455,740, filed on Oct. 26, 2010.

(51) Int. Cl.
*G06F 19/00* (2011.01)

(52) U.S. Cl.
USPC .................................. 235/379; 235/375

(58) Field of Classification Search
USPC .................................. 235/379, 375
See application file for complete search history.

(56) References Cited

U.S. PATENT DOCUMENTS 8,695,873 B1 * 4/2014 Carpenter et al. ............ 235/379

* cited by examiner

*Primary Examiner* — Karl D French
(74) *Attorney, Agent, or Firm* — Black, McCuskey, Souers & Arbaugh, LPA

(57) ABSTRACT

An automated banking machine operates to cause financial transfers responsive to data read from data bearing records. A card actuated automated banking machine may accept checks and dispense cash to users. The banking machine is operated to acquire image and magnetic data from deposited checks to determine the genuineness of checks and the authority of a user to receive cash for such checks. Cash may be credited to a user account corresponding to card data or may be dispensed to the user from the banking machine responsive to one or more deposited checks.

23 Claims, 66 Drawing Sheets

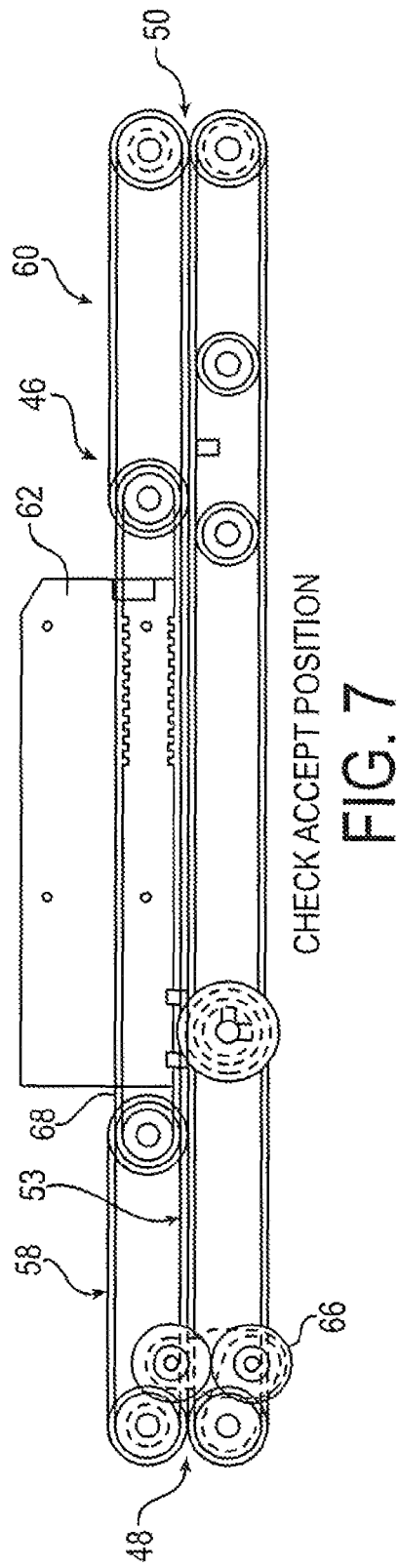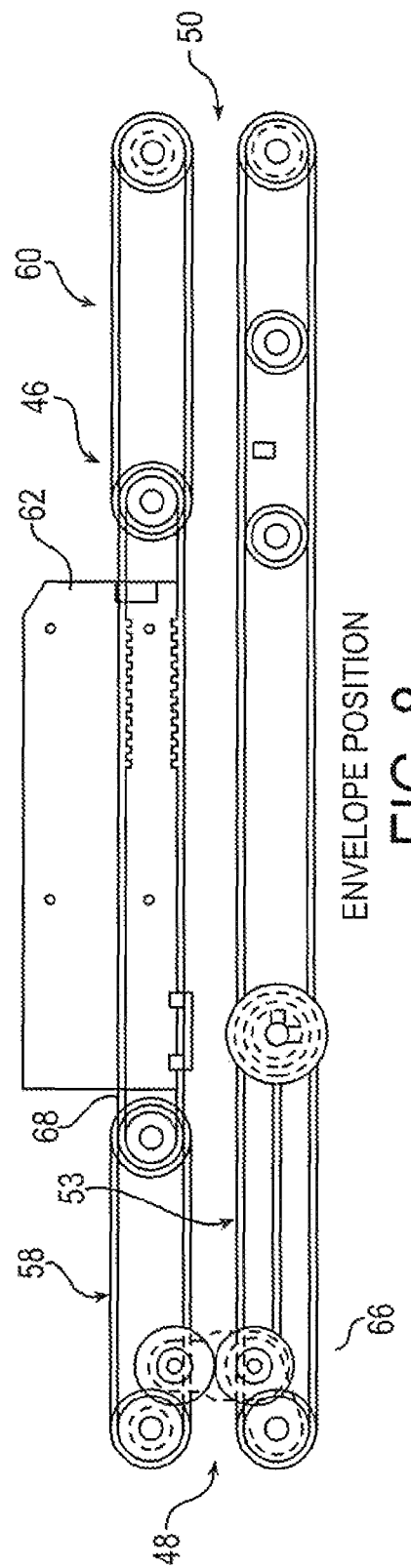

LOW DRIVE POSITION

HIGH DRIVE POSITION

Printing Position

Envelope Deposit

1. RECEIVE ID DATA (PAN/PIN:BIOMETRIC)
2. RECEIVE INPUT TXN TYPE (ENVELOPE DEPOSIT)
3. RECEIVE INPUT AMOUNT
4. SEND AUTHORIZATION REQUEST TO HOST
5. RECEIVE AUTHORIZATION RESPONSE FROM HOST (AUTHORIZED)
6. OPEN DEPOSITORY GATE
7. MOVE ENVELOPE DEPOSITORY TO RECEIVE POSITION
8. RUN TRANSPORT
9. SENSE ENVELOPE
10. MOVE TO PRINT POSITION
11. PRINT IDENTIFYING DATA ON ENVELOPE
12. PRINT TXN RECEIPT
13. PROMPT FURTHER TXN (DECLINE)
14. TXN CLOSE (RETURN CARD)
15. SEND COMPLETION TO HOST

FIG. 29

Check Deposit

1. RECEIVE ID DATA
   (PAN/PIN: BIOMETRIC)

2. RECEIVE TXN TYPE
   (CHECK DEPOSIT: CASH CHECK: OTHER DOCUMENT)

3. RECEIVE INPUT AMOUNT 4. (OPTIONAL) OUTPUT CHECK CASHING FEE
   ACKNOWLEDGMENT PROMPT - CONTINUE
   OR CLOSE BASED ON RESPONSE

5. OPEN GATE

6. MOVE DEPOSITORY TO DOCUMENT RECEIVE
   POSITION

7. RUN TRANSPORT

8. SENSE DOCUMENT

9. MEASURE DOCUMENT LENGTH

10. RUN TO READY TO SCAN POSITION

11. RUN TO SCAN
    (ACQUIRE IMAGE DATA)
    (ACQUIRE MAGNETIC PROFILE DATA)

12. APPLY RULES CONCERNING DOCUMENT TYPE

13. DESKEW IMAGE
    - FIND 3 CORNERS
    - CALCULATE ANGLE - SHIFT IMAGE
    - MOVE TO REFERENCE - SHIFT IMAGE

FIG. 30

14 APPLY TEMPLATE FOR DOCUMENT TYPE

15 READ DATA IN MICR LINE
(MICR LINE : OPTICALLY READ)

16 PASS CROPPED DATA FROM MICR LINE
WINDOW TO RECOGNITION SOFTWARE
(MICR LINE   E - 13B)

17 RETURN ASC II VALUES

18 CHECK MICR DATA FOR ROUTING AND
TRANSFER VALUES

19 DETERMINE IF MICR VALUES ARE
ABOVE THRESHOLD
(IF YES - GO TO 26)
(IF NO - GO TO 20)

20 FLIP IMAGE 180 DEGREES

21 READ DATA IN MICR LINE

22 PASS CROPPED DATA FROM MICR
LINE TO RECOGNITION SOFTWARE

23 RETURN ASC II VALUES

24 CHECK MICR DATA FOR ROUTING
AND TRANSFER VALUES

25 DETERMINE IF MICR VALUES
ARE ABOVE THRESHOLD
(IF NO - CHECK CANNOT BE READ
RETURN CHECK AND CLOSE TXN)
(IF YES - GO TO 26)

FIG. 31

26  READ DATA IN COURTESY AMOUNT WINDOW
    (US CHARACTERS)

27  USE LANDMARK RULES TO FIND COURTESY
    AMOUNT (LOOK FOR BOX, "$", "XX/100", "**")

28  BINARIZE COURTESY AMOUNT DATA (BLACK/WHITE)

29  RETURN ASC II VALUE FOR COURTESY
    AMOUNT

30  CHECK FOR SENSING MAGNETIC INK
    IN CORRECT LOCATIONS BASED ON
    DOCUMENT TYPE AND IMAGE DATA
    (IF NOT PROPER MAGNETIC PROFILE
    RETURN CHECK AND CLOSE TXN)
    (IF PROPER MAGNETIC PROFILE - GO TO 31)

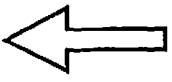
31  SEND AUTHORIZATION MESSAGE TO HOST
    (INCLUDING CUSTOMER DATA, TXN TYPE,
    AMOUNT INPUT, MICR LINE AND
    COURTESY AMOUNT READ)

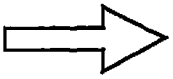
32  RECEIVE AUTHORIZATION
    (AUTHORIZED)

33  DISPLAY IMAGE ON ATM DISPLAY

34  STORE IMAGE FILE AT ATM

35  PRINT CUSTOMER RECEIPT
    (MAY INCLUDE IMAGE)

36  RUN TRANSPORT

FIG. 32

37 SENSE CHECK

38 PRINT CANCELLATION DATA ON CHECK

39 MOVE CHECK TO DOCUMENT STORAGE

40 TAMP DOCUMENT STORAGE

41 IF DEPOSIT ONLY TXN GO TO 45
IF CHECK CASHING TXN GO TO 42

42 DISPENSE CASH TO CUSTOMER
   PER AUTHORIZATION 43 (OPTIONAL) PRINT CUSTOMER VOUCHER
   FOR UNDISPENSED AMOUNT

44 PRINT RECEIPT FOR CASH DISPENSE

45 PROMPT FURTHER TRANSACTION
   (DECLINES)

46 TXN CLOSE (RETURN CARD)

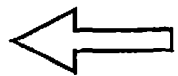 47 SEND COMPLETION TO HOST

FIG. 33

CUSTOMER 000009400 TERMINAL LIST

| TERMINAL ID | TERMINAL TYPE | TERMINAL LOCATION | TERMINAL STATUS | SETTLE STATUS | DIAL-UP TERMINAL |
|---|---|---|---|---|---|
| BG05 STATUS \| OPEN \| CLOSED | 912IX ATM | 3800 TABS DRIVE UNIONTOWN, OH | OPEN | NO | NO |
| D005 STATUS \| OPEN \| CLOSED | 912IX ATM | 5995 MAYFAIR ROAD NORTH CANTON, OH | LOADING | NO | NO |
| FT01 STATUS \| OPEN \| CLOSED | 912IX ATM | 1075 MAIN STREET - #3 WALTHAM, MA | OPEN | YES | NO |
| F000 STATUS \| OPEN \| CLOSED | 912IX ATM | 1075 MAIN STREET - #2 WALTHAM, MA | OPEN | NO | NO |
| F003 STATUS \| OPEN \| CLOSED | 912IX ATM | 1075 MAIN STREET - #1 WALTHAM, MA | OPEN | NO | NO |

START AT THE TOP | NEXT TERMINALS

| OPERATIONAL STATUS | | DEVICE STATUS | | CONNECTION STATUS | |
|---|---|---|---|---|---|
| TERMINAL STATE | OPEN | DEPOSITORY | IN SERVICE | SESSION STATUS | ACQUIRED |
| SETTLED STATE | YES | CARD READER | IN SERVICE | SERVICE STATUS | IN SERVICE |
| | | AUX PRINTER | IN SERVICE | | |
| | | RECEIPT PRINTER | IN SERVICE | | |
| | | SECURAMATIC | OUT SERVICE | | |

OPEN TERMINAL ▽
SUBMIT

| DISPENSER 1(A) $1.00 | DISPENSER 2(B) $5.00 | DISPENSER 3(D) $20.00 | DISPENSER 4(E) $50.00 |
|---|---|---|---|
| IN SERVICE | IN SERVICE | IN SERVICE | IN SERVICE |
| INITIAL UNITS 990 | INITIAL UNITS 2,998 | INITIAL UNITS 20,000 | INITIAL UNITS 25,000 |
| DISPENSED UNITS 17 | DISPENSED UNITS 14 | DISPENSED UNITS 0 | DISPENSED UNITS 56 |
| CURRENT UNITS 973 | CURRENT UNITS 2,984 | CURRENT UNITS 20,000 | CURRENT UNITS 24,944 |

| COIN 1(*) $0.00 | COIN 2(*) $0.00 | COIN 3(*) $0.00 | COIN 4(*) $0.00 |
|---|---|---|---|
| OUT SERVICE | OUT SERVICE | OUT SERVICE | OUT SERVICE |
| INITIAL UNITS 0 | INITIAL UNITS 0 | INITIAL UNITS 0 | INITIAL UNITS 0 |
| DISPENSED UNITS 0 | DISPENSED UNITS 0 | DISPENSED UNITS 0 | DISPENSED UNITS 0 |
| CURRENT UNITS 0 | CURRENT UNITS 0 | CURRENT UNITS 0 | CURRENT UNITS 0 |

DEPOSITS AND PAYMENTS

7 DEPOSIT TRANSACTION(S) FOR $2,884.00
0 PAYMENTS TRANSACTION(S) FOR $0.00

NEXT TERMINAL STATUS

CHECK CUSTOMER TRANSACTIONS
AT TERMINAL

RETURN TO TERMINAL PAGE

RETURN TO MAIN PAGE

FIG. 41

CUSTOMER TRANSACTION SEARCH RESULTS                    232

| TRAN SEQ# | TRAN DATE | TRAN SEQ# | BUSINESS DATE | COMPLETION CODE | TRAN DESCRIPTION | DENIAL CODE | DENIAL DESCRIPTION |
|---|---|---|---|---|---|---|---|
| 0001 | JULY 30, 2002 | 9:46 AM | JULY 30, 2002 | 1 | CHECK CASH | 53 | INV MIX |
| 0002 | JULY 30, 2002 | 11:30 AM | JULY 30, 2002 | 0 | ADD NOTE 1 | 00 | |
| 0003 | JULY 30, 2002 | 11:31 AM | JULY 30, 2002 | 0 | ADD NOTE 2 | 00 | |
| 0004 | JULY 30, 2002 | 11:31 AM | JULY 30, 2002 | 0 | ADD NOTE 3 | 00 | |
| 0005 | JULY 30, 2002 | 11:31 AM | JULY 30, 2002 | 0 | ADD NOTE 4 | 00 | |
| 0001 | JULY 30, 2002 | 9:54 AM | JULY 30, 2002 | 0 | ADD NOTE 1 | 00 | |
| 0002 | JULY 30, 2002 | 9:55 AM | JULY 30, 2002 | 0 | ADD NOTE 2 | 00 | |

| TERM ID | PAN | PRIMARY ACCOUNT | SECONDARY ACCOUNT | AMT REQUEST | AMT COMPLETE |
|---|---|---|---|---|---|
| F000 | 9920020001199 | 0110001389408773702 | 0110001389408773702 | $112.53 | $0.00 |
| F000 | 9999999999999999 | | | $2,000.00 | $2,000.00 |
| F000 | 9999999999999999 | | | $2,000.00 | $2,000.00 |
| F000 | 9999999999999999 | | | $20,000.00 | $20,000.00 |
| F000 | 9999999999999999 | | | $40,000.00 | $40,000.00 |
| F003 | 9999999999999999 | | | $2,000.00 | $2,000.00 |
| F003 | 9999999999999999 | | | $5,000.00 | $5,000.00 |

| FEE REQUEST | FEE COMPLETE |
|---|---|
| $0.00 | $0.00 |
| $0.00 | $0.00 |
| $0.00 | $0.00 |
| $0.00 | $0.00 |
| $0.00 | $0.00 |
| $0.00 | $0.00 |
| $0.00 | $0.00 |

RETURN TO MAIN PAGE

Download Transaction Files

Available Transaction Files

Available Daily Reports Files

Available Monthly Report Files

Return to Main Page

FIG. 44

Reports — 236

ATM Daily Transaction Summary

ATM Monthly Transaction Summary

Checks By Maker - Daily

Checks By Maker - Monthly

Check Cashing Summary - Daily

Check Cashing Summary - Monthly

Check Cashing By ATM - Daily

Check Cashing By ATM - Monthly

ATM Balance Report

FIG. 45

Upload Authorization File

To *verify* the file was just uploaded please press the button below

Add - Bank Account.TXT

| Verify Authorization File |

The verification process could take a couple of minutes or more depending the size of the upload file.

Authorization File Conversion

0    Checking Accounts

0    Saving Accounts

0    Credit Accounts

9    Other Accounts

0    Cards

9 Total Records to be Applied

File has been verified

To *apply* the file to HOST please press the button below.

| Apply Authorization File to HOST |

Maker Account Records

| Field | Content |
|---|---|
| Bin No. | Institution ID No. |
| Command Type | Change File<br>Delete File<br>Add New File |
| Account Type | Checking<br>Savings<br>Other |
| Account No. | Numerical Value |
| Account Status | Open<br>Closed |
| Account Description | Text Description |
| Days Locked Out | Minimum Time<br>Between Transactions |
| Maximum Check Amount | Maximum Amount<br>of Check Cashed |

FIG. 48

Authorization File Conversion

File has been Applied

Messages returned from the Apply process

Apply authorization file for customer 992002 - Started May 30, 2002 1:41:43 PM

Total Records Submitted = 8
Total Records Applied = 8
Total Errors = 0

Apply authorization file for customer 992002 - Ended May 30, 2002 1:41:44 PM

Upload Another File

Return to Main Page

Edit Customer Records

Check Cashing
Card Number

[            ]

[ Get Customer Information ]  ↖ 244

[ Add Customer ] [ Delete Customer ]

FIG. 50

Customer Authorization Information

USER CARD Number 9920020000199

Account Code     [Normal ▼]     Account Status [Active ▼]

Customer Information

First Name     [JOHN]     Last Name [DOE]

Social Security #     [ ] - [ ] - [ ]

Account Limits

Max Check Amount     [$0.00]

Last Account Activity

Cash Check     $277.91     on Friday, July 26, 2002

This Customer can cash 1 check every 1 Day(s)
Next available date: Saturday July 27, 2002

Maker / Employer's Account           Account Status

[0119006520111794124 ▼]     Open

Account Description     Lock Out Days   Max Check Amunt

[Test Account 4]     [1]     [$2,000.00]

[ Save Customer Information ]
[ Delete Customer ] [ Cancel Edit ]

Check Customer's Transaction History

Return to Customer Authorization Main Page

Return to Main Page

Transaction History

Card Number 9920020000199

Friday, July 26, 2002 4:09:02 PM EDT

| | | |
|---|---|---|
| Terminal | BG05 Transaction Sequence # | 0007 |
| Orginal Amount | $277.91 Actual Amount | $277.91 |
| Account Number 0119006520111794124 MICR Account | | 0119006520111794124 |
| Transaction Description | CHECK CASH | |
| Denial Description | WITHDRAWAL LIMIT REACHED | |

Friday, July 26, 2002 4:08:05PM EDT

| | | |
|---|---|---|
| Terminal | BG05   Transaction Sequence # | 0006 |
| Original Amount | $277.91   Actual Amount | $277.91 |
| Account Number 0119006520111794124 MICR Account | | 0119006520111794124 |

Other Transactions
Return to Main Page

| | DENIAL CODE | RECEIPT VERBIAGE | EXPLANATION |
|---|---|---|---|
| LOCK OUT DAYS PROHIBIT ANOTHER CHECK TO BE CASHED | E6 | WAIT PERIOD NOT OVER | EACH EMPLOYER (MAKER) IS ASSIGNED A NUMBER OF DAYS WHICH MUST EXPIRE BETWEEN ANY TWO CHECKS CASHED BY ANY OF ITS EMPLOYEES. THE DAY CHANGES AT MIDNIGHT. SO, AS AN EXAMPLE, IF A CARDHOLDER CASHES A CHECK AT 11:00AM ON MONDAY, AND HIS EMPLOYER'S WAIT PERIOD IS TWO DAYS, THE SYSTEM WILL NOT ALLOW THE CARDHOLDER TO CASH ANOTHER CHECK UNTIL WEDNESDAY, BEGINNING AT 12:01AM. |
| SECOND TRANSACTION WITHOUT ENROLLMENT | E7 | ENROLLMENT NOT COMPLETE | WHEN A CARD IS ISSUED, INFORMATION IS GATHERED TO ENROLL THE CARDHOLDER. THEN, DURING ENROLLMENT, THE CARD IS ACTIVATED. IF ENROLLMENT IS NOT PERFORMED OR NOT YET COMPLETE, THE CARDHOLDER MAY STILL CASH ONE, AND ONLY ONE, CHECK. IF A SECOND CHECK IS ATTEMPTED, THE TRANSACTION WILL BE DENIED UNTIL THE ACCOUNT IS MANUALLY ACTIVATED. |
| CARD NOT ON FILE | 21 | INELIGIBLE CARD | ALL USERS CARDS HAVE BEEN DEFINED TO THE SYSTEM, AND BANK WILL AUTHORIZE BATCHES OF CARDS TO BE LOADED INTO THE DTS DATABASE. IF BANK ISSUES A CARD THAT HAS NOT BEEN LOADED INTO THE DATABASE, OR IF AN ISSUED CARD IS DELETED FROM THE DATABASE, THIS DENIAL WOULD OCCUR. |
| MAKER ACCOUNT CLOSED | E8 | CAN NOT CASH THIS CHECK | ON OCCASION, BANK SYSTEM ADMINISTRATORS MAY SUSPEND CHECK CASHING FOR A PARTICULAR EMPLOYER (CHECK MAKER). IF A CARDHOLDER LINKED TO THIS EMPLOYER ATTEMPTS TO CASH A CHECK, THEY WILL RECEIVED THEIR CHECK BACK WITH THIS MESSAGE ON THE RECEIPT. |
| CHECK AMOUNT EXCEEDS AUTHORIZED AMOUNT | EA | CHECK AMOUNT TOO LARGE | FOR EACH EMPLOYER, A MAXIMUM DOLLAR AMOUNT IS ASSIGNED THAT LIMITS THE VALUE OF INDIVIDUAL CHECKS THAT CAN BE CASHED. IN SOME CASES, INDIVIDUAL CARDHOLDERS MAY ALSO HAVE A MAXIMUM AMOUNT ASSIGNED, WITH A HIGHER OR LOWER AMOUNT. CHECKS WITH AMOUNTS IN EXCESS OF THESE AMOUNTS WILL BE DENIED WITH THIS DESCRIPTION. |

| | | | |
|---|---|---|---|
| MAKER ACCOUNT AND IN FILE | EB | EMPLOYER ACCT NOT FOUND | THIS CONDITION WOULD OCCUR IF A USER TRIES TO CASH A CHECK FROM AN EMPLOYER THAT IS NOT IN THE DATABASE. THIS WOULD ONLY HAPPEN IF, DURING FIRST USE AND BEFORE ENROLLMENT, THE USER TRIES TO CASH A CHECK WRITTEN BY A NON-AUTHORIZED EMPLOYER, OR IF BANK DELETES THE EMPLOYER ACCOUNT. |
| WRONG MAKER ON CHECK | EC | INVALID EMPLOYER CHECK | EACH CARDHOLDER IS ASSIGNED TO ONLY ONE, EMPLOYER (MAKER). IF THE CARDHOLDER ATTEMPTS TO CASH A CHECK FROM ANY OTHER SOURCE, SHE WILL RECEIVE HER CHECK BACK WITH THIS DENIAL MESSAGE. |
| FAULT DURING TRANSACTION, OR CASH AVAILABLE DOES NOT PERMIT CASHING | 5D,09 1A, 91 92,93 | TEMPORARILY UNABLE | OCCASIONALLY, EQUIPMENT FAULTS OCCUR DURING A TRANSACTION. IF THIS HAPPENS THE TRANSACTION WILL NOT BE COMPLETED. |
| NON-VALID MICR INFORMATION | 52 | COULD NOT READ CHECK INFO | MICR INFORMATION SENT TO THE NETWORK WAS NOT VALID. THIS WOULD NORMALLY RESULT FROM A MIS-READ OF THE CHECK. |
| HOT CARD | 0B | UNAUTHORIZED USE | BANK MAY DETERMINE THAT CERTAIN CARDS SHOULD NO LONGER BE ALLOWED TO BE USED, AND THAT IF ATTEMPTED TO BE USED, SHOULD BE RETAINED. TO DO THIS, SUCH AS IN THE CASE OF A LOST OR STOLEN CARD, THE CARD RECORD WILL BE MARKED AS "HOT" AND IF SOMEONE USES THE CARD, ENTERS THE PROPER PIN AND ATTEMPTS TO CASH A CHECK, THE CHECK WILL BE RETURNED, AND THE CARD WILL BE RETAINED. |
| CANNOT MIX THE REQUESTED AMOUNT OR CANNOT ROUND | 24, 95 | CANNOT DISP REQUESTED AMT | WHEN SOME CURRENCY CANISTERS OR COIN ARE OUT OF MONEY, THE CCM CANNOT DISPENSE THE CHECK AMOUNT WITH THE REMAINING CANISTERS. THE CHECK IS RETURNED, WITH THIS MESSAGE. |
| THREE BAD PINS | 0C | INVALID PIN ENTERED | CARDHOLDERS ARE ALLOWED THREE INCORRECT PIN ENTRIES. ON THE THIRD WRONG ENTRY, THE CCM DISPLAYS THIS MESSAGE AND RETAINS THE CARD. |
| NO MAKER ASSIGNED TO THE CARD | E5 | NO ACCOUNT SPECIFIED | NO MAKER IS ASSIGNED TO THE CARD HOLDER. THIS WOULD ONLY OCCUR IF ENROLLMENT IS INCOMPLETE. |

FIG. 59

| MICR AMOUNT ENCODED ON CHECK | 54 | CK AMT NOT EQ ENTER AMT | NORMALLY, CHECKS CASHED IN THE SYSTEM WILL NOT HAVE THE AMOUNT OF THE CHECK ENCODED ON THE MICR LINE OF THE CHECK. IF THE AMOUNT IS ENCODED, AND THE OCR AMOUNT IS NOT CORRECT, OR IF THE CARDHOLDER CHANGES THE AMOUNT WITHIN THE QUALIFYING "WINDOW" AND IT IS DIFFERENT FROM THE MICR AMOUNT THIS DENIAL WILL APPEAR. |
|---|---|---|---|
| CARD DE-ACTIVATED BY ADMINISTRATOR (OR NEVER ACTIVATED) | E9 | CARD NOT ACTIVE | FOR VARIOUS REASONS, BANK MAY SUSPEND, OR DEACTIVATE INDIVIDUAL CARDHOLDERS. ATTEMPTS TO CASH CHECKS BY SUSPENDED CARDHOLDERS WILL RESULT IN THE CHECK BEING RETURNED WITH THIS DENIAL MESSAGE. |

FIG. 60

| FIELD NAME | FIELD TYPE (MAX LENGTH) | DESCRIPTION |
|---|---|---|
| HEADER LENGTH | NUMERIC (3) | LENGTH OF THE SUPPLIED HEADER INFORMATION. THE HEADER INFORMATION ARE FIELDS:<br><br>• HEADER LENGTH<br>• PSEUDO NUMBER<br>• CUSTOMER NUMBER<br>• BUSINESS DATE<br>• TRANSACTION SEQ#<br>• TERMINAL ID<br>• FRONT IMAGE LENGTH<br>• BACK IMAGE LENGTH |
| PESUDO NUMBER | VARCHAR (6) | DTS PSEUDO NUMBER |
| CUSTOMER NUMBER | VARCHAR (10) | DTS CUSTOMER NUMBER |
| HOST TERMINAL ID | VARCHAR (4) | DTS HOST TERMINAL ID |
| HOST TRANSACTION SEQUENCE # | VARCHAR (4) | SEQUENCE NUMBER ASSIGNED BY THE DTS HOST TO UNIQUELY IDENTIFY THE TRANSACTION |
| HOST BUSINESS DATE | VARCHAR (6) | HOST BUSINESS DATE ASSOCIATED WITH THE ATM |
| CHECK MICR DATA | VARCHAR (30) | MICR DATA SCANNED FROM THE INSERTED CHECK |
| CHECK FRONT LENGTH | NUMERIC (7) | LENGTH OF THE SCANNED CHECK IMAGE (FRONT SIDE) |
| CHECK BACK LENGTH | NUMERIC (7) | LENGTH OF THE SCANNED CHECK IMAGE (BACK SIDE) |
| IMAGE DATA | BLOB (5 MEG) | ACTUAL CHECK IMAGES |

CUSTOMER TRANSACTION SEARCH RESULTS — 404

| CHECK IMAGE | TRAN SEQ# | TRAN DATE | TRAN TIME | BUSINESS DATE | COMPLETION CODE | TRAN DESCRIPTION | DENIAL CODE | DENIAL DESCRIPTION |
|---|---|---|---|---|---|---|---|---|
| | 0003 | DECEMBER 11, 2003 | 1:56 PM | DECEMBER 9, 2003 | 1 | W/D DDA | 92 | DISPFALT |
| | 0005 | DECEMBER 11, 2003 | 4:01 PM | DECEMBER 9, 2003 | 3 | W/D DDA | 0C | BAD PIN |
| | 0006 | DECEMBER 11, 2003 | 4:01 PM | DECEMBER 9, 2003 | 3 | W/D DDA | 0C | BAD PIN |
| | 0007 | DECEMBER 11, 2003 | 4:01 PM | DECEMBER 9, 2003 | 3 | W/D DDA | 13 | RETRY PIN |
| | 0008 | DECEMBER 10, 2003 | 4:02 PM | DECEMBER 9, 2003 | 3 | W/D DDA | 0C | BAD PIN |
| | 0001 | DECEMBER 11, 2003 | 3:11 PM | DECEMBER 9, 2003 | 0 | DEP DDA | 00 | |
| | 0002 | DECEMBER 11, 2003 | 9:17 AM | DECEMBER 9, 2003 | 0 | DEP DDA | 00 | |
| | 0003 | DECEMBER 11, 2003 | 9:20 AM | DECEMBER 9, 2003 | 0 | DEP SAV | 00 | |
| | 0004 | DECEMBER 11, 2003 | 9:23 AM | DECEMBER 9, 2003 | 0 | DEP SAV | 00 | |
| | 0005 | DECEMBER 11, 2003 | 9:23 AM | DECEMBER 9, 2003 | 0 | DEP DDA | 00 | |
| | 0006 | DECEMBER 11, 2003 | 9:24 AM | DECEMBER 9, 2003 | 0 | DEP SAV | 00 | |
| | 0007 | DECEMBER 11, 2003 | 9:31 AM | DECEMBER 9, 2003 | 0 | DEP DDA | 00 | |

| TERM ID | PAN | PRIMARY ACCOUNT | SECONDARY ACCOUNT | AMT REQUEST | AMT COMPLETE | FEE REQUEST | FEE COMPLETE |
|---|---|---|---|---|---|---|---|
| D031 | 9933333810000805 | | | $20.00 | $0.00 | $0.00 | $0.00 |
| D031 | 9933333810000805 | | | $20.00 | $0.00 | $0.00 | $0.00 |
| D031 | 9933333810000805 | | | $20.00 | $0.00 | $0.00 | $0.00 |
| D031 | 9933333810000805 | | | $20.00 | $0.00 | $0.00 | $0.00 |
| D031 | 9933333810000805 | | | $20.00 | $0.00 | $0.00 | $0.00 |
| SHW1 | 06331 | | | $25.00 | $25.00 | $0.00 | $0.00 |
| SHW1 | 06331 | | | $20.00 | $20.00 | $0.00 | $0.00 |
| SHW1 | 06331 | | | $40.00 | $40.00 | $0.00 | $0.00 |
| SHW1 | 06331 | | | $25.00 | $25.00 | $0.00 | $0.00 |
| SHW1 | 06331 | | | $15.00 | $15.00 | $0.00 | $0.00 |
| SHW1 | 06331 | | | $60.00 | $60.00 | $0.00 | $0.00 |
| SHW1 | 06331 | | | $40.00 | $40.00 | $0.00 | $0.00 |

FIG. 69

| CHECK IMAGE | TRAN SEQ# | TRAN DATE | TRAN TIME | BUSINESS DATE | COMPLETION CODE | TRAN DESCRIPTION | DENIAL CODE | DENIAL DESCRIPTION | TERM ID |
|---|---|---|---|---|---|---|---|---|---|
|  | 0003 | DECEMBER 11, 2003 | 1:56 PM | DECEMBER 9, 2003 | 1 | W/D DDA | 92 | DISPFALT | D031 |
|  | 0005 | DECEMBER 11, 2003 | 4:01 PM | DECEMBER 9, 2003 | 3 | W/D DDA | 0C | BAD PIN | D031 |
|  | 0006 | DECEMBER 11, 2003 | 4:01 PM | DECEMBER 9, 2003 | 3 | W/D DDA | 0C | BAD PIN | D031 |
|  | 0007 | DECEMBER 11, 2003 | 4:01 PM | DECEMBER 9, 2003 | 3 | W/D DDA | 13 | RETRY PIN | D031 |
|  | 0008 | DECEMBER 11, 2003 | 4:02 PM | DECEMBER 9, 2003 | 3 | W/D DDA | 0C | BAD PIN | D031 |
|  | 0001 | DECEMBER 10, 2003 | 3:11 PM | DECEMBER 9, 2003 | 0 | DEP DDA | 00 |  | SHW1 |
|  | 0002 | DECEMBER 11, 2003 | 9:17 AM | DECEMBER 9, 2003 | 0 | DEP DDA | 00 |  | SHW1 |
|  | 0003 | DECEMBER 11, 2003 | 9:20 AM | DECEMBER 9, 2003 | 0 | DEP SAV | 00 |  | SHW1 |
|  | 0004 | DECEMBER 11, 2003 | 9:23 AM | DECEMBER 9, 2003 | 0 | DEP SAV | 00 |  | SHW1 |
|  | 0005 | DECEMBER 11, 2003 | 9:23 AM | DECEMBER 9, 2003 | 0 | DEP SAV | 00 |  | SHW1 |
|  | 0006 | DECEMBER 11, 2003 | 9:24 AM | DECEMBER 9, 2003 | 0 | DEP SAV | 00 |  | SHW1 |
|  | 0007 | DECEMBER 11, 2003 | 9:31 AM | DECEMBER 9, 2003 | 0 | DEP DDA | 00 |  | SHW1 |

FIG. 70

AUTOMATED BANKING MACHINE THAT OPERATES RESPONSIVE TO DATA BEARING RECORDS

CROSS REFERENCE TO RELATED APPLICATIONS

This application is a continuation of U.S. patent application Ser. No. 13/317,612, filed Oct. 24, 2011, which claims benefit pursuant to 35 U.S.C. §119(e) of Provisional Application Ser. No. 61/455,740 filed Oct. 26, 2010. The disclosures of all of the foregoing Applications are herein incorporated by reference as if fully rewritten herein.

TECHNICAL FIELD

This invention relates to automated banking machines that operate responsive to data read from data bearing records including user cards, and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an automated teller machine (ATM) shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide an automated banking machine that operates responsive to data read from data bearing records.

It is a further object of an exemplary embodiment to provide an automated banking machine system and method that accepts deposits and provides cash to a user.

It is a further object of an exemplary embodiment to provide a deposit accepting apparatus.

It is a further object of an exemplary embodiment to provide a deposit accepting apparatus for use in connection with an automated banking machine.

It is a further object of an exemplary embodiment to provide a deposit accepting apparatus which can be used to accept, image and verify the authenticity of items.

It is a further object of an exemplary embodiment to provide a deposit accepting apparatus that accepts both sheets and envelopes.

It is a further object of an exemplary embodiment to provide a deposit accepting apparatus that can be used in existing automated banking machine systems.

It is a further object of an exemplary embodiment to provide a deposit accepting apparatus that has greater reliability.

It is a further object of an exemplary embodiment to provide a deposit accepting apparatus that is more compact.

It is a further object of an exemplary embodiment to provide methods of accepting deposited items.

It is a further object of an exemplary embodiment to provide a method for verifying the authenticity of deposited items.

It is a further object of an exemplary embodiment to provide a method for handling and storing deposited items.

It is a further object of an exemplary embodiment to provide an apparatus and method for correlating image and transaction data to facilitate check processing.

Further objects of exemplary embodiments will be made apparent in the following Detailed Description of Exemplary Embodiments and the appended claims.

The foregoing objects are accomplished in an exemplary embodiment by a deposit accepting apparatus and method used in connection with an automated banking machine. The deposit accepting apparatus includes a transport section. The transport section includes a variable width transport which accepts items of variable thickness. Such items may include relatively thin single sheet-like items and relatively thick irregular shaped items such as deposit envelopes, or driver's licenses or cards. The transport section includes a biasing mechanism for reliably engaging deposited items with moving mechanisms such as belts or rollers in the transport section. The deposited items are reliably engaged with such moving members to assure that the deposited item is moved through the transport section.

The exemplary transport section further includes a variable force driving section. The variable force driving section engages deposited items. The variable force driving section enables limited slip engagement with a deposited item as it is being accepted into the transport section. This enables a user presenting a document to avoid damaging or tearing a document if they fail to release it when it is first engaged by the variable force transport section. Once a document or other deposited item is sensed as having been moved sufficiently into the transport, the apparatus operates to cause the variable force transport section to engage the item more positively and in a nonslip fashion for purposes of moving it in the transport. In embodiments of the invention an aligning device may work in conjunction with the variable slip drive to aid in aligning documents with a transport path.

The exemplary transport section further includes an analysis module adjacent thereto. In the exemplary embodiment the analysis module includes an imaging device and is operative to analyze documents passing through the transport section. In the exemplary embodiment the imaging device of the analysis module is operative to enable the generation of image data representative of an image of the document. In addition the analysis module is operative to sense for features and characteristics of the document which may be used to identify the document type. Alternatively or in addition the analysis module may operate to sense properties of a deposited document which distinguish acceptable or genuine documents from unacceptable documents.

In the exemplary embodiment the transport section of the deposit accepting apparatus is connected to a deposit holding module. The deposit holding module includes at least two compartments therein. In the exemplary embodiment the deposit holding module operates to move the compartments relative to the transport section and to selectively place an outlet from the transport section in communication with a desired one of the compartments. For example when an envelope type deposit is accepted in the transport section, the deposit holding module operates so that the envelope is moved through the transport and deposited into a compartment which is adapted for holding envelopes. Alternatively when a check or other sheet-like deposit is moved through the transport section, the deposit holding module operates so that the sheet moves from the transport section into a compartment which is designated for holding the particular type of sheet.

In an exemplary embodiment described herein, a deposit accepting apparatus and method is used in connection with an ATM. The ATM includes or is associated with one or more computers (alternatively referred to herein as processors) which operate to control the transaction function devices within the ATM including aspects of the deposit accepting apparatus. When a customer at the ATM wishes to deposit an envelope or similar deposit containing item in the machine, the controller enables the customer to place the deposited envelope in the machine so that it may engage the transport section. The computer also operates so that the deposit holding module places the compartment for holding deposited envelopes in communication with the transport section. The user is enabled to engage the deposit envelope with the variable force driving section which the computer causes to operate in a limited slip mode. Once the computer senses that the deposit envelope has been moved into the transport section the variable force driving section may be controlled so that the envelope is more positively engaged with the moving members in the transport. The deposit envelope is then moved through the transport past the analysis module.

In the exemplary embodiment as the deposit envelope passes through the transport section the computer causes a printing mechanism to print identifying information on the envelope. The exemplary embodiment includes a printing mechanism which senses that the envelope has moved into proximity with the printing mechanism. In response to sensing this condition the computer causes the printing mechanism to move relative to the envelope so that printing may be reliably conducted thereon. The movement of the printing mechanism provides greater assurance that the envelope will not catch on or be damaged by the printer mechanism. Once printing has been conducted, the computer causes the printing mechanism to be returned to a standby condition.

Upon passing through the transport section the deposited envelope passes into the designated compartment. The entrance to the designated compartment is aligned with the outlet from the transport section through operation of the deposit holding module. Once the deposited envelope has passed into the compartment within the module it is held therein until accessed by authorized personnel. Suitable locking mechanisms and security procedures are provided so that only authorized personnel are enabled to access the deposit. The identifying information that is printed on the envelope enables the association of the deposited items with the particular customer or user of the automated banking machine.

In the exemplary embodiment when the user wishes to deposit an instrument such as a check, the automated banking machine operates to verify the authenticity of the check and to read data therefrom. In response to the user first providing appropriate identifying inputs and information, the computer in the ATM operates to enable a deposited item to engage the transport section of the apparatus. The computer operates such that the deposited item is initially engaged in a limited slip manner by the variable force driving section and once sensed as substantially within the transport, operates to move the check in a generally nonslip manner.

The deposited item is moved in the transport section in the exemplary embodiment in a first direction past sensors which enable the computer to determine its length. Once the length of the deposited item is determined by moving it in the first direction, movement of the deposited item is stopped and the item is transported in an opposed direction past the analysis module. In the exemplary embodiment movement of the check past the analysis module enables the collection of data to provide an image of the check as well as the sensing of magnetic properties in areas thereof. The exemplary embodiment does not require that the deposited check be perfectly aligned in the transport section for reading the check.

In an exemplary embodiment the computer operates responsive to inputs provided by the customer or responsive to other actions to recall from memory data representative of a template which shows the layout of information included on the particular type of item being deposited. The computer operates to adjust the image data gathered from the deposited item and to place it in correspondence with the template. Characters are then analyzed from at least one selected area of the image in accordance with the template to determine if such characters can be accurately identified. If the computer determines that these particular characters cannot be accurately identified the image data is then moved relative to a template and further attempts are made to determine if data from the area of the template can be recognized. In the exemplary embodiment the data corresponding to the image of the check may be moved 180° relative to the first attempt. In this way if the check is deposited in for example, a face up orientation, either of two possible orientations for the check may be quickly analyzed. Of course alternative approaches may be used and if after a set number of attempts it is determined that the data from a particular area of the check cannot be analyzed with a sufficient degree of assurance (alternatively referred to herein as a degree of confidence) further attempts may be discontinued and the deposited item returned to the customer.

Once data from at least one area of the deposited item is determined with a sufficient level of assurance, data from at least one other area of the item as determined by the template may be analyzed. In the case of a check the ATM is operative to determine the amount of the check as written in the courtesy amount area. The computer operates to analyze the characters and determine if the amount can be determined with a sufficient level of assurance. In the exemplary embodiment the computer operates to locate and identify the courtesy amount using certain landmark rules which identify the landscape and layout of the courtesy amount area. If the computer decides that the characters in the courtesy amount area may be determined with a sufficient level of assurance, further processing of the check is enabled to be conducted. In the alternative if the amount cannot be read with a sufficient level of assurance, the deposited check may be returned to the customer.

In the exemplary embodiment the computer operates to analyze the characters in the micr line on the check as well as the courtesy amount. This data provides both the data sufficient to identify the institution on which the check is drawn as well as the account number of the entity on whose account the check is drawn. The micr line also includes data representative of the check number and other information. The courtesy amount which is analyzed in the exemplary embodiment indicates the amount of the check which has been presented. This information is often sufficient for a financial institution or other entity operating the automated banking machine to charge the appropriate entity for the amount of the check presented. In alternative embodiments the computer may operate to analyze characters located in the area of the check in which the legal amount is written. The amount determined as the legal amount of the check may then be compared to the courtesy amount for purposes of determining whether both amounts have been read properly. Alternatively or in addition, the micr line on the check may include amount data in the case of some checks. In these cases the computer may operate to conduct additional comparisons between the analyzed amounts to verify that the amounts correspond and therefore have been read accurately, or to determine discrepancies that may indicate that a check has been tampered with or other conditions that may suggest that it is not advisable for the machine to accept such a check.

In the exemplary embodiment the depository apparatus is also operative to sense for the presence of magnetic coding in appropriate locations on the check. For example the computer is operative to verify that the ink in the area which has been identified as including the micr coding has magnetic properties. This provides greater assurance that the document presented is in fact a genuine check and not a photocopy of a check. The computer may operate in addition to sense magnetic or other properties from various areas appropriate for the deposited document depending on data stored in memory. Further in some alternative embodiments the computer may operate to look for magnetic or other properties in areas of the check where such properties would not be appropriate. Such sensing may reduce the risk of the machine accepting fraudulent checks. Of course, other embodiments may include a read head or other device for reading micr line data magnetically.

In some embodiments the machine may operate to capture a complete image of one or both sides of each check or other instrument. In some embodiments image data may be stored in correlated relation with data related to the transaction at the machine. In some embodiments the image data, with or without associated transaction data, may be delivered by the machine to appropriate computers so that check processing may be conducted using the electronic image of the check rather than paper documents. In some embodiments check images may be stored at the machine and later delivered to appropriate systems for check processing. In other alternative embodiments check images may be transmitted to other computers during the transaction so that such computers may further analyze the check image data.

In an exemplary embodiment the computer operating in or associated with the ATM is operative to include data representative of the check data corresponding to information corresponding to indicia on the check such as amount and micr line data into an electronic message requesting authorization of the ATM transaction. This authorization message is transmitted to an appropriate host computer. The computer analyzes the data to verify that the user operating the ATM is authorized to conduct a deposit, check cashing or other transaction. In addition the host computer may operate to verify that the check data corresponds to data input by the customer. The host computer may further operate to determine or communicate with other computers to verify that the account data corresponding to the check corresponds to a valid account, that the check is not subject to a stop payment order and/or that there are sufficient funds in the account upon which the presented check is drawn to provide payment therefor.

In response to the host computer determining that the requested check cashing transaction is suitable to be carried forward, an authorization message is returned from the host computer to the ATM. The ATM operates responsive to instruction data included in the authorization message to cause the check to be moved through the transport section past the printing mechanism. The printing mechanism operates to print indicia on the check. This data represented by the indicia may indicate that the check has been cancelled as well as indicate the particular account of the user to which the check has been credited. In an exemplary embodiment the printing mechanism operates in the manner previously discussed to move into position in response to sensing the check adjacent thereto. This again minimizes the risk of damage to the printing mechanism or the check.

The computer also operates to control the deposit holding module such that the appropriate compartment therein accepts the deposited check. In the exemplary system the deposit holding module moves the compartment for holding the check into alignment with the outlet of the transport section. The deposited check is then held within the compartment until it is accessed by authorized personnel. Further, in the exemplary embodiment the deposit holding module is operative after receipt of the check into the appropriate compartment to move a tamping member in the compartment. The tamping member operates to assure that the deposited check as well as other checks in the compartment are properly tamped into position so as to reduce the likelihood of interference with acceptance of subsequent checks. The deposited check is then held in the appropriate compartment until removed by authorized personnel.

In some exemplary embodiments the authorization message received from the host computer by the ATM includes transaction identifying data. Such transaction identifying data may include information which facilitates associating the image or images of the check captured by the ATM with the particular transaction. Such transaction identifying data may include data that is sent by the ATM to the host computer in the original request message as well as data that may be assigned by the ATM host to the transaction. For example in an exemplary embodiment transaction identification data includes data which identifies the particular terminal at which the transaction is being conducted. Such information corresponds to the terminal identification data that is included in the message received by the ATM host from the terminal requesting the transaction. In addition in some alternative embodiments the transaction identification data may include information correlated with a particular user such as the user's name and/or account information. Such information may also be included in the message received by the ATM host from the terminal. Further in exemplary embodiments the transaction identification data may include information such as the business date assigned by the ATM host to the transaction, the entity responsible for operating the ATM such as a particular institution or business establishment, transaction numbers such as a sequence number as well as a pseudo number which can be used for correlating and/or verifying transaction data. Of course these items of transaction identification data are exemplary and in other exemplary embodiments other or different data may be used.

In an exemplary embodiment the ATM is programmed to correlate the transaction identification data with the image data related to the particular check received in the transaction. At a time after the ATM has generated data corresponding to an image of the check, an image message is generated by the ATM and sent to a remote computer. In the exemplary embodiment the image message includes the transaction identification data as well as the data representative of the front and back of the check in a single message. In the exemplary embodiment the image message is sent to an image server which is operative to receive and process the image and transaction data. The image server is operative to tabularize the transaction data related to machines operated by a particular entity and to make the information and images related to transactions conducted by ATMs associated with that entity available to authorized individuals. This may be done through password protection, digital certificates or other security methodologies. Further in other alternative embodiments the image server or other connected computers may be operative to send information included in the image message and/or image data to a clearing house or other institution for purposes of achieving settlement between an entity upon which the check is drawn and another entity holding an account for an entity to which the check is payable. Further the image data may be transmitted and processed in lieu of a paper check so as to return evidence related to the proper cashing and cancellation of the check through the institution on which the check is drawn, and eventually to the maker of the check. Of course these approaches are exemplary and in other embodiments other approaches may be used.

While the exemplary embodiment is used for accepting envelopes and checks, other embodiments of the invention may accept only checks or may process other types of instruments. These include for example utility bills, drivers' licenses, gaming materials, tax documents and other items. Such items may be analyzed by the analysis module described in the exemplary embodiment for image and magnetic properties. Alternatively such items may be analyzed for other properties which may be indicative of their genuineness and value. Further as can be appreciated, while some exemplary embodiments accept deposited items into the machine, other embodiments may accept items from a user, analyze them and return them to the user. This includes not only items which are considered unacceptable as is discussed in the exemplary embodiment, but may also include items such as drivers' licenses or tickets which are returned to the user after an image or analysis is made thereof. Numerous types of systems and activities may utilize the novel features and relationships disclosed herein.

BRIEF DESCRIPTION OF DRAWINGS

FIG. 7 is a side schematic view showing the transport portion of the deposit accepting apparatus in a position in which it accepts checks and other sheets.

FIG. 8 is a view similar to FIG. 7 with the deposit accepting module in position for accepting envelopes or other items.

FIG. 29 is an exemplary logic flow executed by an automated banking machine in accepting an envelope deposit through the deposit accepting apparatus.

FIGS. 30-33 describe an exemplary embodiment of the logic flow executed by an automated banking machine in accepting a check through the deposit accepting apparatus.

FIG. 40 is an exemplary screen output from an administrator station, showing the status of automated banking machines.

FIG. 41 is an exemplary screen output from an administration, showing status information related to a particular automated banking machine.

FIG. 43 is an exemplary output from an administrator station showing check cashing transactions conducted by a particular customer.

FIG. 44 is an exemplary screen output from an administrator station showing selections in an exemplary system.

FIG. 45 is an exemplary screen output from an administrator station showing available reports.

FIG. 46 is an exemplary screen output from an administrator station enabling an administrator to upload file information to the exemplary system.

FIG. 47 is an exemplary output from an administrator station indicating the upload of files to the exemplary system.

FIG. 48 is a schematic view of an exemplary record relating to makers of checks whose checks are to be cashed in the exemplary system.

FIG. 49 is an exemplary output from an administrator work station showing file conversion from the exemplary system.

FIG. 50 is an exemplary output from an administrator station which is used by an administrator to edit customer records.

FIG. 51 is an exemplary screen output produced by an administrator station showing customer authorization information.

FIG. 52 is an exemplary screen output from an administrator station showing information regarding a particular attempted check cashing transaction.

FIGS. 58 through 60 are a table showing various criteria programmed in the exemplary system for the denial of transactions attempted at automated banking machines within the system.

FIG. 64 is a table showing exemplary fields and the content thereof in an image message sent from an ATM to an image server in an exemplary embodiment.

FIG. 68 is an exemplary interface output from the image server which enables authorized users to recover transaction and image data related to transactions.

FIG. 69 is an exemplary table of transaction data corresponding to check cashing transactions conducted at ATMs associated with a particular entity operating ATMs.

FIG. 70 is an exemplary output from the check image server representing an image of a check which is produced responsive to selecting an icon associated with a corresponding transaction in the table shown in FIG. 69.

DETAILED DESCRIPTION OF EXEMPLARY EMBODIMENTS

Figure 1:
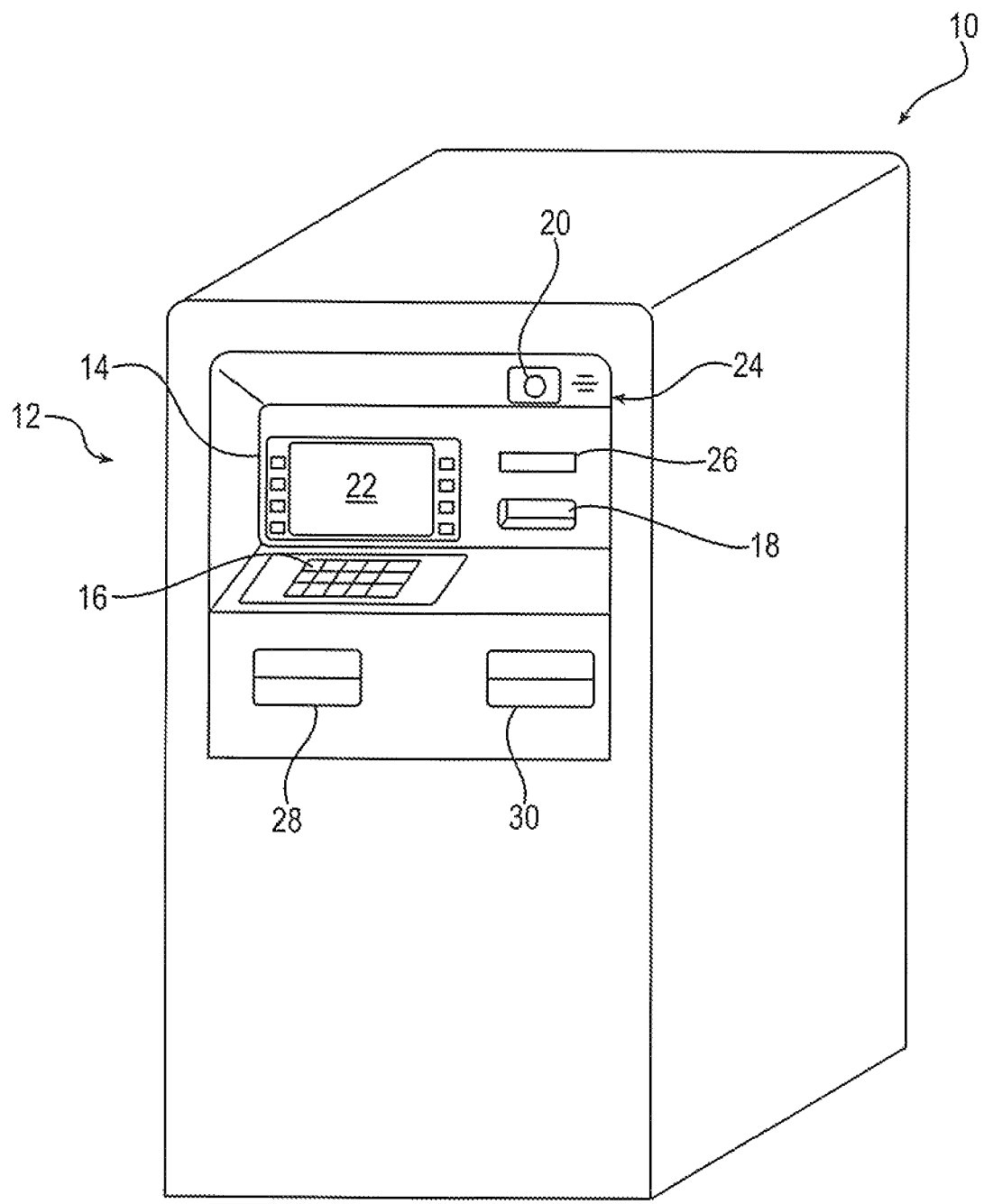
FIG. 1 is an isometric view of an exemplary automated banking machine which may be used in connection with a deposit accepting apparatus and method.

Referring now to the drawings and particularly to FIG. 1, there is shown therein an exemplary embodiment of an automated banking machine 10 which includes an exemplary deposit accepting apparatus and which performs an exemplary method of operation.

Automated banking machine 10 is an ATM. However it should be understood that the features disclosed herein may be used in connection with various types of automated banking machines and devices of other types. Automated banking machine 10 includes a user interface generally indicated 12. User interface 12 includes input and output devices. In the exemplary embodiment the input devices include a plurality of function buttons 14 through which a user may provide inputs to the machine. The exemplary input devices further include a keypad 16 through which a user may provide numeric or other inputs. A further input device in this exemplary embodiment includes a card reader schematically indicated 18. Card reader 18 may be of the type used for reading magnetic stripe cards, smart cards, RFID tokens or other articles presented by a user. Another input device on the exemplary machine includes an image capture device 20. The image capture device may be a camera or other device for capturing the image of a user or the surroundings of the machine. The exemplary embodiment may include biometric reading devices. Such devices may include an imaging or reading device such as a fingerprint reader, iris scan device, retina scan device or other biometric input. It should be understood that the camera mentioned may serve as a biometric reading device in some embodiments.

The user interface 12 also includes output devices. In the exemplary embodiment the output devices include a display 22. Display 22 includes a visual output device such as a CRT or LCD for providing messages and prompts to a user. These messages and prompts may be responded to by inputs from the user through the function buttons 14 adjacent to the display or by inputs through the keypad 16 or through other inputs. A further output device in the exemplary embodiment includes an audio output device schematically indicated 24. The audio output device may be used to provide audible outputs to the user. A further output device in the exemplary embodiment includes a printer. The printer may be used to provide outputs in the form of receipts or other items or information to the user. The printer is in connection with a printer outlet in the user interface indicated 26 in FIG. 1.

It should be understood that the input and output devices shown are exemplary and in other embodiments other types of input and output devices may be used. Such input and output devices commonly receive information which is usable to identify the customer and/or their accounts. Such devices are also operative to provide information to a user and to receive instructions from a user concerning transactions which are to be carried out through use of the machine. Various forms of user interfaces and input and output devices may be used in connection with embodiments of the invention.

In the exemplary embodiment ATM 10 includes a cash dispensing mechanism which is alternatively referred to herein as a cash dispenser. The cash dispensing mechanism is selectively operated to enable the dispensing of cash to authorized users of the machine. Cash is provided to the users through a cash outlet indicated 28. A further feature of the exemplary embodiment is the ability to accept deposits through the ATM. The machine includes a deposit accepting opening 30. In the exemplary embodiment the ATM is enabled to accept deposits in the form of sheets, envelopes and other items as later discussed. Alternative embodiments may include sheet recyclers which are operative to both receive and store sheets within the machine and then selectively dispense sheets such as currency notes. Devices that are capable of recycling currency notes are shown in U.S. Pat. No. 6,331,000 and U.S. application Ser. No. 11/324,903 filed Jan. 3, 2006, the disclosures of each of which are incorporated herein by reference in their entirety.

Figure 2:
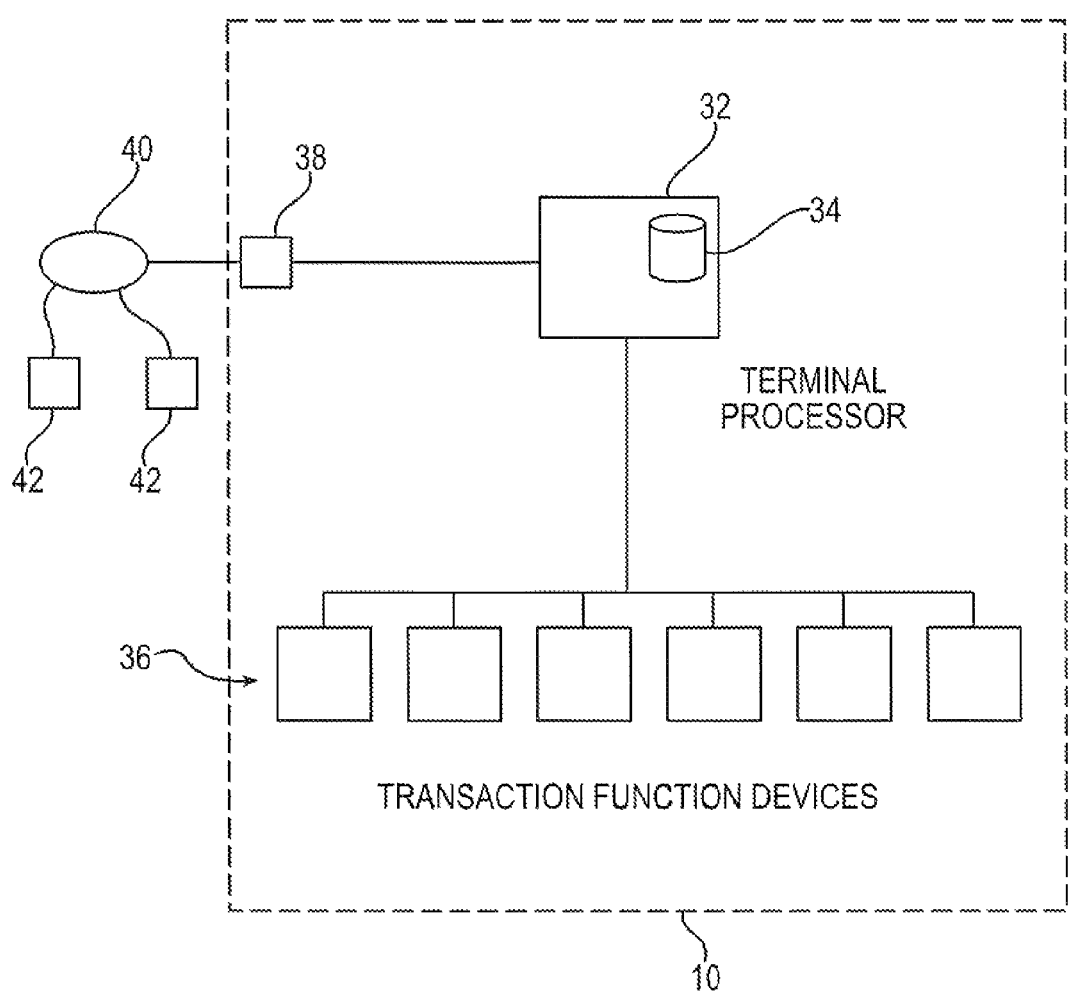
FIG. 2 is a schematic view of components included within an automated banking machine of the type shown in FIG. 1 and a system in which the automated banking machine is used.

FIG. 2 shows a schematic view of the computer architecture associated with ATM 10 and a first exemplary system in which it is used. The exemplary ATM includes one or more computers therein, which computers are alternatively referred to herein as a processor or processors. The one or more computers in the exemplary embodiment are schematically represented by a terminal processor 32. The terminal processor is in operative connection with one or more data stores schematically represented 34. The terminal processor may comprise one or more computers that operate to control transaction function devices 36 which are included in the ATM. In alternative embodiments the terminal processor may include one or more processors associated with operating the ATM that reside in another device either locally or remotely from the ATM. For example in some embodiments the ATM terminal processor may operate as part of a virtual machine in a remote server. The terminal processor of the virtual machine may operate to communicate with the transaction function devices located in the ATM and cause the operation thereof. The transaction function devices include devices which operate in the ATM to carry out transactions. Transaction function devices may include, for example, currency dispensing mechanisms, currency presenters, currency acceptors, currency validators, item dispensing devices, card readers, printers, depositories, other input and output devices and other devices. Transaction function devices may further include cameras, sensors, image capture devices and other items. The particular character of the transaction function devices depends on the particular capabilities for carrying out transactions to be provided by the ATM.

In the exemplary embodiment ATM 10 exchanges messages through a communications interface 38 with a communications network 40. Network 40 may be one or more types of data communications networks, including a phone line, data line, lease line, frame relay, wireless network, telecommunications network or other medium for communicating messages to and from the ATM 10. The communications interface provided is suitable to work in connection with the particular type of network(s) to which the machine is connected. In the exemplary embodiment the ATM may be connected to a network which communicates with a plurality of ATMs such as Cirrus® or Plus®, or other debit card network. Of course in other embodiments other suitable networks for processing credit, debit or other types of online transactions may be used including the Internet.

As schematically represented in FIG. 2, network 40 is in operative connection with one or more host computers 42. Host computers 42 in the exemplary embodiment are operative to authorize transaction requests which are made by users at the ATM 10. The ATM is operative to deliver to the host computer data identifying the user and/or their account and the particular transactions that they wish to conduct. The request is routed through the network to a host computer that can evaluate and/or authorize the request. The appropriate host computer receives and analyzes this data and returns to the ATM a message which indicates whether the transaction requested is authorized to be conducted at the machine. The message returned may also include one or more instructions that cause the ATM to carry out one or more transaction functions. In response to receiving a message indicating that the transaction should proceed, the processor in the ATM operates the transaction function devices to carry out the requested transaction. If the transaction is not authorized, the user is so informed through the display and the transaction is prevented. The ATM is also operative in the exemplary embodiment to send to the host computer authorizing the transaction, a completion message which includes data indicative of whether the transaction was able to be carried out successfully. Upon receiving the information that the transaction was carried out, the host computer is operative to take appropriate action such as to credit or debit a user's account. It should be understood that this system shown in FIG. 2 is exemplary and in other embodiments other approaches to operating automated banking machines and authorizing transactions may be used.

In the exemplary embodiment the transaction function devices include a deposit accepting apparatus. The exemplary deposit accepting apparatus is capable of accepting deposited items such as envelopes as well as sheets and documents such as checks. This deposit accepting apparatus in alternative embodiments may be capable of accepting and analyzing other items such as papers, instruments, billing statements, invoices, vouchers, wagering slips, receipts, scrip, payment documents, driver's licenses, cards and items which may be moved in the deposit accepting device. Alternative embodiments may accept only selected ones of such items. The exemplary deposit accepting apparatus may alternatively be referred to herein as an "intelligent depository module," "depository module" or "IDM." The exemplary embodiment of the IDM is referred to herein as 44 and the exemplary mechanical components thereof shown in FIGS. 4-18.

Figure 4:
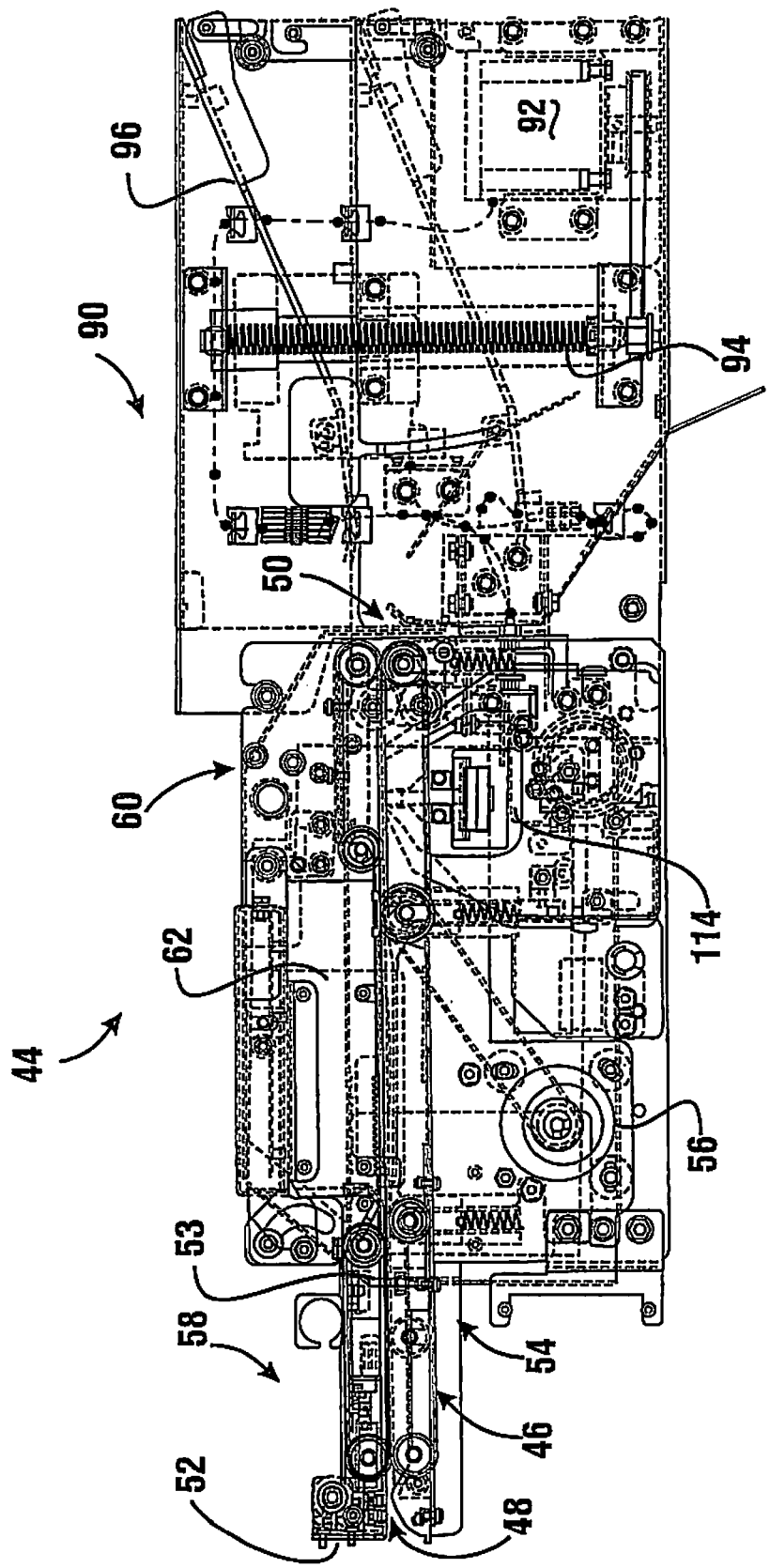
FIG. 4 is a side view of a deposit accepting apparatus used in connection with an exemplary embodiment.

As shown in FIG. 4 IDM 44 includes a transport section 46. Transport section 46 extends in generally a straight path from an inlet 48 to an outlet 50. Inlet 48 is positioned adjacent to a deposit accepting opening 30 through the body of the ATM 10. Access to the transport section 46 from the outside of the ATM may be controlled by a gate 52 or other suitable blocking mechanism which operates under the control of the terminal processor 32. The terminal processor operates to open the gate only when an authorized user of the ATM is to provide items to or to receive items from the transport section of the IDM.

The transport section 46 of the IDM includes a plurality of belts or other moving members 54. Moving members 54 operate to engage items deposited into the transport section and to move deposited items in engagement therewith. The moving members are moved in response to one or more drives schematically indicated 56. In the exemplary embodiment an inlet transport section 58 moves deposited items between upper and lower belt flights (see FIG. 5). Similarly, deposited items are also moved through an outlet transport section 60 in sandwiched relation between upper and lower belt flights. Between the inlet and outlet transport sections deposited items are moved past an analysis module 62. In the exemplary embodiment deposited items are moved adjacent to the analysis module in engagement with moving members that act on the lower side of the deposited item. In this way the deposited item moves in close proximity to the analysis module and in sandwiched relation between a lower face 64 of the analysis module and the upper face of the moving members. Of course it should be understood that this configuration is exemplary. For example, in other embodiments additional analysis modules may be provided so that both sides of an item are analyzed. Analysis modules or discrete devices for activating indicia to facilitate sensing, as well as for sensing indicia on items, may be provided as necessary to read indicia from items handled by the banking machine. For example, some embodiments may include features described in U.S. application Ser. No. 12/806,720 filed Aug. 19, 2010, the disclosure of which is incorporated herein by reference in its entirety.

As represented in FIGS. 7 and 8, in the exemplary embodiment the deposit accepting apparatus is enabled to accept both relatively thin articles such as sheets as well as relatively thick items such as deposit envelopes. As shown in FIG. 7 thin articles such as checks or other sheets are moved through the transport section with the upper and lower moving members in close proximity. In the exemplary embodiment, the upper portion of the transport section is movable relative to the lower section and is biased adjacent thereto by gravity or other suitable biasing mechanism. In this way a relatively thin deposited item is biased to engage the moving members in the transport section. Relatively thin articles such as checks and other sheets are moved between the inlet 48 and the outlet 50 in the transport section with the transport in the configuration generally shown in FIG. 7. In this configuration the moving members and analysis module in the upper portion of the transport section are biased to maintain engagement with the sheet so as to enable selectively moving the sheet through the transport section.

It should be noted that in the exemplary embodiment of the depository module a single drive is used for moving the moving members in both the upper and lower transport sections. This is accomplished in the exemplary embodiment through use of a connecting gear train 66 which serves as a transmission device which transmits movement between the lower belt flights and the upper belt flights. A connecting drive belt 68 is used to transmit movement between the upper portions of the inlet and outlet transport sections 58, 60 respectively. The connecting drive belt extends adjacent to the analysis module 62. Of course this approach is exemplary and in other embodiments other arrangements of drives and transmission devices may be used.

As represented in FIG. 8 when a relatively larger item is deposited into the transport section, the upper and lower transport sections are enabled to separate to a degree sufficient to accommodate the thickness of the particular item. The configuration of the gear train 66 enables providing moving force to the moving members in both upper and lower sections of the transport within a relatively wide range of thicknesses. The exemplary structure further enables each end of the transport section to move both vertically and rotationally relative to one another while still continuing to reliably transport items therein. An inserted deposited item overcomes the biasing force applied to the deposited item by the transport sections to enable the item to move between the upper and lower moving members that bound the path 53 between the inlet 48 and outlet 50. The biasing force further enables providing positive engagement with the deposited item to reliably move the item along the path. It should be understood however that this particular configuration for the transport is exemplary and in other embodiments of the invention other approaches may be used.

Figure 9:
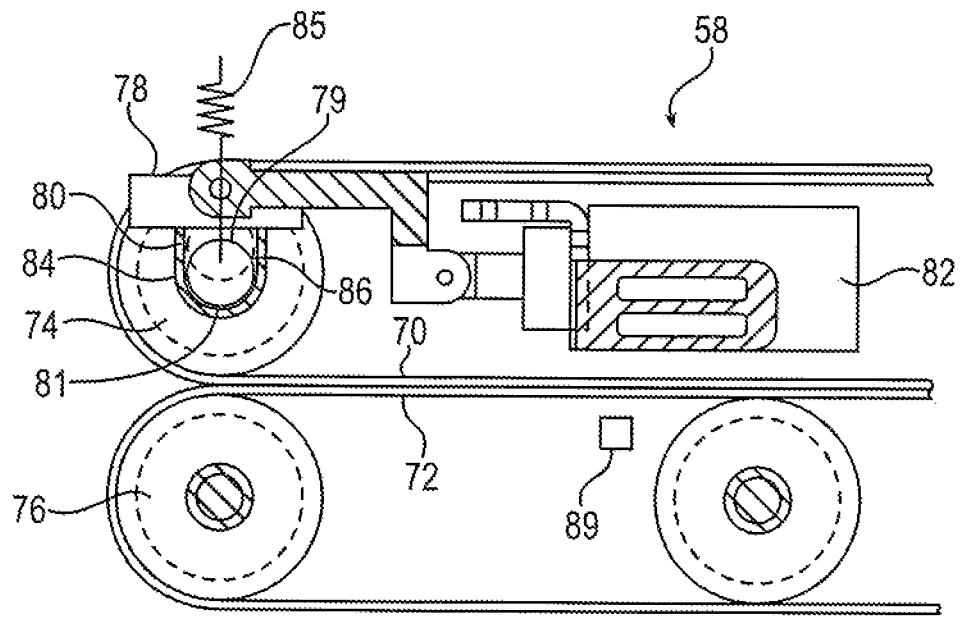
FIG. 9 is a side schematic view of the variable force driving section included in the transport section of the deposit accepting apparatus with the drive shown in condition for providing limited slip engagement with deposited items.

In the exemplary embodiment the inlet transport section 58 may be operated responsive to the terminal processor as a variable force driving section. This is achieved through use of the mechanism schematically represented in FIG. 9. As shown in FIG. 9 the inlet transport section includes moving members comprising one or more upper belt flights 70 and one or more lower belt flights 72 in generally opposed facing relation. The number of upper and lower belt flights will depend on the particular configuration of the transport used. In certain embodiments the upper and lower belt flights may be in generally aligned facing relation or may be transversely disposed from one another.

The upper belt flight 70 which serves as a moving member is supported on an upper roller 74. The lower belt flight 72 is supported on a lower roller 76 which is generally disposed in opposed relation below roller 74 and which serves as an opposed moving member. Upper roller 74 is journaled on a supporting member 78. Supporting member 78 is supported through and is rotatable about a pivot axis 79 which extends axially through support shaft segments 80. An actuator 82 such as a solenoid selectively moves the supporting member between the position shown in FIG. 9 and the position shown in FIG. 10. This is done in response to operation of the terminal processor 32 and enables the inlet transport section to be selectively changed between a low drive position in which limited slip is provided between the belt flights 70 and 72 and a deposited item, and a high drive position in which generally no slip occurs between the belt flights and the deposited item.

FIG. 9 shows the inlet transport section in the low drive position. In the exemplary embodiment roller 74 is supported through roller shaft segments 84. Shaft segments 84 are journaled in and movable in elongated U-shaped slots 86 in connection with supporting member 78. Each slot 86 is bounded by a U-shaped bounding surface 87. The slots are generally radially aligned relative to pivot 79. A biasing spring schematically indicated 85 or other appropriate biasing mechanism is provided for urging roller shaft segments 84 toward a downward position in the slot.

In the position shown in FIG. 9 an item such as a check which is engaged between the belt flights 70 and 72 is enabled to slip therein responsive to the limited biasing force which acts to push roller 74 downwards. This results because roller shaft segments 84 move relatively readily on the vertically extending portions of the bounding surface as the upward directed reaction force caused by the inserted item is resisted only by downward biasing force. This enables for example, a user who is placing a check into the transport section to hold the check for a period of time while it engages between the belt flights. The limited slip minimizes the risk that the check will be torn if the user does not release it promptly. Such limited slip engagement further enables a check or other inserted item to move angularly relative to movement along the direction of transport. This may occur for example by the engagement of an outward end of the item with a user's hand as the item is pulled into the machine and/or by one or more surfaces bounding the opening in the machine through which the item passes.

Figure 10:
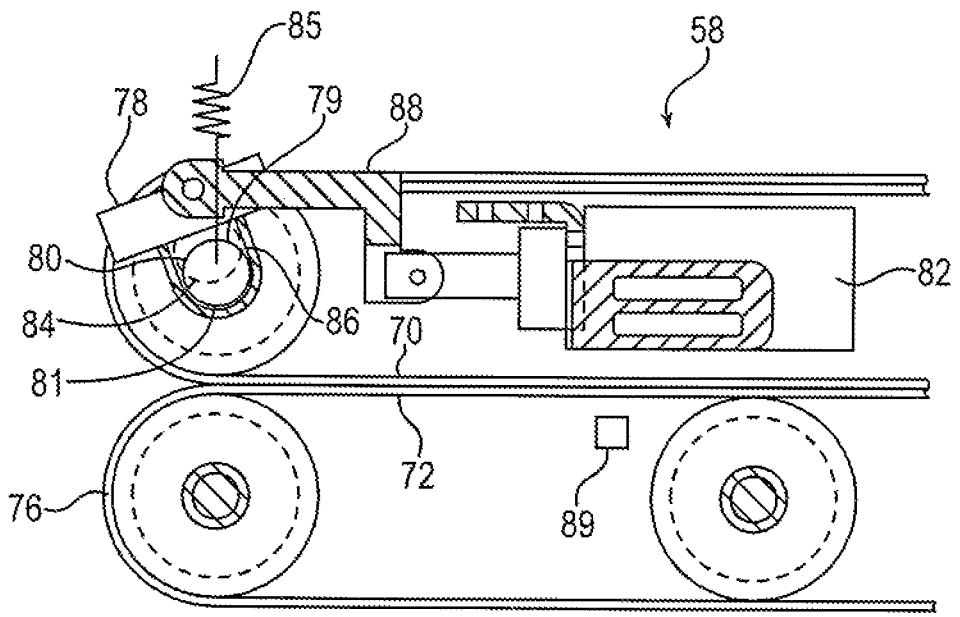
FIG. 10 is a view similar to FIG. 9 but with the variable force driving section providing generally nonslip engagement with deposited items.

Upon sensing with one or more appropriate sensors schematically indicated 89 that the check is moved sufficiently into the transport path, the terminal processor is operative to move the actuator 82 to place the inlet transport in the high drive position shown in FIG. 10. A connecting member 88 moves the supporting member 78 about support shaft segments 80. This change in orientation of the slots increases the downward biasing force applied by the roller 74 onto the deposited item. This results in the exemplary embodiment because the upwardly directed separating force is now resisted by engagement of roller shaft segments 84 with bounding surface 87. In addition the rotating shaft segments 84 engage bounding surface 87 so that the roller shaft segments are further urged downward in the slot 86 towards an end portion 81 as shown in FIG. 10. This causes the item to be more positively engaged between the belt flights and generally prevents slippage. This feature is useful as later discussed in helping to measure the length of a deposited item for imaging purposes.

Figure 36:
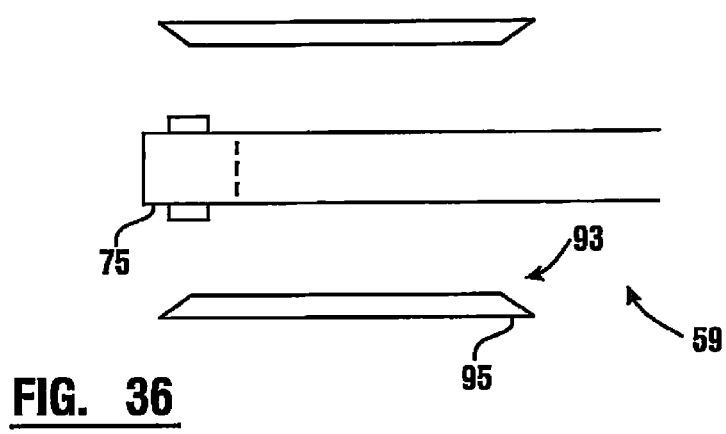
FIG. 36 is a top plan view of an alternative form of the variable force driving section included in the transport section of the deposit accepting apparatus which includes a document alignment device.
Figure 37:
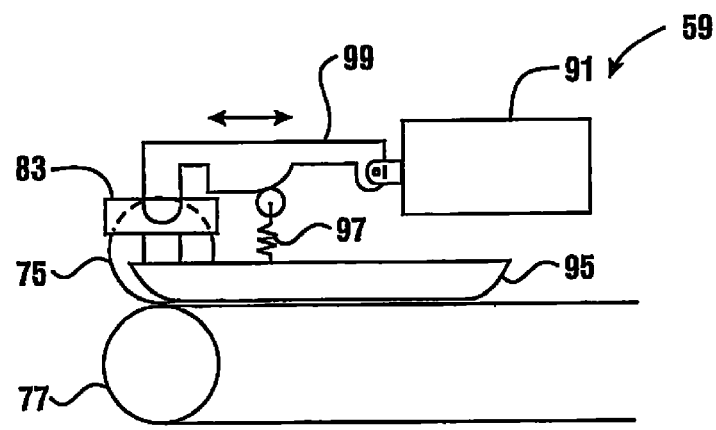
FIG. 37 is a side schematic view corresponding to FIG. 36 showing the mechanism actuating the variable force driving section and document alignment device.

FIGS. 36 and 37 show an alternative form of an inlet transport section generally indicated 59. Inlet transport section 59 is generally similar to inlet transport section 58 except as described. Inlet transport section 59 includes an upper roller 75 and a lower roller 77. In the exemplary embodiment the rollers have moveable members in the form of belt flights supported thereon. Of course it should be understood that in other embodiments, other types of wheels, rollers or other moving members may be used.

Upper roller 75 is enabled to provide a variable slip driving force through movement of a supporting member 83. Supporting member 83 is similar in the exemplary embodiment to supporting member 78 and is movable responsive to an actuator 91. The actuator 91 is operative to selectively change the orientation of the supporting member 83 to selectively change the degree of engagement between the belts moving on roller 75 and an item moving through the transport. A guide device 93 is positioned in the inlet transport section 59. In the exemplary embodiment guide device 93 includes a pair of moveable side rails 95. Side rails 95 are biased in a downward direction as shown in FIG. 37 by a spring mechanism 97. As indicated in FIGS. 36 and 37, the guide rails are tapered both vertically and transversely adjacent the end portions thereof. This facilitates movement of documents adjacent to and underneath the side rails and reduces the risk of items being caught on the side rails.

As schematically represented in FIG. 37 in the exemplary embodiment the side rails 95 are operatively connected with the actuator 91 through a connecting mechanism 99. The connecting mechanism operates such that when the drive is operated such that there is more slip between the moving member and an inserted item, the side rails 95 are biased in a downward direction. In this condition the rails are biased toward the transport path in which the document moves with a relatively greater force than when the drive is in greater positive engagement with the document. In this way the guide device 93 acts to position skewed or otherwise misaligned documents more readily relative to the transport path when the drive is in limited slip engagement. This may help to position the document rotationally or in alignment with the transport path through engagement of the deposited item with at least one of the side rails. It should further be understood that the spring biased character of the alignment device, enables the device to engage an upper surface of a document without causing damage thereto or preventing movement of the document along the transport path in response to the urging of the moving members. It should be further noted that the configuration of the exemplary embodiment of the guide device facilitates aligning of documents in the transport path when documents are moving either in the inward or the outward direction.

As can be seen from FIG. 37, when the connecting mechanism moves to place the drive in a more positive engagement with the document, the downward biasing force of the side rails is reduced. This is done because once the drive is more positively engaged with the deposited item, the item is not as readily reoriented relative to the transport path. It should be noted that although in FIG. 37 this is represented as being done using a cam and follower arrangement, in other embodiments the biasing force on the guide device may be changed through other mechanisms. In addition it should be understood that the mechanism shown is exemplary and in other embodiments the guide device may be moved away from the deposited item rather than merely having the biasing force acting on the item reduced.

In the operation of this exemplary embodiment, the depository module in which the variable force inlet transport is used accepts both single sheet-like items as well as larger items such as depository envelopes. In some other embodiments larger items consisting of multiple sheets such as passbooks may also be transported. In this exemplary embodiment larger items are generally transported through the inlet transport section 59 without a need to engage the items more firmly than is accomplished in the limited slip engagement condition of the transport. In such cases, the controller operating within the banking machine, operates in accordance with its programming and responsive to the at least one input by the user concerning the type of item being transported, to operate the inlet transport in the limited slip configuration. The computer does not cause the transport to change to the more positive engagement condition as such item passes through. In these circumstances the drive members as well as the guide device may be biased away by the force of the item passing through the transport so as to enable the particular item to pass. Of course in some embodiments if the item is sensed as hung up in the inlet transport, the controller operating the ATM may attempt to more positively engage the item so as to move it through the transport. For single sheet items, such as checks or other documents, the inlet transport section 59 may operate in response to one or more user inputs concerning the type of item being deposited, to initially provide more limited slip between the deposited sheet and the moving members. During this more limited slip condition the biasing force on the guide device acts to position the guide device more firmly in the transport path. This helps to align the document with the transport path during the period of limited slip engagement. Thereafter after the deposited item has moved further into the transport path, the supporting member 83 may be moved to provide a more positive engagement. As this is done the force applied by the guide device 93 is reduced as the more positive engagement between the moving members and the deposited item will tend to move the item in its then current orientation. Of course it should be understood that the guide device and the mechanism shown are exemplary and in other embodiments other types of devices and mechanisms may be used equivalently to accomplish the described functions. In other embodiments deposit accepting devices that only accept certain types of items that are of relatively uniform thickness such as checks, may be used.

The exemplary embodiment further includes a deposit holding module schematically indicated 90 (see FIG. 4). In the exemplary embodiment the deposit holding module includes a plurality of compartments which are moved relative to the outlet 50 of the transport section to enable items to be passed from the transport section into a selected compartment. The deposit holding module includes a drive 92 which is part of a translation mechanism 94 of the screw type. The translation mechanism operates to move the compartments in a generally vertical direction relative to the outlet 50 in the transport section. The deposit holding module further includes a tamping member 96 which is movable in the compartment and operates to tamp sheets held in a sheet holding compartment so as to reduce the volume of sheets held therein until the items may be removed.

Figure 11:
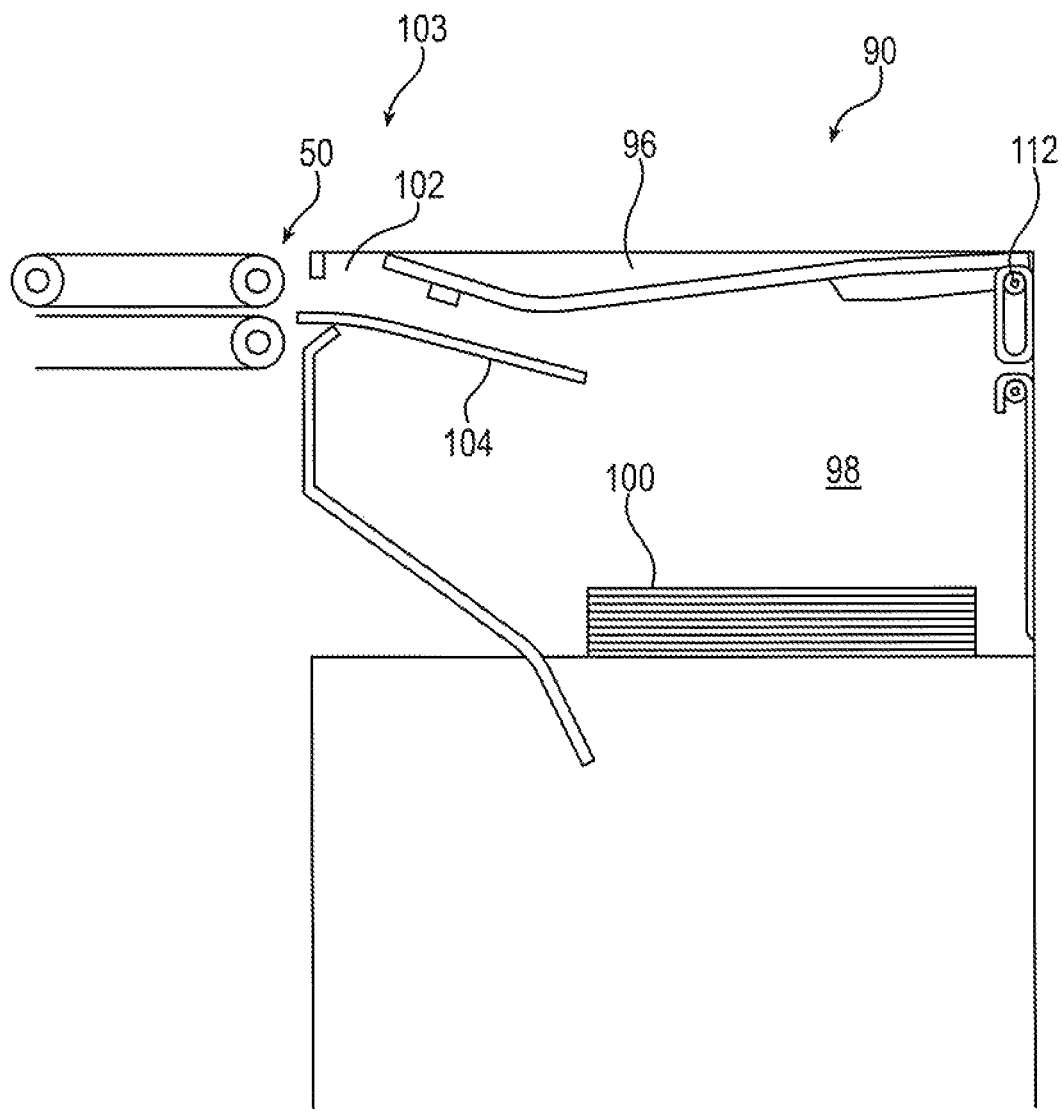
FIG. 11 is a side view of the deposit holding module of the transport apparatus shown in a position accepting a sheet into a sheet holding compartment.

The operation of the deposit holding module 90 in connection with the exemplary embodiment is represented in FIGS. 11 through 16. As shown in FIG. 11 a sheet holding compartment 98 in the deposit accepting module 90 is adapted for holding sheets 100 of one type such as cancelled checks or other items accepted in the machine. The sheet holding compartment 98 includes an opening 102 in an upper area thereof generally indicated 103. Opening 102 may be selectively moved responsive to signals from the terminal processor and operation of drive 92, to be in communication with outlet 50. The tamping member 96 may also be selectively moved upward such that a sheet leaving the transport section through the outlet such as sheet 104, may be passed into the sheet holding compartment 98.

Figure 12:
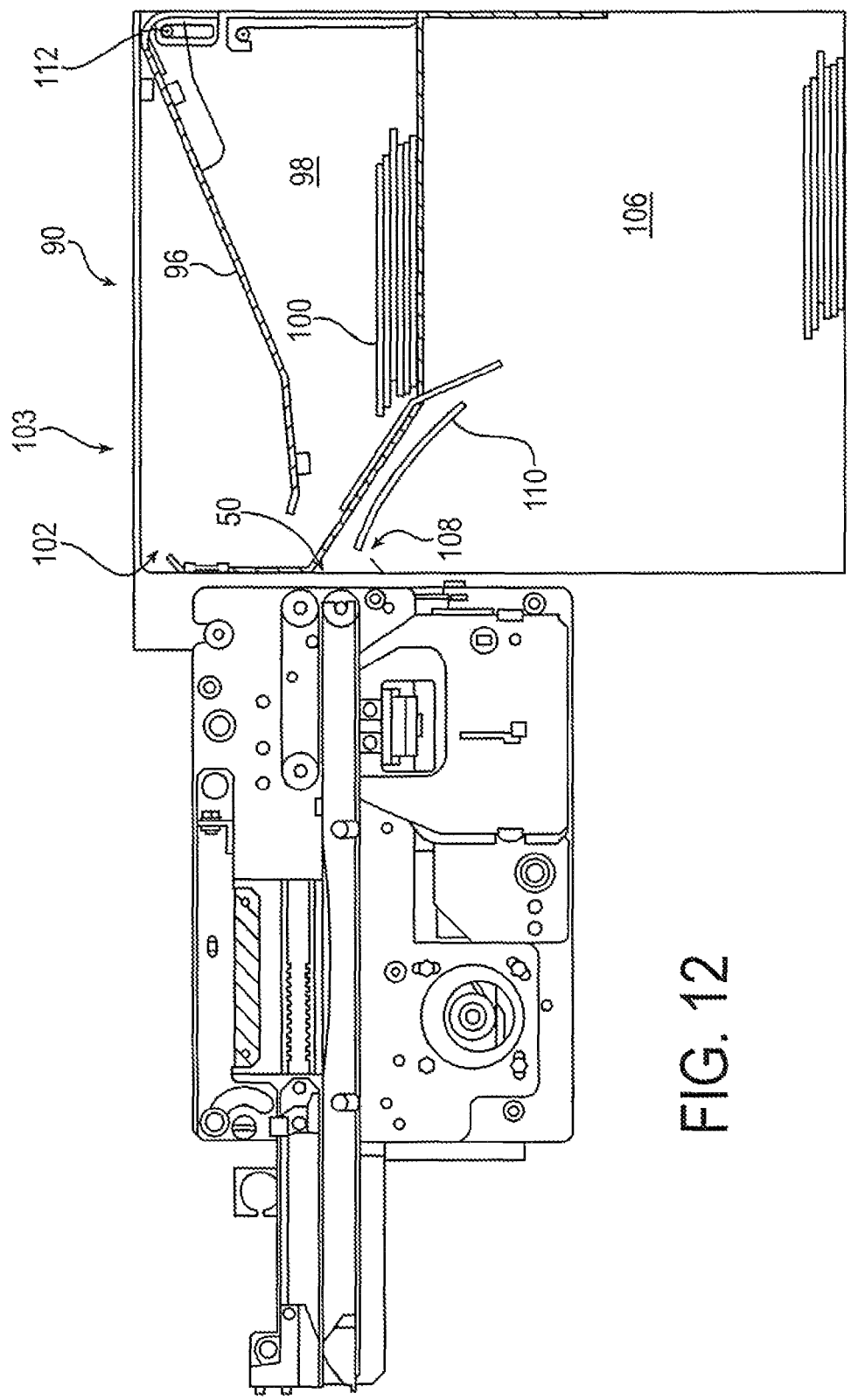
FIG. 12 is a view similar to FIG. 11 but with the deposit holding module in a condition for accepting an envelope deposit into an envelope holding compartment.

When deposit envelopes are to be accepted, the controller responsive to at least one input through the user interface indicating an envelope deposit, may operate the drive 92 to move the position of the compartments within the deposit holding module so that an envelope holding compartment 106 is placed in communication with the outlet 50 of the transport section. This is accomplished as represented in FIG. 12 by bringing an opening 108 to compartment 106 into alignment with the outlet 50. This enables an envelope deposit such as an envelope schematically represented 110 in FIG. 12 to be moved into the envelope holding compartment 106.

It should be noted that the movement of the compartments relative to the outlet enable selectively aligning the openings to the various compartments with the outlet from the transport. This minimizes the amount of handling and manipulation of the deposits that is necessary to move them through the deposit accepting mechanism. This increases reliability and speed of the exemplary embodiment. Further in the exemplary embodiment the controller is enabled to selectively move the position of the tamping member 96 relative to the sheets in the sheet holding compartment 98. The tamping member is enabled to move about a non-fixed pivot 112 between positions such as those shown in FIGS. 11 and 12. The ability to downward dispose the tamping member relative to the sheet stack enables compressing the stack of sheets 100 that may be present in the sheet holding compartment so as to reduce their volume. This enables accepting sheets more reliably and holding more sheets in the sheet holding compartment before the accumulated sheets need to be removed. It should be noted that the movement of the tamping member 96 is achieved through an operative interconnection with the translation mechanism which moves the compartments as shown in FIG. 4. Further the tamping member is connected to the body of the deposit holding device through the non-fixed pivot connection so that the action of the tamping member is enabled to accommodate various sized stacks of sheets within the sheet holding compartment.

Figure 13:
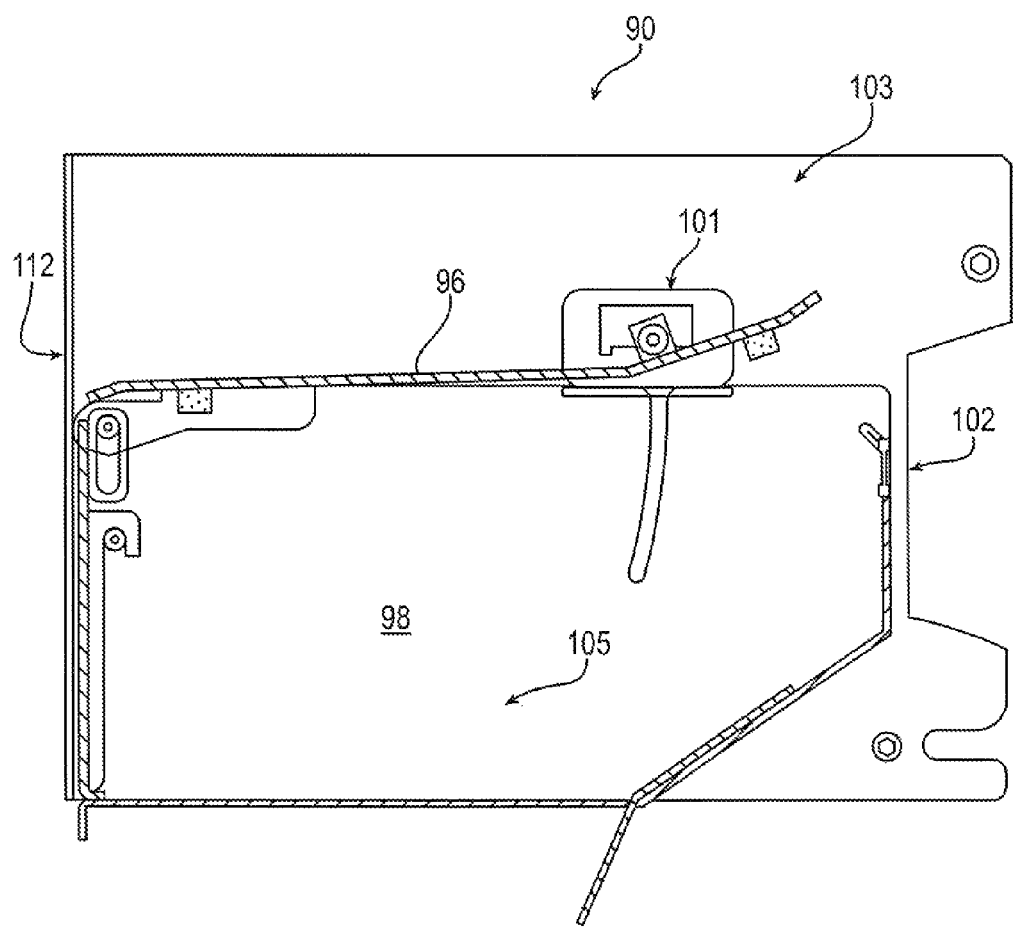
FIG. 13 is an opposite side view of the deposit holding module from that shown in FIG. 11 with a tamping member in a position for accepting entry of a sheet into the sheet holding compartment.

FIG. 13 shows an opposite hand view of the sheet holding compartment 98 and the tamping member 96. As shown in FIG. 13 the tamping member may be moved upward to a position that enables sheets to enter the sheet holding compartment when the outlet of the transport section is moved adjacent to the opening to the sheet holding compartment. In the exemplary embodiment the tamping member is moved responsive to a moving mechanism indicated 101. The exemplary moving mechanism includes a member which engages an aperture in a wall member. The wall member in the embodiment shown remains relatively stationary. Vertical movement of the module 90 is operative to selectively move the tamping member. In the position shown in FIG. 13 in which an item may be accepted into compartment 98, the tamping member is positioned so that the opening 102 is disposed between the tamping member and a closed end of the compartment generally indicated 105.

Figure 14:
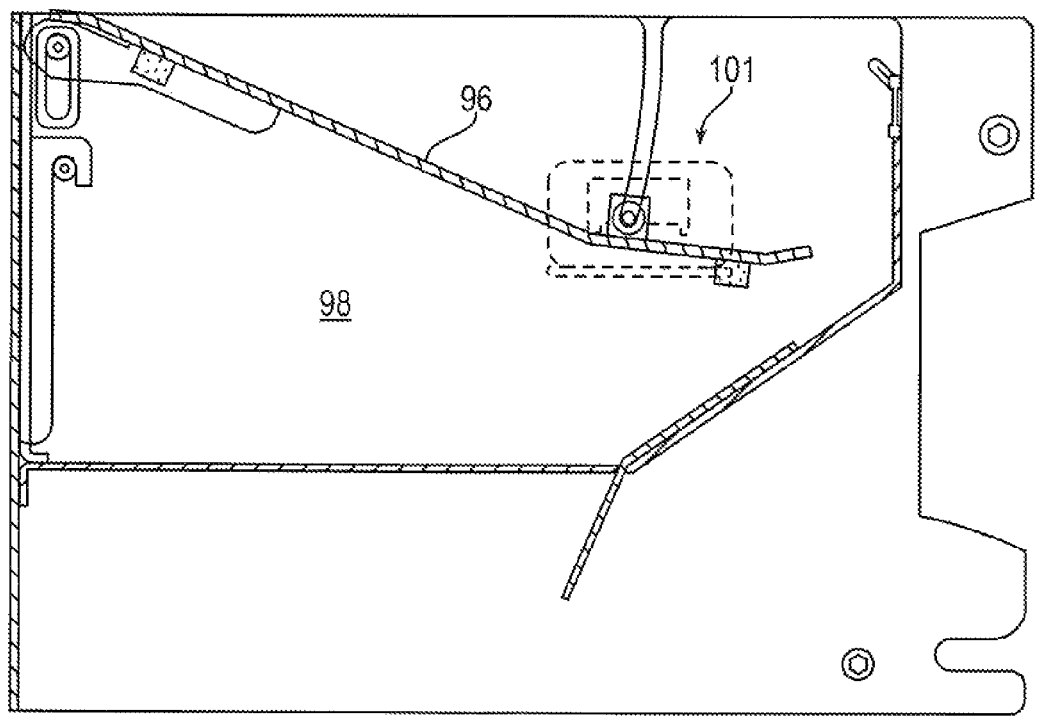
FIG. 14 is a view similar to FIG. 13 but with the tamping member disposed downward to tamp sheets held in the compartment.

FIG. 14 shows a similar view of the sheet holding compartment with the tamping member moved downward toward closed end 105 so as to facilitate the tamping of sheets which may be stored therein. An exemplary embodiment further includes the capability for authorized personnel to remove accumulated sheets from the sheet holding compartment. As will be appreciated the deposit holding module is positioned within the interior of the ATM 10. Preferably the interior of the ATM 10 includes a secure storage area or chest to which access is limited by a suitable locking mechanism. U.S. Pat. No. 5,970,890 which is incorporated herein by reference in its entirety, shows such a chest and locking mechanism. Only authorized personnel are enabled to access this area through use of an appropriate combination, key or other secure technique.

Figure 15:
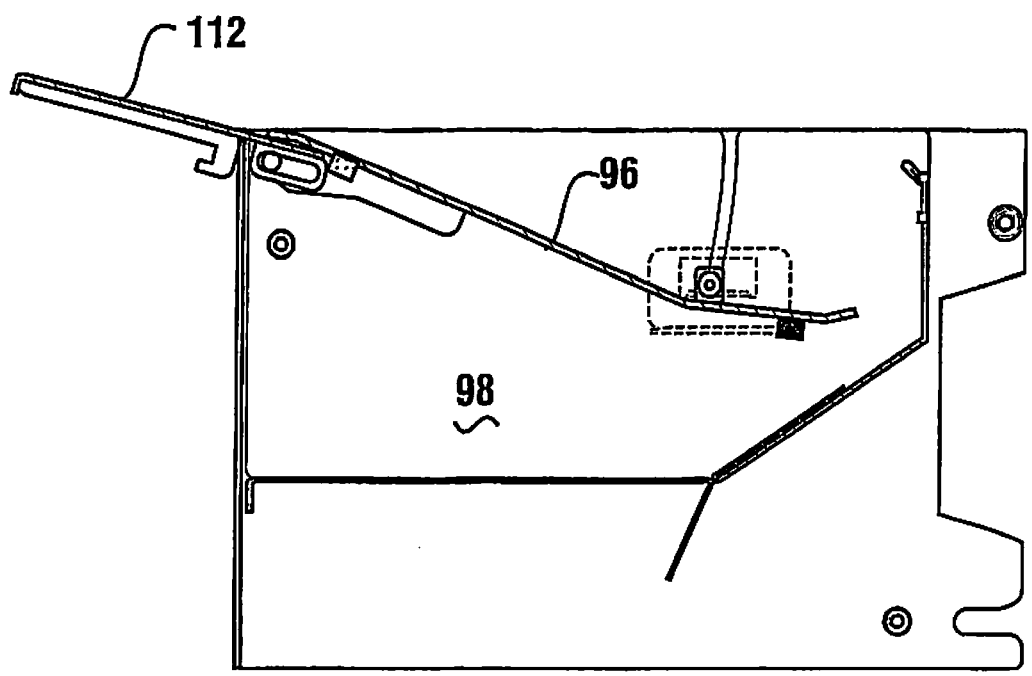
FIG. 15 is a view similar to FIG. 14 but with an access door to the sheet holding compartment in an open position.
Figure 16:
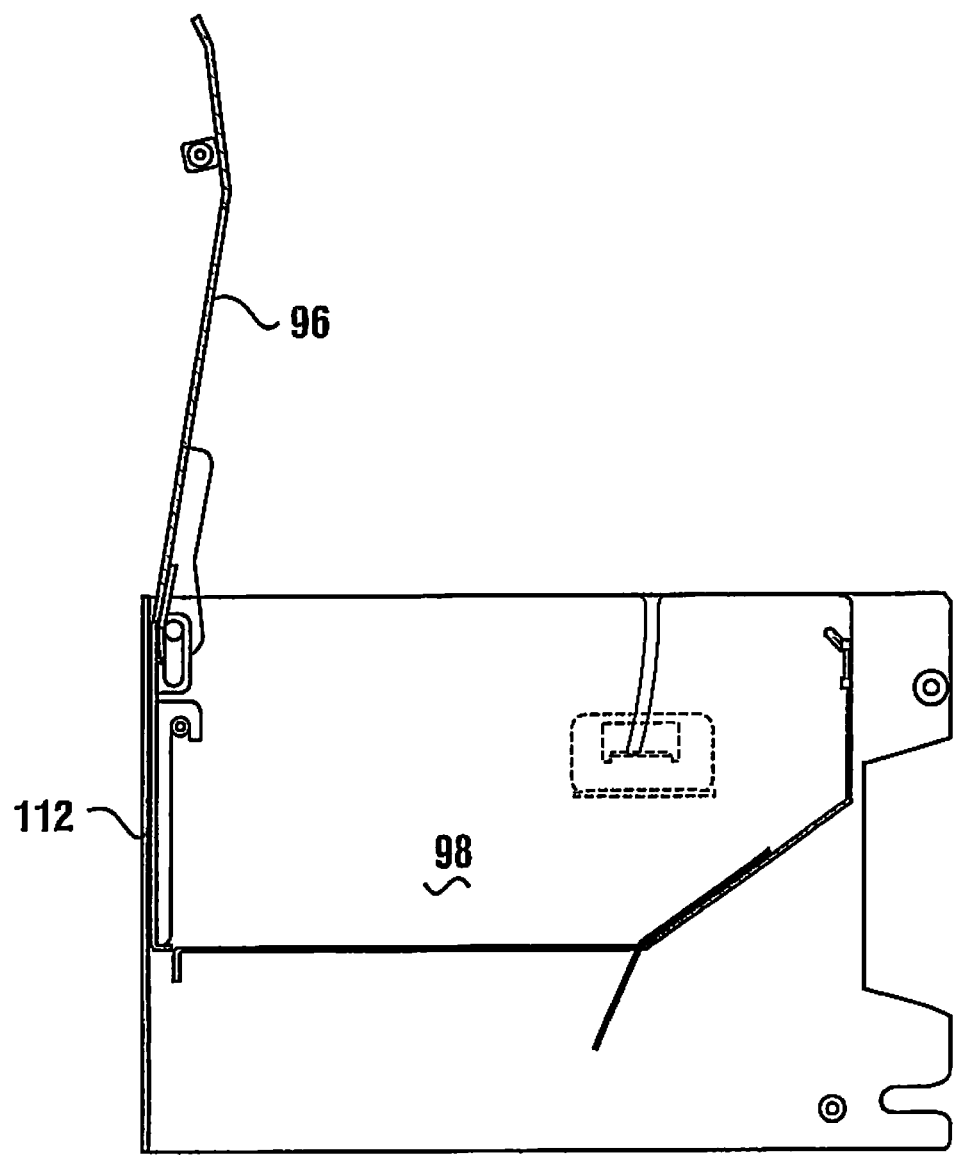
FIG. 16 is a view similar to FIG. 14 but with the tamping member disposed upward from the sheet holding compartment to enable a user to access sheets therein.

Authorized personnel who have gained access to the interior of the ATM chest are enabled to remove accumulated sheets from the sheet storage area through an access opening. This is done in the exemplary embodiment by opening an access door 112 as represented in FIG. 15. In the exemplary embodiment the access door is on an opposed side of the compartment from the inlet opening through which items enter the compartment, but in other embodiments other arrangements may be used. Door 112 in some embodiments may have in connection therewith an additional locking mechanism. Such locking mechanisms may include key, combination, electronic, biometric or other opening types. Alternatively it may be sufficient to enable door 112 to be opened by a user who has gained access to the interior of the machine. Alternatively embodiments may enable a user to operatively disengage the tamping member 96 from the mechanism which normally controls its movement and to allow the tamping member to be moved upwardly away from the sheet storage compartment 98. This is represented in FIG. 16. Such upward movement may enable an authorized user to gain access to the sheet holding compartment for purposes of removing sheets. In the embodiment shown both the capability of opening a door 112 and moving the tamping member to access accumulated sheets may be provided.

Likewise suitable mechanisms for accessing accumulated envelope deposits may be provided. This may include for example access openings and/or access doors for accessing accumulated envelopes in the envelope holding compartment 106. Alternatively the envelope holding compartment may be provided as a removable enclosure which may be removed entirely in a locked condition from the machine and replaced with a suitable empty deposit holding container. Various approaches to removing deposited items from various storage compartments may be used in alternative embodiments.

In alternative embodiments provisions may be made for permanently defacing and/or destroying accepted items such as cancelled checks. This may be appropriate, for example, in situations where an electronic image of the check has been captured and the electronic image serves as an image replacement document for the paper check. In such embodiments, after the check has been imaged either immediately or after a determined holding period, the cancelled check may be suitably destroyed. Various methods for destruction may include, for example, shredding, chemical treatment, incineration or other approaches. Of course combinations of such approaches may also be used. Further in some exemplary embodiments provision may be made to transfer the remnants of destroyed checks out of the housing of the banking machine and into a suitable waste receptacle. Such a waste receptacle may be provided, for example, at the rear of the machine or other location that can be connected to an opening from the machine. Thus for example in one exemplary embodiment checks that have been imaged and cancelled may be treated with a suitable ink or other material to obliterate information on the check, and the check shredded by a suitable paper shredding mechanism. Thereafter the remnants of the check may be transported by rollers, belts, air pressure or other suitable means out through an opening of the machine into a waste receptacle. This exemplary approach enables the machine to run for an extended period of time without having to remove cancelled checks from the interior of the housing. Of course it should be understood that this approach is merely exemplary and in other embodiments other approaches may be used.

Figure 17:
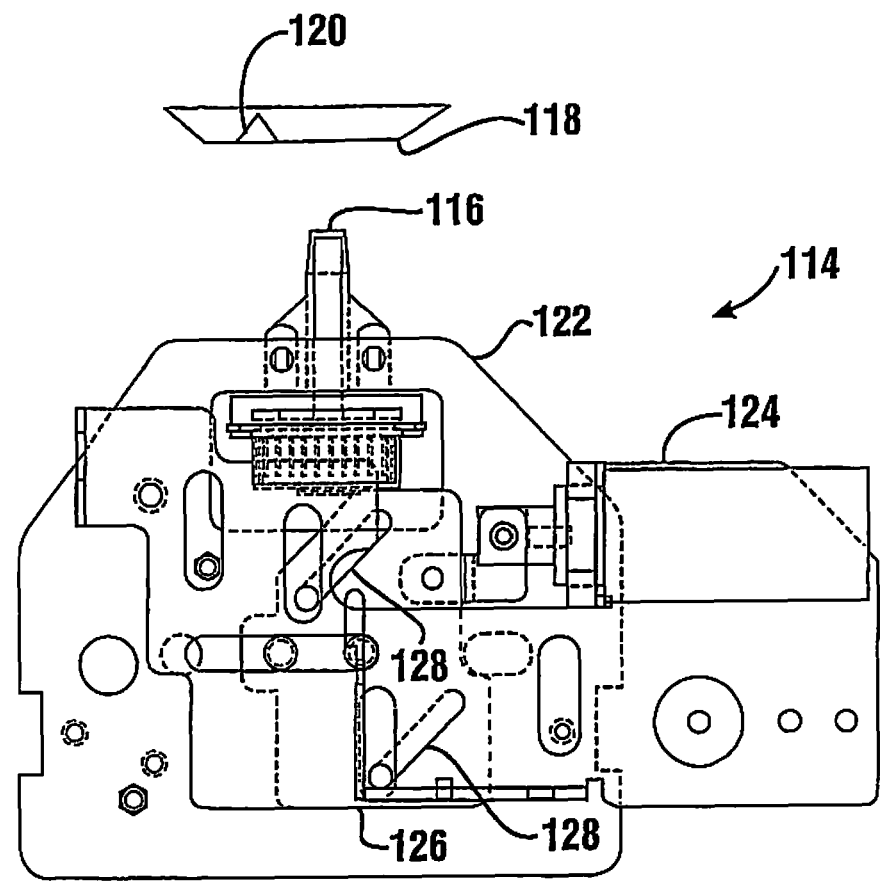
FIG. 17 is a side view of a printing mechanism used in connection with the deposit accepting apparatus shown in FIG. 4 with the printer shown in a non-printing position.
Figure 18:
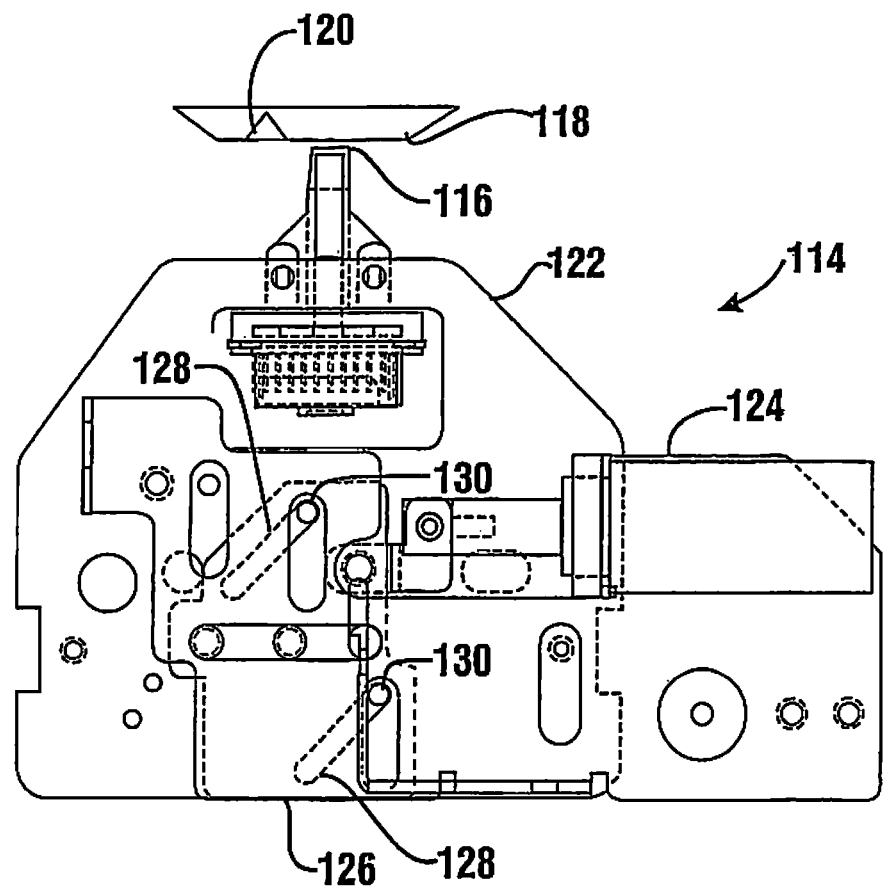
FIG. 18 is a view similar to FIG. 17 but with the printing mechanism shown in a printing condition.

Referring again to FIG. 4 the exemplary embodiment of the IDM 44 includes a printing mechanism 114. Printing mechanism 114 which is shown in greater detail in FIGS. 17 and 18 is operative to enable printing indicia on deposited items responsive to control of the terminal processor. Such printing may be used in the exemplary embodiments to print identifying indicia on deposited envelopes or documents. Alternatively such printing may be used to indicate the cancellation or acceptance of items placed into the machine by a user and which are stored in the machine or returned to the user from the machine. It should be understood that although in the exemplary embodiment the printer is shown on a first side of the transport path, in other embodiments the printer may be positioned on an opposed side of the transport path. Alternatively printing devices of similar or different types may be positioned on both sides of the transport path in some embodiments.

In the exemplary embodiment the printer 114 is operative to minimize the risk that the printer will snag or damage deposited items that are moved adjacent to the printer in the transport section 46. Printer 114 includes a suitable print head 116. Print head 116 is directed towards items which may pass the printer mechanism in the transport section. A registration platen 118 is positioned in opposed relation of the print head on the upper section of the transport. As schematically represented, a sensor 120 is positioned adjacent to the print head so that the presence of deposited items adjacent thereto may be sensed.

In the exemplary form of the printer mechanism the print head 116 is mounted in supporting connection with a support plate 122. The support plate is movably mounted relative to a frame of the IDM 44. An actuator 124 is selectively operative responsive to signals from the terminal processor to move the support plate 122 and the print head 116 selectively adjacent to or away from deposited items which move through the transport section. The actuator 124 accomplishes such movement of the print head by moving a bracket 126 in a generally horizontal direction. Bracket 126 includes angled guide slots 128 therein. Pins 130 extend in the angled slots and are operatively connected to support plate 122. The movement of bracket 126 between the positions shown in FIGS. 17 and 18 are operative to cause the print head to move between non-printing and printing positions.

In the exemplary embodiment one or more sensors represented schematically as a sensor 120 are used to indicate to the terminal processor that the deposited item is moved adjacent to the printer. The terminal processor operates to then move the printer into the printing position at a time when the leading edge of the deposited item has already moved to a position beyond the print head 116. This reduces the risk that the deposited item will snag on the print head and will be torn or otherwise damaged by engagement therewith. It should be understood that printing may be conducted with the items moving through the transport section 46 in either direction adjacent to the print head. In this way indicia may be printed on deposited items as they move either toward or away from the deposit holding module. This enables printing on items which are either stored in the machine or which are accepted, marked or otherwise printed upon and then returned to the customer. It should further be understood that the particular configuration of the printing mechanism is exemplary and in other embodiments, other types of printing mechanisms and arrangements may be used.

Figure 5:
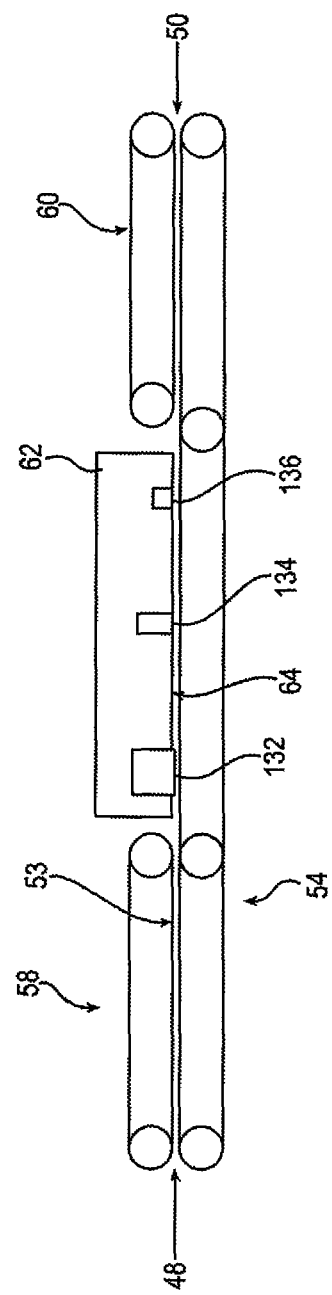
FIG. 5 is a schematic view of the deposit accepting apparatus shown in FIG. 4.
Figure 6:
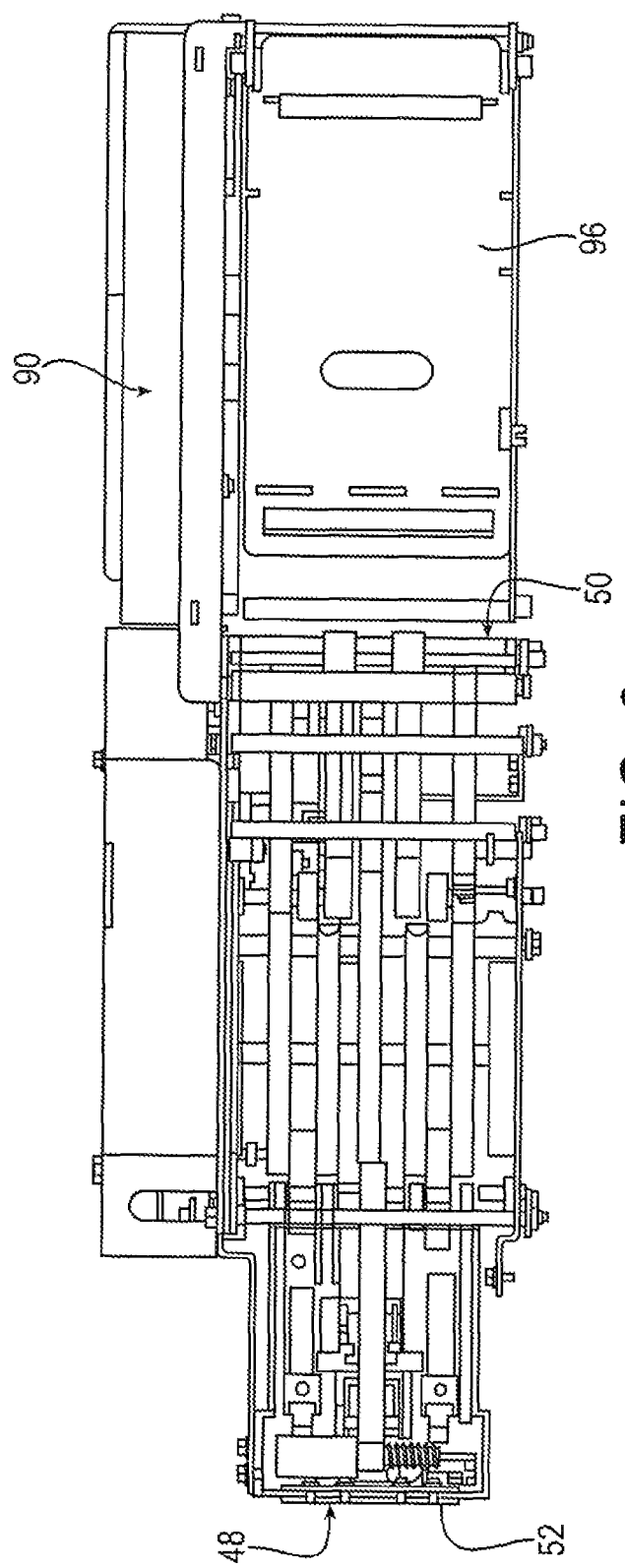
FIG. 6 is a top view of the deposit accepting apparatus shown in FIG. 4 with the analysis module removed therefrom.

In the exemplary embodiment the analysis module 62 includes optical scanning sensors schematically indicated 132 in FIG. 5. The analysis module may include an imaging device for scanning checks or other documents. The imaging device includes scanning sensors 132 operative to generate an image of documents that move adjacent to the analysis module. In the exemplary embodiment the scanning sensors scan generally the entire transverse path through which documents may travel in the transport section. The scanner in the described exemplary embodiment generates radiation in the visible range and resolves images at approximately 240 dots per lineal inch. The scanning sensor is also operative to have a focal length which corresponds to the distance that the scanned documents are disposed from the surface of the sensor as they pass the analysis module. In the exemplary embodiment the scanning sensor 132 has a focal length of about 4 millimeters. The exemplary embodiments may include linear arrays of charge couple devices (CCDs) or other types of sensors operative to sense and produce an electronic representation of indicia. Of course in other embodiments other types of scanning sensors may be used. Such other types of sensors may include emitters and sensors for sensing radiation at discrete frequencies in the visible or non-visible range. Other imaging devices may include devices that produce data corresponding to square arrays of pixel data such that all or selected areas of documents may have image data produced therefor simultaneously. In addition multiple sensor types may be used on one or both sides of documents. Various types of sensors may be used. The sensors of the exemplary embodiment are operative to provide image data which is electronic data which corresponds to a full and/or partial image of one and/or both sides of a check or other item.

The exemplary analysis module further includes magnetic sensing elements 134. The magnetic sensing elements 134 are operative to sense the magnetic properties of documents which pass adjacent to the analysis module. In the exemplary embodiment the magnetic sensing elements 132 include a plurality of discrete transversely spaced magnetic sensors. The magnetic sensors generally each cover a relatively small portion of the overall transport width. The sensors are arranged in sufficient proximity so that substantially the entire transverse width of the document path is sensed. The analysis module further includes a magnet 136. Magnet 136 may comprise a unitary or a plurality of permanent or temporary magnets. In the exemplary embodiment permanent magnets are used. The permanent magnets operate to activate magnetic properties of magnetic inks on documents passing adjacent to the analysis module. These magnetic properties may then be more readily sensed by the magnetic sensing elements 134.

It should be understood that the particular sensors and devices in analysis module 62 are exemplary. Other embodiments may include only an optical scanner or magnetic sensing elements, or different or additional types of scanning and sensing elements. For example embodiments may include scanners for reading bar code or other types of optical indicia. Other embodiments may include devices for reading magnetic flux reversals that may be encoded in a magnetic media. Some embodiments may include read heads for reading micr data or other types of magnetic indicia. Other embodiments may include devices which are operative to detect the presence of holograms or to read non-visible radiation, fluorescent inks, or other types of coding. The particular activating and sensing devices included in a particular analysis module will depend on the particular types of documents to be verified and analyzed through operation of the particular embodiment.

Figure 3:
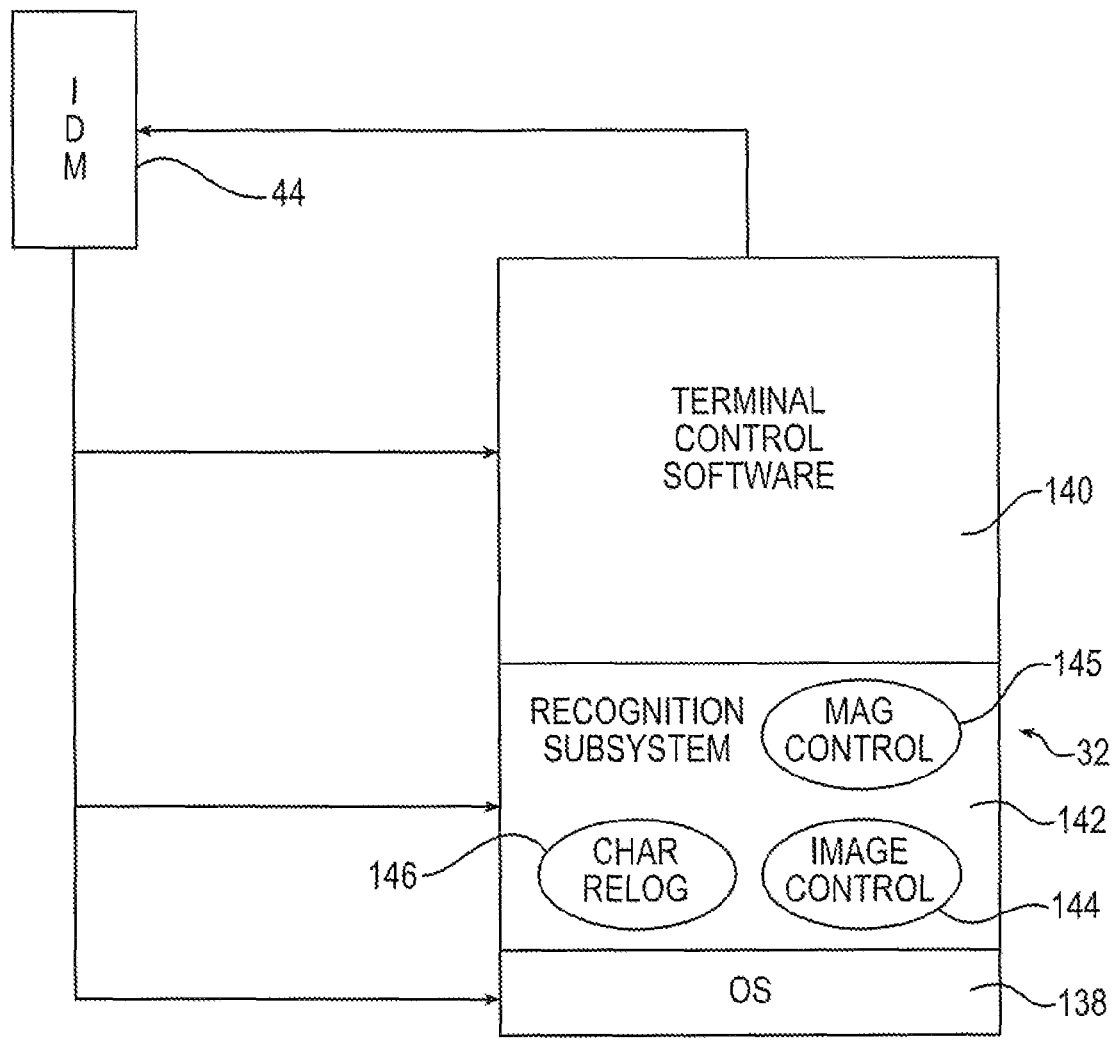
FIG. 3 is a schematic view of software components used in connection with the automated banking machine shown in FIG. 2.

FIG. 3 shows schematically the relationship of the IDM 44 with exemplary software components which operate in the exemplary terminal processor 32. The terminal processor 32 has operating therein an operating system layer schematically indicated 138. The operating system layer 138 may include operating systems such as OS/2® from IBM, Windows NT® or Windows XP® from Microsoft, Linux or other suitable operating system. The operating system communicates with a terminal control software layer 140. The terminal control layer in the exemplary embodiment operates to control numerous aspects of the ATM functions including aspects of the transaction function devices. As schematically represented in FIG. 3 the terminal control software sends messages to and receives messages from devices associated with the IDM 44. The messages are generally operative to control mechanical components of the IDM as well as to receive inputs from sensors and other devices which operate in connection with the deposit accepting function.

The exemplary software architecture also includes a recognition subsystem software layer 142. The recognition subsystem layer also communicates with the operating system layer and the terminal control software layer to control and receive inputs from the IDM. The recognition subsystem layer includes software which functions to control, manipulate and analyze image data received from the IDM as schematically represented by image control component 144.

Another software component of the exemplary recognition subsystem layer accomplishes character recognition. This character recognition component schematically represented 146 in the exemplary embodiment is operative to identify micr coding and numerical characters. In the exemplary embodiment the character recognition software includes software that is commercially available from Carreker Corp. a division of Fiserv. Other providers of character recognition software include Parascript, Mitek and A2iA. Of course other suitable recognition software may be used. The recognition subsystem 142 of the exemplary embodiment also includes a magnetic data control component schematically represented 145 that is operative to analyze and to manipulate data received from the magnetic sensing elements and to check for correlation between the magnetic data that is sensed and the optical data which is obtained from the scanning activity. Of course these software functions are exemplary and these functions may be programmed differently and other or additional software components may be included in other embodiments.

Figure 19:
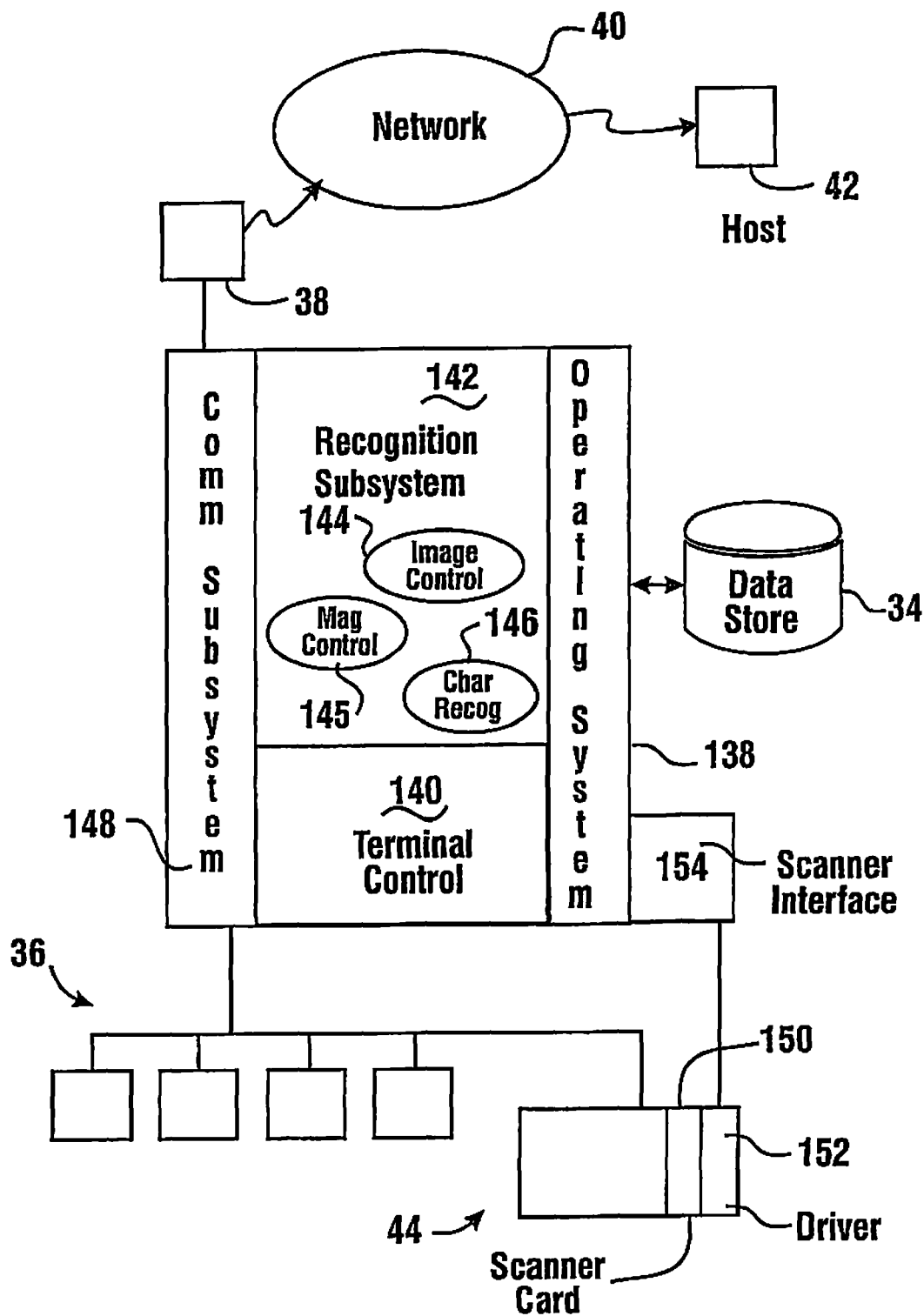
FIG. 19 is a schematic view of hardware and software components used in connection with the deposit accepting apparatus and the automated banking machine of the exemplary embodiment.

FIG. 19 shows the exemplary schematic components of the software in greater detail. As can be appreciated the operating system 138 in the terminal processor is in operative connection with one or more data store 34. The data store may include the information concerning programs, transactions and other data or program logic which are necessary to control the operation of the ATM. In addition the data store includes the data used in connection with analyzing and verifying documents. As later discussed the data store may also include image data corresponding to the images of documents that have been accepted by the system. The software in connection with the exemplary terminal processor also includes a communication subsystem layer 148. The communication subsystem layer enables communication between the various software components of the system. The communication subsystem layer also communicates with the various transaction function devices 36 through appropriate interfaces or drivers. In addition communication layer 148 in the exemplary embodiment also enables communication through appropriate interfaces 38 to one or more communications networks 40 and the host computers 42 which are operatively connected thereto.

In the exemplary embodiment the IDM 44 includes an onboard computer processor which resides on a scanner card 150. The scanner card 150 further receives and operates upon data from the optical scanning sensors 132 on the analysis module 62. The scanner card further has included thereon a driver schematically indicated 152. The driver is operative to communicate through a scanner interface 154 with the operating system 138 and the data store 134. The driver 152 is also operative to control the scanning activity which is carried out by the scanner card 150. In the exemplary embodiment the driver is also operative to control the allocation of memory for use in the scanner operation. This assures that adequate memory is available in RAM to carry out the capture, storage and analysis of the scanning data as required to analyze and authenticate documents which may be input in the machine.

Figure 20:
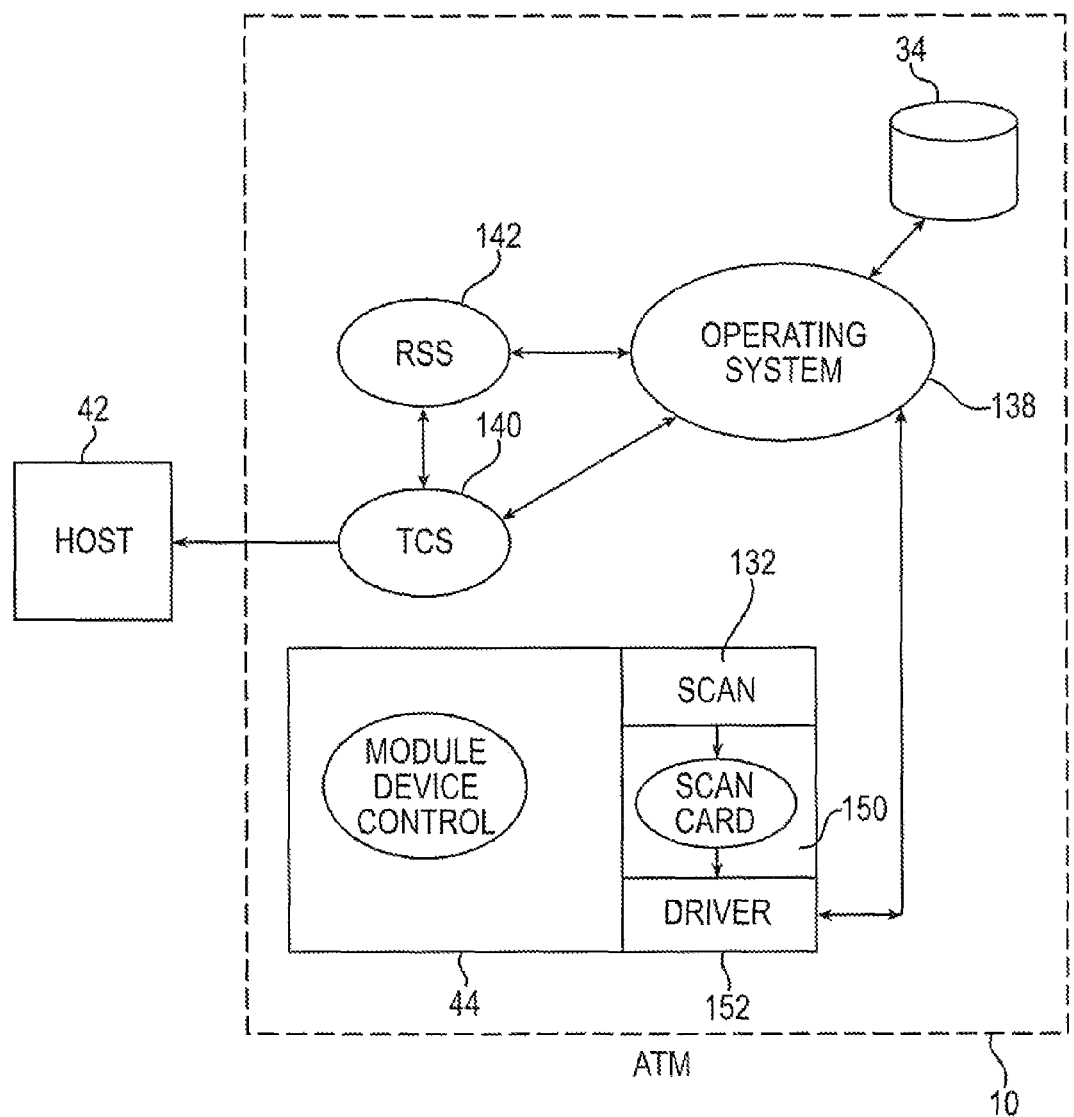
FIG. 20 is a schematic view of the interaction of components used in connection with accepting documents in the deposit accepting mechanism.

As represented in FIG. 20 in the exemplary embodiment, when a document is to be scanned the terminal control software 140 causes the particular document to be moved as desired in the IDM 44. This is done by controlling the various devices which sense and move documents in and through the module. The terminal control software 140 operates in conjunction with the recognition subsystem 142 which provide instructions to the scanner card 150 to scan documents using the optical scanning sensors 132 during the appropriate time periods. The image data from the scanning process and magnetic sensing operations is returned through the operating system to memory. The data is then recovered from memory and manipulated responsive to the image control and character recognition features of the recognition subsystem 142. The results of the manipulation and analysis of the scanned data is then communicated through the terminal control layer to a remote host 42. This is done in this exemplary embodiment using transaction request and authorization messages of a type that can be handled within the framework of ATM transaction processing systems. However it should be understood that in other embodiments of the invention other approaches to authenticating documents, verifying transactions and communicating with remote computers may be used.

The operation of an exemplary embodiment will now be explained with reference to some exemplary deposit transactions. A first deposit transaction to be described will be the deposit of an envelope type deposit into the ATM 10. This is accomplished through the execution of computer instructions by the terminal controller which causes the machine to carry out the logic flow which is schematically represented in FIG. 29.

In this exemplary transaction the ATM first acts to receive identifying data from the customer. This may include for example the input of an article such as a credit or debit card which is read by a card reader in the machine. Such cards commonly include information such as a user's name and/or primary account number ("PAN"). This primary account number includes data which can be used to identify the user and/or the user's institution and account number. Further when the user is operating the ATM with a debit card the user is required to input further identifying data to verify that the user is authorized to access the account. Usually this verifying input includes a personal identification number ("PIN"). The PIN may be input through an input device such as a keypad. In alternative embodiments other types of identifying data may be input. This data may include for example biometric data such as iris scans, retina scans, thumbprints, facial features, voice prints or other features of a user or an article carried by the user that provides identifying data.

At the second step in the logic flow of the exemplary embodiment, the machine operates to receive from the user at least one input which corresponds to the transaction type that the user desires to conduct. Often this is done in response to the terminal processor presenting the user with an output on the display which corresponds to various transaction options. The user is then enabled to select a transaction by providing an input through one or more buttons or other input devices. In this example the user will indicate that the transaction type to be conducted is an envelope type deposit.

In a third step the ATM is operated to receive from the user an input amount that is associated with the deposit transaction. Generally this will be provided as an input in numeric form to a keypad or other input device on the machine. This numeric input which may be provided in response to a prompt on a display screen or other output device, will generally correspond to the value of the funds or other items included in the envelope deposit.

The terminal processor operating the ATM acts in a fourth step to cause an authorization request to be sent to the remote host computer. This authorization request in the exemplary embodiment includes data representative of the identifying data, the transaction type and the amount involved. This authorization request is sent through one or more networks to the appropriate host computer which may authorize the transaction. The host computer then operates in response to the authorization request to determine if the identifying data validly corresponds to an authorized user and/or account. The host computer also determines if the customer is authorized to conduct the requested transaction. The host computer then operates to formulate a transaction response which is sent from the network back to the ATM.

The ATM receives the response from the host computer at a fifth step. If the transaction is not authorized the instruction data included in the response message operates to cause the ATM to advise the customer that the transaction cannot be performed, and then the terminal processor performs steps to close the transaction. In this example it will be presumed that the response message returned includes instruction data indicating that the transaction is authorized and may proceed. In response to receiving the response message indicating that the transaction may go forward, the terminal processor operates in accordance with its programming to execute the steps necessary to cause the ATM to accept the envelope deposit. In a sixth transaction step the terminal processor is operative to cause the gate 52 to open at the inlet 48 to the transport section 46. This enables the user to access the transport section.

In a seventh step the terminal processor is operative to cause the deposit holding module 70 to move so that the envelope holding compartment 106 is in alignment with the outlet 50 of the transport section 46. The terminal processor is then operative to run the transport of the IDM 44 such that the envelope may be accepted therein. As previously explained sensors may be provided adjacent to the inlet to the transport such that the inlet transport section 58 provides limited slip engagement initially with the deposited envelope. Upon sensing that the envelope is entered further so that the envelope is substantially within the transport, the terminal processor may be operative to cause the envelope to be engaged more firmly with the moving members of the transport. Alternatively the envelope may be fully transported in limited slip mode.

The envelope is then moved between the moving members of a transport past the analysis module 62. In response to the at least one customer input which indicates that an envelope type item is being deposited the terminal processor of the exemplary embodiment does not operate the analysis module to read indicia on the envelope. The terminal processor operates in accordance with its programming to formulate the indicia comprising characters or other identifying data that will be printed on the deposited envelope. This identifying data may be human language characters or other data or character sets which are sufficient to identify the deposit as associated with a particular transaction or the user at the time of verifying the contents of the envelope. This data may be derived from customer inputs, the ATM, the host computer, or combinations thereof.

In a ninth step the envelope is sensed as in a position where it is adjacent to the printer mechanism 114. In the exemplary embodiment the terminal processor operates in response to signals from sensor 120 that indicate that the leading edge of the envelope has passed the print head and will not be caught thereon if the print head moves to the print position. Upon sensing the envelope in the ninth step the terminal processor causes the printer to move into position adjacent the envelope and to print the identifying data on the envelope. The terminal processor continues to run the moving members in the transport until the envelope is sensed by appropriate sensors as having passed into the envelope compartment.

The terminal processor then operates in accordance with its programming to cause a transaction receipt to be printed and presented to the customer. The terminal processor in this exemplary transaction then operates in a next step to provide an output screen to prompt the user to indicate whether they wish to conduct a further transaction. For purposes of this example it will be presumed that the user declines such a further transaction.

In a fourteenth step the terminal processor operates in response to the user input declining further transactions to close the transaction. This may include for example returning the customer's card, presenting a "thank you" screen, storing a record of the transaction in memory and doing other things necessary to complete this transaction and to ready the machine to conduct another transaction. The terminal processor also operates in a fifteenth step to formulate and send a completion message to the host computer. The completion message preferably indicates whether the requested transaction was carried out successfully by the machine. The host computer in response will operate to include a record in an associated data store that the customer has made a deposit in a particular amount. Generally however such a deposit will not be credited to a user's account until the content of the envelope is verified. Of course this depends on the particular institution and their policies and practices.

The operation of the ATM 10 will now be described with reference to an exemplary transaction involving the deposit of a check or similar instrument. In this transaction the logic flow described in connection with FIGS. 30 through 33 is carried out.

In a first step shown in FIG. 30 the ATM operates to receive identifying data from the user in the manner previously discussed. In a second step the user identifies the particular transaction type to be associated with the transaction. In this case the user may indicate that they are depositing a check or alternatively that they are cashing a check or other document. Because both types of transactions are related, they will be described in connection with the exemplary logic flow as though the user had selected the option of cashing a particular check. It should be understood however that generally a user will be electing either to apply the amount of the deposited check to their account, or to cash the check.

At a third step in the transaction flow shown in FIG. 30 the user provides inputs corresponding to the amount associated with the transaction they wish to conduct. As optionally indicated in the fourth step, the institution operating the ATM machine may charge a check cashing fee or similar fee for the convenience of cashing the check. If this is the case, an appropriate message will be output to the user through the display of the ATM. The user may be requested to provide an input to indicate their acceptance of the transaction fee. If the user indicates that they do not wish to accept the fee or the user does not provide an input within a predetermined time period, the terminal processor may operate to close the transaction and return the machine to a ready state to conduct a transaction for another user. For purposes of this example it will be presumed that the user has indicated that they wish to proceed with the transaction.

In response to these inputs the terminal processor operates in accordance with its programming to open the gate 52 adjacent the opening to the transport section 46 of the IDM 44. The terminal processor also operates as indicated a sixth step to move the depository holding module 90 to a position in which an appropriate check holding compartment is in communication with the outlet 50 of the transport section.

Figure 26:
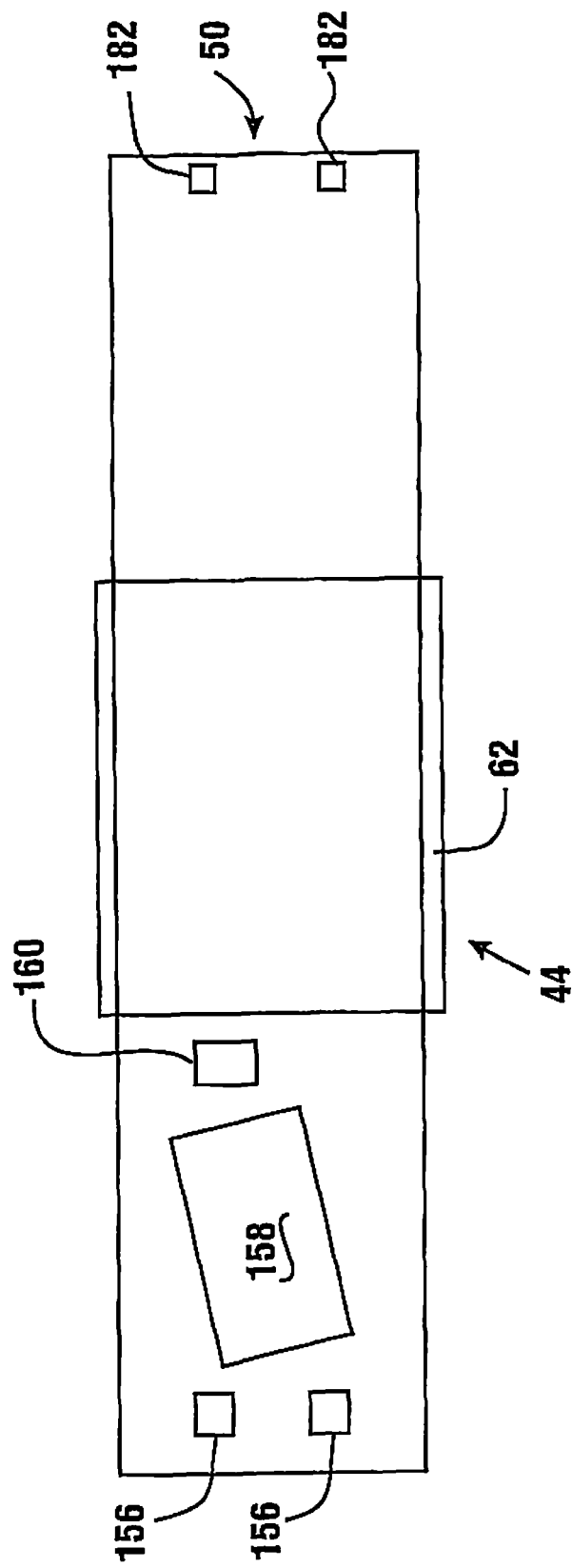
FIG. 26 is a top schematic view of the exemplary deposit accepting apparatus showing a document accepted therein in a skewed position.

The terminal processor next operates to cause the running of the moving members in the transport section to receive the document therein. As represented in FIG. 26 entry sensors 156 operate to sense an item, which in this case is check 158 entering the transport section. The sensing of the entered item by sensors 156 may be operative as previously discussed to cause the inlet transport section 58 to first run in a manner providing limited slip. Thereafter when the item has cleared the entry sensors 156 or otherwise moved further or substantially into the transport, the moving members more firmly engage the deposited item. As can be appreciated during the time of limited slip, the item may move angularly relative to the direction of movement longitudinally along the transport path as the result of the user holding the item or due to the guiding action of the walls bounding the opening or other guide device structure.

As represented in FIG. 26 the exemplary embodiment includes at least one throat sensor 160 adjacent to the analysis module 62. The terminal processor is operative in a ninth step to measure the document length. This is done for example based on the transport speed and the time that the document takes to pass the throat sensor 160. Because in the exemplary embodiment it can be assumed that generally no slippage of the document occurs after it has firmly engaged the transport, the time that the document blocks the throat sensor generally provides a relatively accurate indication of document length. Of course in other embodiments equivalent mechanisms such as encoders on driving members or other devices may be used. The document length is calculated in the exemplary embodiment by the terminal control software. It should be understood however that this technique is exemplary and in other embodiments of the invention other approaches may be used.

Figure 21:
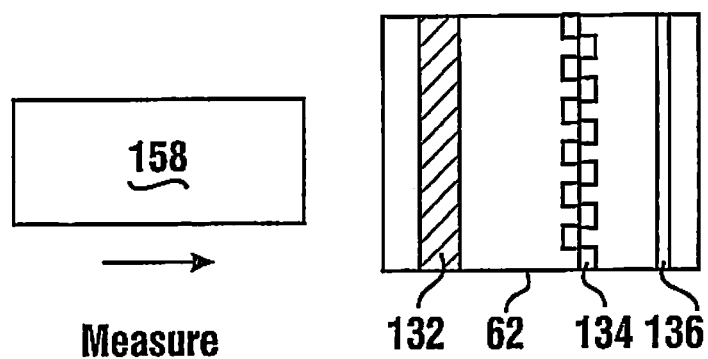
FIGS. 21-25 are schematic views representing a series of steps executed through use of the deposit accepting apparatus in connection with accepting a check in the machine.
Figure 22:
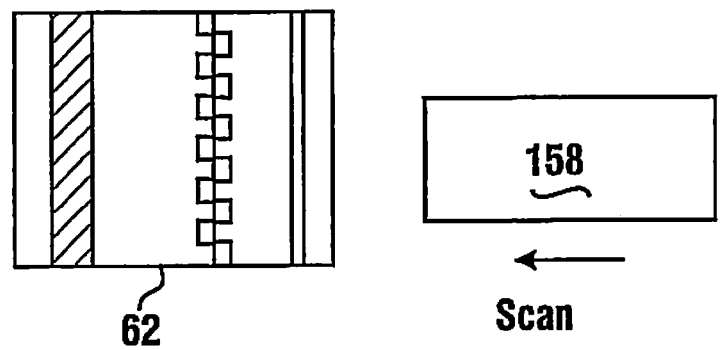
Figure 23:
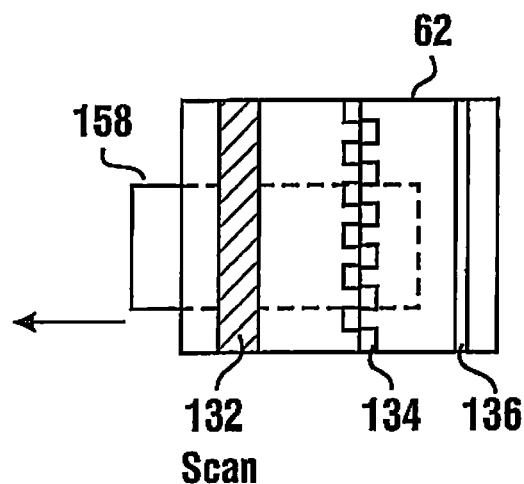
Figure 27:
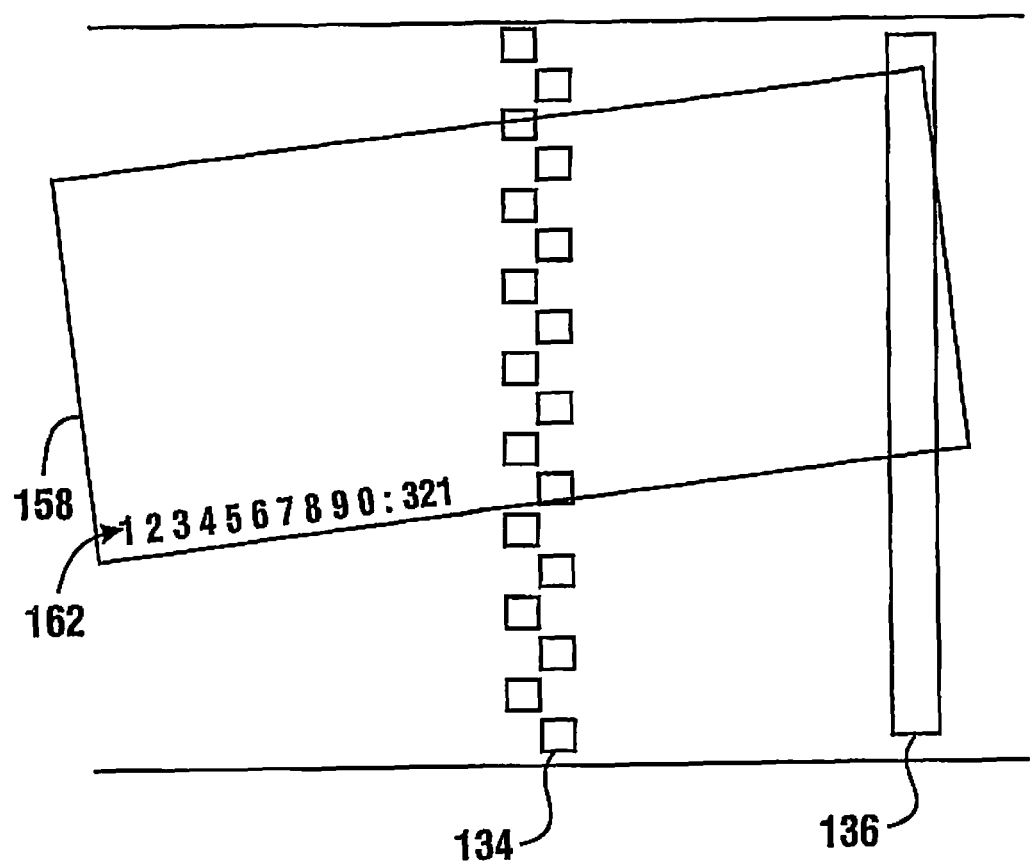
FIG. 27 is a schematic view of a check adjacent an analysis module in the deposit accepting apparatus of the exemplary embodiment and the devices used for sensing magnetic properties thereof.

As schematically represented in FIG. 21, during the step of measuring the document, the document is moved past the analysis module 62 to a position intermediate of the analysis module and the deposit holding module. This position of document 158 is represented in FIG. 22. The document at this point is in a "ready to scan" position. The terminal processor next operates in accordance with the eleventh step in FIG. 30 to move the document in the direction of the arrow shown in FIG. 22. The document is then moved past the optical and magnetic sensors in the analysis module 62 as represented in FIG. 23. As the document moves past the analysis module, the terminal control software and recognition subsystem software gather the image and profile data that is used to analyze and/or produce an electronic image of the document. As the check 158 passes the magnet 136 the magnetic ink thereon is magnetized. This magnetized ink is then sensed by the magnetic sensors 134 which provide a profile of the area in which magnetic ink is present. This is represented in greater detail in FIGS. 27 and 28. For example in the exemplary embodiment as shown in FIG. 27, check 158 includes a line 1620f micr coding. This line of micr coding (alternatively referred to herein as the micr line) causes signals to be produced by the magnetic sensing elements 134 as the characters pass such sensors. As represented in FIG. 27 document 158 may be skewed relative to the transport section through which it passes. However regardless of whether the document is straight or skewed it will produce a magnetic profile.

A magnetic profile associated with the document is indicative that the document is genuine. This is because photocopies or other simulated checks generally would not include magnetic coding. Thus the sensing of any magnetic coding on the document by the analysis module suggests that the document that has been inserted is a genuine check. However as later discussed alternative embodiments may include approaches for reducing the risk that the check is a forgery that has been produced using magnetic inks.

Figure 28:
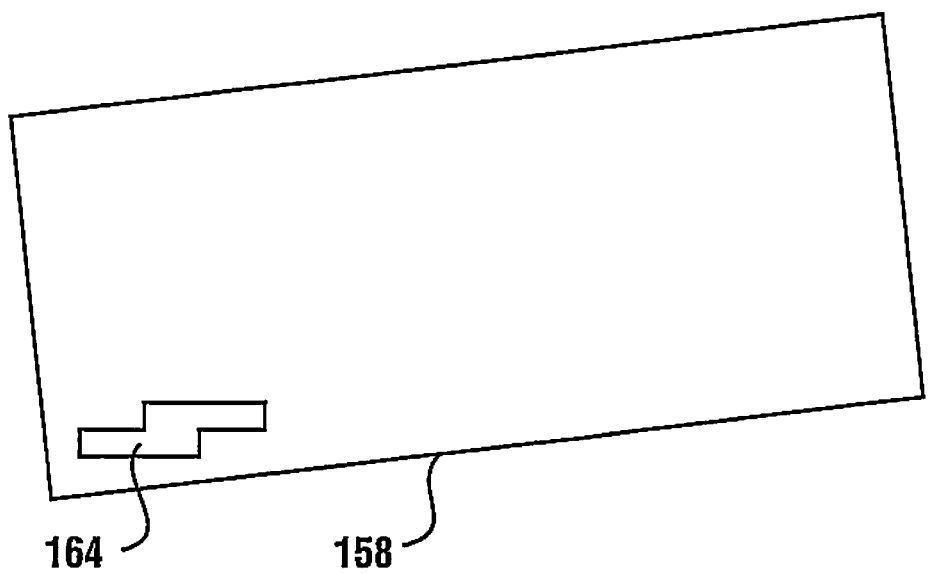
FIG. 28 is a schematic view of an exemplary magnetic profile generated by the document shown in FIG. 27.

FIG. 28 indicates specifically the magnetic profile sensed as the document passes the magnetic sensors. This magnetic profile indicated 164 includes data which indicates the magnetic areas on the check. This magnetic profile is correlated in the exemplary embodiment by the recognition subsystem with the optical profile to further verify that the check is genuine. Of course this technique is exemplary and in other embodiments other approaches may be used.

As also represented in FIG. 23 movement of the document past the scanning sensors 132 causes data to be produced which is indicative of the optical characteristics of the document passing in the transport section. This optical data comprises appearance data which corresponds to an electronic image of the check that is captured through operation of the scanner card and included in the data store associated with the ATM. The scanning process is continued as the check 158 moves past the analysis module 162 as shown in FIG. 4.

As indicated by the twelfth step in the logic flow in FIG. 30 the terminal processor next operates to apply the rules which are associated with the programs stored in memory concerning the particular type of document associated with the transaction. Generally at least one input by the customer indicating that they are making a check deposit may be correlated with certain stored data or rules which indicate the particular characteristics of the document that is to be received. In some cases the inputs may correspond to a particular sized document. Alternatively the rules may correspond to particular configurations or other characteristics. In this example the rules stored in memory are also indicative of "windows" or particular areas in the document landscape in which data which should be analyzed on the document may be found.

Figure 34:
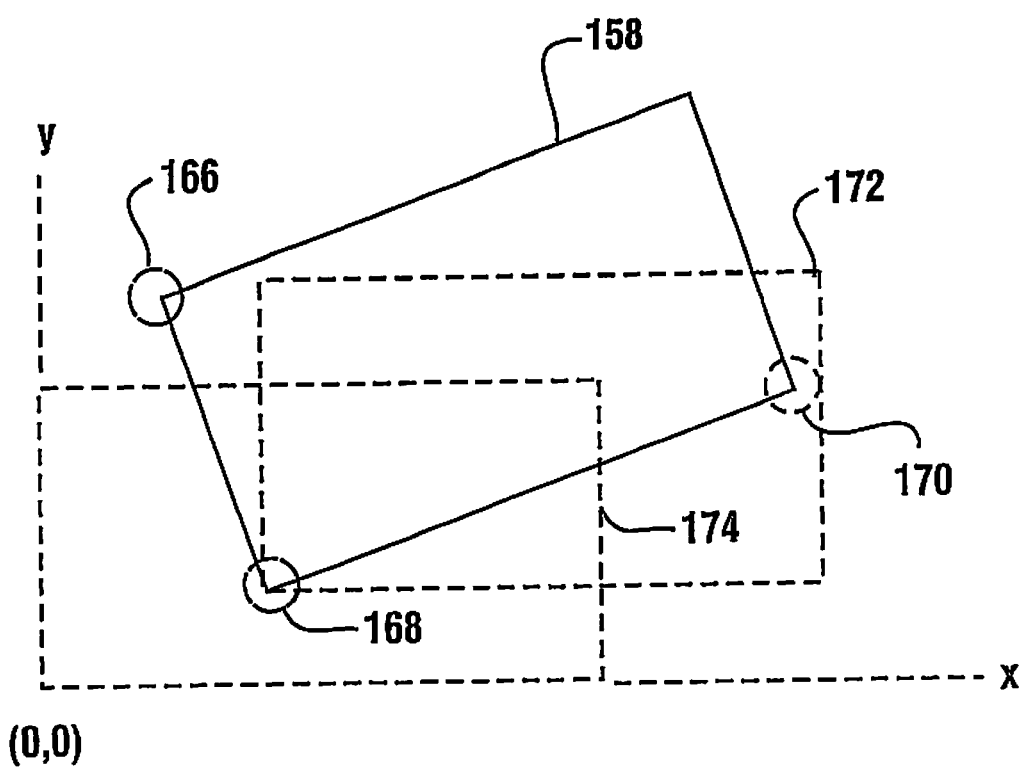
FIG. 34 is a schematic view showing how data representative of an image of a deposited instrument is modified and aligned in an exemplary embodiment for purposes of analysis.

In accordance with the exemplary embodiment which operates to analyze check 158, the terminal processor operates in accordance with the applicable rules recovered from memory as associated with a check deposit to deskew the data corresponding to the image and place it in registration with an imposed coordinate system. This is done in the exemplary embodiment through use of a programmed series of steps which finds the boundaries of the image data. This is done by comparing the pixels which make up the image and generating at least two of the lines which bound the document. By identifying these lines, one or more corners of the document may be identified. This process is represented in FIG. 34 by the skewed profile of check 158 which is shown in solid lines.

In the exemplary embodiment, after finding the two leading corners of the document 166 and 168 and the most closely adjacent trailing corner to a "x" coordinate 170, the terminal processor operates in accordance with its programming to adjust the data corresponding to the image. The exemplary terminal processor first operates to adjust the image by rotating the image data about corner 168. This causes the image to be "squared up" relative to the imposed coordinate system as represented by a phantom image 172. The computer next operates to shift the squared up image data to a reference point of the coordinate system. This shifting places the leading corner 168 at the origin of the imposed x and y coordinate system. The leading corner 166 is placed along the "y" axis while the trailing corner 170 is placed along the x axis. It should be understood that all of the pixels which make up the image data are correspondingly adjusted through this process to produce the shifted image 174 which is shown in phantom in FIG. 34.

Figure 35:
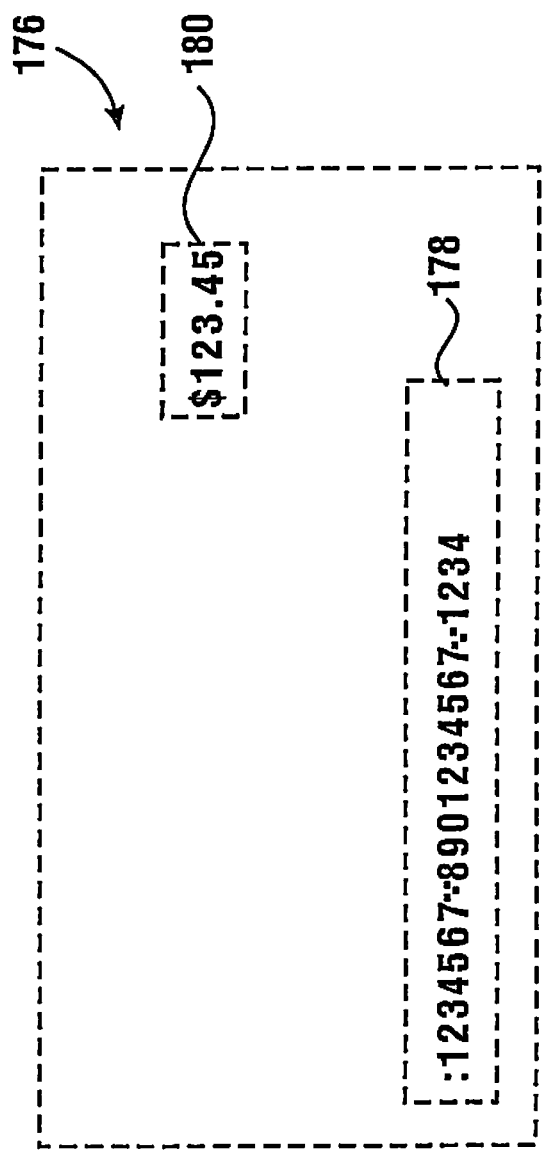
FIG. 35 is a schematic view of the application of a template for a particular type of deposited instrument to image data for an instrument deposited to the deposit accepting apparatus of an exemplary embodiment.

As represented by the fourteenth step shown in FIG. 31 the terminal processor next operates in accordance with its programming to apply template logic to the shifted image 174. The computer operates to recover from memory, data corresponding to at least one selected template. In exemplary embodiments a plurality of templates may be stored in memory and the selected one is recovered responsive to customer inputs to the machine, indicia read from the document or other data. In this step the computer operates to apply a template over the shifted image to identify for analysis "windows" within the image that contain data that is of interest. This is represented schematically in FIG. 35. In FIG. 35 a template is schematically indicated 176. Template 176 includes a first window 178 which generally corresponds to an area in which a micr line on a check may be located. Template 176 further includes a second window 180. Window 180 corresponds to an area of the landscape on the check where a courtesy amount which represents the value of the deposited check may be located. It should be understood that these windows are exemplary and in other embodiments other or additional windows may be included. Such windows may include, for example, a window for the so called legal amount which is the written or typed amount of the check. A window may also be provided for an "amount not to exceed" indicator, date, payee name, payor name or other information that appears on the check. It should further be understood that these processes for identifying windowed areas within shifted data are carried out through operation of the computer processor and the recognition subsystem software and that these graphic representations shown in the Figures merely serve to explain the nature of an exemplary form of the analysis that is carried out.

As represented in a fifteenth step shown in FIG. 41 the computer operates to analyze the appearance data in the window of the template which corresponds to the potential location of the micr line. This is accomplished by the image control component 144 of the software analyzing data from the data store. It should be understood that the data within the particular window may or may not correspond to the micr line depending on the orientation of the document as well as whether the document itself is valid.

The computer then operates in accordance with a sixteenth step represented in FIG. 31 to pass the data extracted from the window 178. This character recognition software component is operative to apply the logic used for optically reading micr symbols. In the exemplary embodiment this is a logic associated with reading e-13B type characters. The character recognition software component 146 is operative to analyze the data and make evaluations in looking for known characters of the particular type. In the exemplary embodiment the characters represented which are resolved are processed to derive ASCII values corresponding to the characters.

In a next step as represented in FIG. 31, recognition subsystem 142 is operative to check the returned data for the presence of particular characters, in this case routing and transfer characters. Generally valid micr line data will include such characters and the detected presence thereof in the data analysis is an indicator that the micr line data has been properly found and read.

At a nineteenth step shown in FIG. 31 the recognition subsystem software 142 operates to determine if the degree of assurance which is alternatively referred to as the degree of confidence, as indicated by the character recognition component for the values returned, is above a threshold. The determination of the level of assurance is based on one or more values delivered by the pattern recognition algorithms in the character recognition software component used in the exemplary embodiment. In one exemplary embodiment the threshold may be generally set at about a 70 percent assurance level. As indicated in FIG. 31 the computer operates in response to its programming to proceed based on whether the level of assurance is at or above, or below the threshold.

As indicated in FIG. 31 if the level of assurance in the determined micr values is indicated as below the threshold and/or if routing and transfer characters are not found, the recognition subsystem through operation of the image control software component, operates to further manipulate the image. In the exemplary transaction the computer operates to manipulate the data to essentially transpose and flip the image 180 degrees and to again read the appearance data in the micr line window. It should be understood that in other embodiments the data corresponding to the image may be manipulated in other ways in order to attempt to translate the image so as to find appropriate data.

As indicated in the twenty-first step in FIG. 31 the translated image data now in the window 178 is again read and passed to the character recognition software component 146. This again causes the output of ASCII values based on the characters in the window. As indicated in the twenty-fourth step these values are then checked for the presence of routing and transfer values. As indicated in step twenty-five in FIG. 31, if the micr values read have an associated level of assurance at or above the threshold and routing and transfer characters are present the recognition subsystem is operative to proceed with further analysis of the image. However if the level of assurance remains below the threshold and/or there are no routing or transfer characters, this may be an indication that the document is not valid. In some embodiments the ATM may operate to further transpose the data and conduct additional analysis. This may be particularly appropriate in situations where both sides of the document are being scanned and the document may be in different orientations. In this case the terminal processor causes the ATM to operate to return the document to the customer and to close the transaction.

As represented in the logic flow which continues in FIG. 32, if the characters in the micr window are read with a level of assurance that is at or above the threshold and the routing and transfer characters are present, the terminal processor next operates to cause the courtesy amount data in the window 180 to be read. In the exemplary embodiment the recognition subsystem operates in response to landmark rules associated in memory with the document type to assist the analysis in finding the courtesy amount within the window. These techniques may include for example in the reading of a check, looking for the box or line on which the courtesy amount is written. In this case the value is a monetary amount. The amount may be printed or cursive characters. It may also look for known characters such as the dollar sign, the fraction sign, decimal point or star characters which are commonly included in printed checks to indicate places before the dollar amount. Of course it should be understood that the particular templates and landmark rules used will depend on the programming of the machine and the type of document involved. The machine may have access to stored data corresponding to a plurality of templates and/or rules, and may apply them to documents based on data derived from customer inputs, the document, memory data or combinations thereof.

As represented in a twenty-eighth step in FIG. 32 the terminal processor further operates responsive to the recognition subsystem to binarize the appearance data in the courtesy amount window which essentially can be thought of as reducing the sensed data to black and white. This further assists in identifying the characters. The character recognition component 146 then applies its logic in looking for U.S. dollar type numerical characters within the data, and as represented in a twenty-ninth step in FIG. 32, the recognition subsystem outputs and ASCII values indicative of the courtesy amount. In some embodiments the level of assurance associated with the courtesy amount is also analyzed to determine if it is above a threshold to verify that the amount has been accurately read. Alternatively, or in addition, the derived courtesy amount may be compared to the data input by the customer concerning the amount of the check. In alternative embodiments the character recognition subsystem may operate to read the characters in the legal amount field and compare the legal amount to the courtesy amount. Alternatively or in addition, in some embodiments the micr line may include indicia representative of the amount of the check or an amount which the check is not permitted to exceed. In such cases the encoded micr data or the values to which it corresponds may be compared to the courtesy and/or legal amounts. Further in some embodiments the check may include a field that indicates a value which a check is not to exceed. This value may be read and compared through operation of one or more computers to the amount data found in the courtesy amount, legal amount, or micr line. Such comparisons may enable the machine to identify situations where the amount data is not consistent, which is indicative of an inability to properly read that check, and/or an unauthorized modification of the check data. If there is a discrepancy and/or the level of assurance is below the threshold the check may be returned and the transaction closed.

The exemplary recognition subsystem further operates in accordance with the thirtieth step represented in FIG. 32 to check for the presence of magnetic ink on the document in the proper location. This is done in the exemplary embodiments by component 145 determining the length and configuration of the magnetic profile associated with the document. This length and orientation data may be normalized in the manner of the image data based on the imposed coordinate system, and compared therewith to verify that the magnetic areas correspond to the optical data corresponding characters in the micr line. In addition certain documents may also include magnetic characters in other areas of the document. These other characters which may not necessarily be included within the optically analyzed data, may be further checked to provide an indication of the genuineness of the document. Of course in alternative embodiments as previously discussed, the mere presence of magnetic ink on the document may serve as a sufficient indication that the document is genuine.

In some alternative embodiments at least one computer in the automated banking machine may be operative to further verify the genuineness of a check presented to the machine by looking for evidence of magnetic indicia within the image data corresponding to the check in appropriate places or locations which suggest that the check may have been produced fraudulently. In such embodiments the computer may be operative to look for evidence of magnetic ink within pre-printed fields of one or more templates which would normally not include magnetic indicia. The presence of magnetic indicia in one or more of these fields may be indicative that the check may have been printed by a forger with a printer that prints in magnetic ink. This may be indicated, for example, by the data in a maker field, date field, maker signature line or other areas being presented in magnetic ink when no magnetic ink would normally be found in such areas. In some embodiments, for example, the recognition subsystem or other computer in connection with the machine may be operative to first locate the micr line within the image data in the manner previously discussed. Thereafter, the system may operate to disregard the magnetic indicia in the micr line and analyze other magnetic indicia and/or its location relative to the image data. Based on programmed parameters such as, for example, finding magnetic indicia in other printing on the check may cause the machine to identify the check as a potential forgery. In such circumstances the check will not be cashed by the machine. The check may be returned to the user or alternatively retained in the machine as a precaution to prevent the check being passed in another location. Alternatively in some other exemplary embodiments, the computer may operate to use magnetic properties to distinguish multiple types of documents. For example, the magnetic properties of indicia on checks may be distinguishable from magnetic properties of indicia on currency bills. Thus sheets which have magnetic indicia in a location in the image that corresponds to an appropriately located micr line will be identified through operation of the computer as a check. Magnetic indicia in a pattern that would be consistent with magnetic features on a currency bill may be identified as a currency bill. Other types of identifiable sheets such as utility bills, payment coupons or other documents may have other distinctive magnetic indicia arrangements. A computer determination that a sheet has such an identifiable arrangement may be utilized to identify the likely type of sheet. In some exemplary embodiments of automated banking machines that can process multiple types of sheets, sheets may be processed differently based on the type of sheet identified. For example, sheets identified as checks may be routed and stored in particular locations in the machine. Sheets identified as currency bills may be directed responsive to operation of the computer, to a sheet path in which bills are analyzed by appropriate sensors to determine denomination and genuineness. Bills determined through operation of the sensors and the computer can be routed to a different storage area(s) than checks. Alternatively or in addition, sheets identifiable as other known types of sheets can be routed responsive to operation of the computer to other sheet paths, sensing devices and/or storage areas. Of course these approaches are exemplary and in other embodiments other approaches maybe used.

As indicated in the thirtieth step of the exemplary embodiment represented in FIG. 32, if the magnetic data sensed does not properly correspond to the document the terminal processor operates to identify the document as suspect. The terminal processor then operates to return the document to the customer and to close the transaction. However, if the document has an appropriate magnetic profile the terminal processor next moves to a step 31.

In the thirty-first step the terminal processor operates to configure and send an authorization message through the network to the host. This authorization message will generally include the data appropriately necessary in an ATM transaction message for purposes of authorizing the transaction. Such data may include customer identifying data such as PAN and PIN related data, the transaction type and the amount input. In addition the transaction data may include data derived from the document, such as data representative of the data corresponding to the characters in the micr line as well as the courtesy amount read from the check as determined by the recognition subsystem.

It should be appreciated that providing the data read from the check in numerical or other compatible format as part of an authorization message is useful for facilitating processing of the data in some systems compared to transmitting an entire image of a check to a host computer for analysis and authorization. In exemplary embodiments the check data may be included in a field in a Diebold 91x type transaction message or in a selected field in an ISO 8583 message. A host computer may readily determine the data included in such messages and analyze it for purposes of deciding whether or not to authorize the transaction.

In this exemplary transaction when the host receives the request message from the ATM, it operates to determine if the customer data corresponds to an authorized user as well as whether the user is authorized to conduct the transaction requested. The operator of the host computer may also be enabled to apply certain rules, including preventing particular users from cashing checks or limiting the amount of the deposited check which can be cashed. Various types of rules may be selectively applied depending on the particular user and the amount of the check. In addition the host computer may also analyze the account data on the check. This may include for example communicating with other systems or data stores to determine if the account upon which the check is drawn is valid and/or holds sufficient funds as represented by the courtesy amount on the check. The computer may also compare certain data such as the courtesy amount read, to data input by the customer concerning the value of the check. The computer may also compare data corresponding to the legal amount read from the check to the courtesy or amount or other monetary amount data based on the micr line or a maximum amount printed on the check. The computer may also analyze aspects of the appearance data which comprises the image such as the institution or the location thereof, upon which the check is drawn for purposes of applying its programmed business rules and logic and in deciding whether to allow the user to deposit or cash the check. Of course in some embodiments business rules may be applied by the one or more computers operating in the ATM as well as through the operation of one or more remote host computers.

In accordance with its rules and logic the host in the exemplary embodiment returns a response message to the ATM. This is represented by a step 32. For purposes of this example it will be presumed that the user is authorized to deposit or cash the check. Of course if the check is not authorized to be deposited or cashed the response message includes data indicative thereof. The ATM will operate under control of the terminal processor in response to data indicative that the transaction is not authorized to return the check to the user and to close the transaction. Alternatively, if the check appears to be fraudulent, the ATM may capture and store the check.

As indicated by the thirty-third step in the exemplary embodiment the ATM operates in accordance with its programming to display a graphic image of the check deposited on its display 22. The terminal processor also operates in a thirty-fourth step in the sequence to store a copy of the image file in a data store at the ATM. In some embodiments this image file may be later recovered for purposes of tracking and documentation. Such image files may be compressed for purposes of saving storage space. In one exemplary embodiment the graphic image of the check is stored in memory as a PCX file. In other embodiments the image file may also be accessed from or downloaded to remote computers connected to the system. For example, some systems may operate using features described in U.S. Pat. No. 7,147,147 the disclosure of which is incorporated herein by reference in its entirety. As previously discussed, such remote computers may be operative to process the check and to carry out settlement related thereto, using the electronic image document as a substitute for the paper check.

The computer next operates in accordance with a thirty-fifth step to print a receipt for the customer. In the exemplary embodiment because a graphic image of the check is available within the ATM, a graphic representation of the check may be included on the receipt provided to the customer. In addition the terminal may operate to print a similar graphic image on a journal printer or in other hard storage within the machine. Alternatively or in addition, in machines including a camera or other image capture device, an image of the user may be stored and/or printed in correlated relation with the check data, including on the receipt, on the check and/or on a journal.

Figure 24:
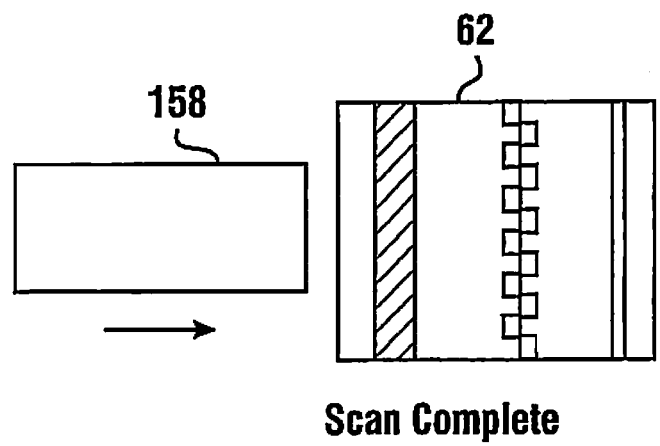
Figure 25:
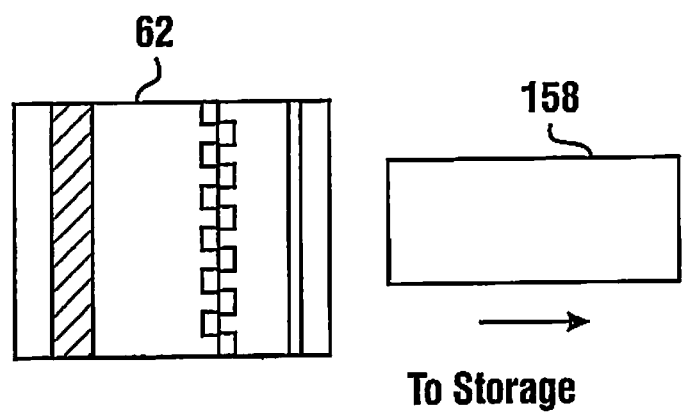

After printing the receipt the ATM next operates under control of the terminal processor to cancel and store the check. This is represented graphically in FIG. 24. As indicated by the thirty-sixth step in the sequence, the computer causes the transport section to again move check 158 in the direction of the arrow. The check is moved towards the deposit holding module. In addition the terminal processor operates to align the appropriate document compartment so that its opening is in communication with the outlet of the transport section.

As indicated in a thirty-seventh step the check 158 is moved until it is sensed adjacent to the printer mechanism 114. Upon sensing the check adjacent to the printer the terminal processor operates to print cancellation data on the check. This cancellation data is printed on the check as it moves in the transport. This may include for example information about the user and/or the transaction, including images. As indicated in a thirty-ninth step in the sequence, the transport continues to move the check until it is sensed as having passed into the storage compartment. Such activity may be sensed through sensors similar to those previously discussed positioned adjacent to the outlet 50 of the transport. This is schematically represented by sensors 182 shown in FIG. 26.

After moving the check into the document storage compartment the terminal processor operates the translation mechanism 94 associated with the deposit holding module to tamp the documents in storage. This is accomplished as indicated by the fortieth step by moving the tamping member 96 downward. This serves to assure that the documents in storage are compacted to the extent possible and assures that a larger number of documents may be accepted before the need for removal of documents from the storage compartment.

In some embodiments, the terminal may operate in accordance with its programmed instructions to provide the user with an output asking if they have further checks to deposit. The user may respond with at least one input, and if so a portion of the transaction sequence can be repeated beginning with step 2 in the transaction sequence for example, to accept another check or other document. In such situations the value of the further check or other document may be added to the value of the prior items. In some embodiments items which are deposited may have different properties. For example, in some embodiments the machine may accept items that do not include magnetic coding. Such items may include other features such as verification codes, symbols or characters that are a function of other values or indicia on the items. Such items may include for example vouchers issued by the machine for a difference between an amount the user was entitled to receive and the value of cash dispensed that could not be dispensed in prior transactions. The machine in such embodiments is operative responsive to its programming to adjust the verification sequence to suit the particular document type being received. The particular document type being received may be based on the at least one input to the machine in the second step, indicia read from the document type, and/or other inputs or data.

In embodiments where a plurality of types of documents are accepted, the machine may operate in accordance with its programming to conduct an analysis of the indicia on the document that is appropriate to verify the particular document type. The document storage module may also include compartments for each type of item that is to be accepted. In this way different item types may be segregated to facilitate removal and sorting.

In some embodiments the receipt of successive documents from one user may continue for a plurality of checks, vouchers or other type items. If the items are verifiable as genuine by the machine and redeemable for cash or credit, the machine may operate to aggregate the value of all such items. The transaction sequence may continue to repeat based on instructions and inputs to the machine in the transaction sequence. It should be understood that for purposes of the exemplary transaction sequence there has been only one item deposited, and only one exemplary type analysis of a document which is a check has been described.

As indicated in the forty-first step if the customer has requested a deposit only transaction during the transaction selection step, the terminal processor causes the machine to go to the forty-fifth step in the transaction sequence. However if the customer has requested to dispense cash based on the value of a cashed check, the logic moves to the forty-second step. If the dispense transaction has been authorized, the terminal processor operates the cash dispenser to dispense an amount of cash. In some embodiments the amount of cash which may be dispensed may correspond exactly to the amount of the check (less transaction fees in some cases) that has been presented by the customer. This may be done for example in an ATM which includes a cash dispenser with coin dispensing capability. However in many embodiments the ATM may be capable of dispensing only certain denominations of currency. This may preclude the customer from receiving the exact amount of change to which they are entitled.

In circumstances where the customer cannot receive exact change the computer may operate to cause a voucher to be printed for the customer. The voucher may include for example a printed coupon or other item that can be redeemed for the amount of the change. This may include for example a coupon redeemable with a merchant for cash and/or services or merchandise. The user may be prompted through operation of the computer to provide at least one input which serves to select from several possible merchants from whom available vouchers are redeemable and in response to the user making a selection of a merchant the voucher is printed with the corresponding merchant name and amount. The system may then operate to provide a credit to the account of the merchant for the amount of the voucher. Such a voucher may include an image of the user for purposes of verification that the person presenting the item is the authorized person.

Alternatively the computer may operate to print and provide a check or other type negotiable instrument to the user. This negotiable instrument may be cashed like a check at the machine or at another location by the user. Such an instrument may be input by the customer to the machine in a subsequent transaction. For example the machine may operate in the subsequent transaction as previously discussed to accept several checks including the negotiable instrument previously dispensed. The user may elect to cash the amount of these checks or have them credited to an account.

The machine may include among its transaction function devices check or voucher printer devices. These printer devices may be supplied with a stock of check media with magnetic coding that may be similar to other types of checks. The coding may correspond to the account of the operator of the machine or other entity whose account is to be charged for the amount of change received by a machine user. In such embodiments the check is completed by a printing device with the amount of change for which the check may be redeemed. The check may be printed by the machine with the user's name as payee based on the transaction data received, or alternatively made out to cash. Images of the user may be printed on the check for authorization purposes as previously discussed.

The check once completed with the appropriate data and/or images may be dispensed from the machine to the user. The user may cash the check at the machine on the current session or in a subsequent transaction session, or at another location that accepts checks. In some embodiments the check stock provided in the machine may prominently display a statement of maximum value above which a check would not be valid. This may be for example, the smallest denomination currency bill dispensed by the machine. For example if the lowest denomination bill that the machine dispenses is a one dollar bill, the value of change would always be generally less than one dollar, and the statement of maximum value of one dollar which would conspicuously indicate to anyone redeeming the check that if it is above this amount it has been tampered with. Of course the maximum amount may vary depending on the machine and its capabilities. Also having such limited value checks in the machine reduces the risk to the machine operator in the event the machine is broken into and the check stock is otherwise stolen. Alternatively the maximum value statement on the check may in some embodiments be printed by the machine itself.

Checks issued by the machine on check stock may include micr coding. Such checks may be verified by the machine in the same manner as other checks. Alternatively the machine may include a transaction function device which provides vouchers, scrip, cards or coupon material that is redeemable for cash, credit, services and/or merchandise. In some embodiments such items, which will be referred to as a voucher for purposes of brevity, may have unique indicia or characteristics that are indicative of authenticity. Such indicia or characteristics may include indicia readable by the machine. Such indicia may include a unique magnetic or visual characters and/or profile which is indicative that the voucher is genuine. Of course, such vouchers may in other embodiments include visible or non-visible indicia including images of the user, which are capable of being read and used to verify the authenticity of the voucher. As previously discussed, when such an item is presented to the machine to be redeemed, the machine adjusts the verification steps in accordance with its programming as appropriate for the particular type of document. This may be based on user inputs, information read from the document, or other data.

In alternative embodiments, the machine need not use any special media or paper to provide a voucher redeemable for cash (or credit and/or merchandise). In such embodiments a printing device in the machine may print the voucher on non-unique media. This printer used for printing the voucher may be a printer used for printing documents that are not redeemable for cash, such as the receipt printer. This may be accomplished by printing on the voucher one or more numerical codes and/or characters or symbols that are usable to verify the genuineness of the document. These may include for example numerical codes which are a function of at least one value associated with the transaction. For example the voucher may include verification indicia which is determined through use of an encryption function based on a transaction number, user ID, amount, machine ID, transaction time, other values, images, or combinations thereof.

The voucher including the verification indicia may be presented at the machine (and in some embodiments at other machines or establishments) to be redeemed. In the case of presentation of the item at the machine, the verification indicia may be read with other values from the voucher. Because in this example no magnetic coding is used, the programming of the machine would cause the machine to not reject the voucher for lack of magnetic coding. The machine would operate in accordance with its programming to determine the validity of the verification indicia. This would be done using the particular appropriate algorithms and data. This may include for example recovering data from one or more data stores. Such a data store may include for example, data concerning whether a voucher corresponding to the one presented has been previously redeemed. For example the machine may operate to store in one or more data stores when the voucher is issued, data indicative that the voucher has been issued. Such data may include data about the amount, the user, the verification indicia or other data. Then when the voucher is redeemed, either at a machine (the same machine that issued the voucher or another machine) or at another location such as a merchant location, further data is stored to indicate the voucher has been redeemed. Such procedures may help assure that reproductions of vouchers are not redeemed for cash. If the voucher is verified as genuine it is accepted for cash value in the manner previously discussed. Of course these approaches are merely exemplary and other approaches may be used.

Alternative embodiments may also provide other ways for the user to take or receive the benefit of an undispensed amount. This may include for example the user returning the change to an account with an institution. Alternatively the user may choose to apply the change to the amount of an existing credit card balance or loan that is held by the institution. In addition or in the alternative, the user may apply the undispensed amount to a particular charitable organization. The operator of the machine may track such donations over the year and send the user a statement for tax purposes. In addition the information may be used by the charities to provide such tax documents directly, and/or to solicit further donations from the particular user. This is accomplished in an exemplary embodiment by the machine providing the user with one or more options through output devices, and the user providing one or more inputs through input devices to select one or more of the options for application of the difference. Numerous options may be provided by the user in response to the programming associated with the terminal processor and other connected computers.

Alternatively in some embodiments one or more computers operating in connection with the machine may provide the user cashing the check with the closest amount that the ATM can dispense to the exact amount of the check. For example, if the ATM includes cash dispensers that dispense coin and the cash dispenser for dispensing pennies is not available because it is broken or is depleted, the machine may dispense an amount to the nearest next highest available currency denomination, which may be a nickel. Likewise if the cash dispenser for dispensing nickels is not available or depleted, (and the penny dispenser is not available) the machine may dispense to the nearest dime. These rules of rounding upwards may be applied in accordance with the programming associated with the machine to dispense the closest amount that the machine is capable of dispensing above the amount of the check presented. Of course in exemplary embodiments the excess above the amount of the check that the machine will dispense is limited in accordance with the programming of one or more computers within the machine. Thus, for example, the programming of the computer may establish the maximum additional amount that the user may receive above the amount of the check as $2.99. Thus if the machine cannot dispense an amount that is within $2.99 above the amount of the check, the machine will indicate that it is unable to process the transaction and return the check to the user. Of course this approach is exemplary and in other embodiments other approaches may be used.

It should be understood that in some exemplary embodiments one or more computers in operative connection with the one or more cash dispensers in the ATM is programmed to control the dispense of currency denominations in response to check cashing transactions. Such control may be operative to reduce the risk that the machine will run out of currency. Thus, for example, the computer may be operative to cause the ATM to dispense one denomination of currency as opposed to another in order to enable the machine to continue running longer and/or to maintain the capability of the ATM to fulfill check cashing transactions within the parameters which have been established by the system. Of course these approaches are exemplary and in other embodiments other approaches may be used.

As indicated at the forty-fourth step in the sequence the terminal processor operates to cause a receipt to be printed for the user indicating the amount of the cash dispensed. This receipt may also include other information including the amount of change that the user received and an indication of how the value associated with this change was either applied or provided to the user. Of course as previously discussed, in this printing step the terminal processor may also operate to print vouchers, coupons, negotiable instruments or other items that the user has requested to receive.

As indicated at the forty-fifth step the terminal processor next operates in accordance with its programming to prompt the user on whether they wish to conduct another transaction. For purposes of this example it will be assumed that the user declines another transaction. The terminal processor next operates the machine to close the transaction. This may include for example returning the card to the customer, outputting "thank you" messages or other appropriate steps associated with completing the transaction and/or readying the machine for a next customer.

In the forty-seventh step the terminal processor operates to send a completion message to the host. As previously discussed the completion message generally includes data indicative of whether the transaction was successfully carried out. In addition in some embodiments, the completion message may also include data representative of any change that was due to customer and how the customer chose to apply or receive the amount of change. The confirmation data included in the return message may also include data representative of the issuance of an item and/or the identity of the merchant or other entity to whom a credit is required to be issued in consideration of a card, voucher or coupon that was dispensed to the customer. The completion data may also include a transaction number or data that can be used to identify or authenticate a check or voucher issued to a user. Likewise the message may include data representative of loans, accounts or charities to whom the customer may have elected to apply their change balance. Other appropriate data indicative of the completion of the transaction may be included. The host computer operates in response to this message to appropriately close the transaction and to apply the funds accordingly and to store data in one or more data stores in operative connection with the host.

Figure 72:
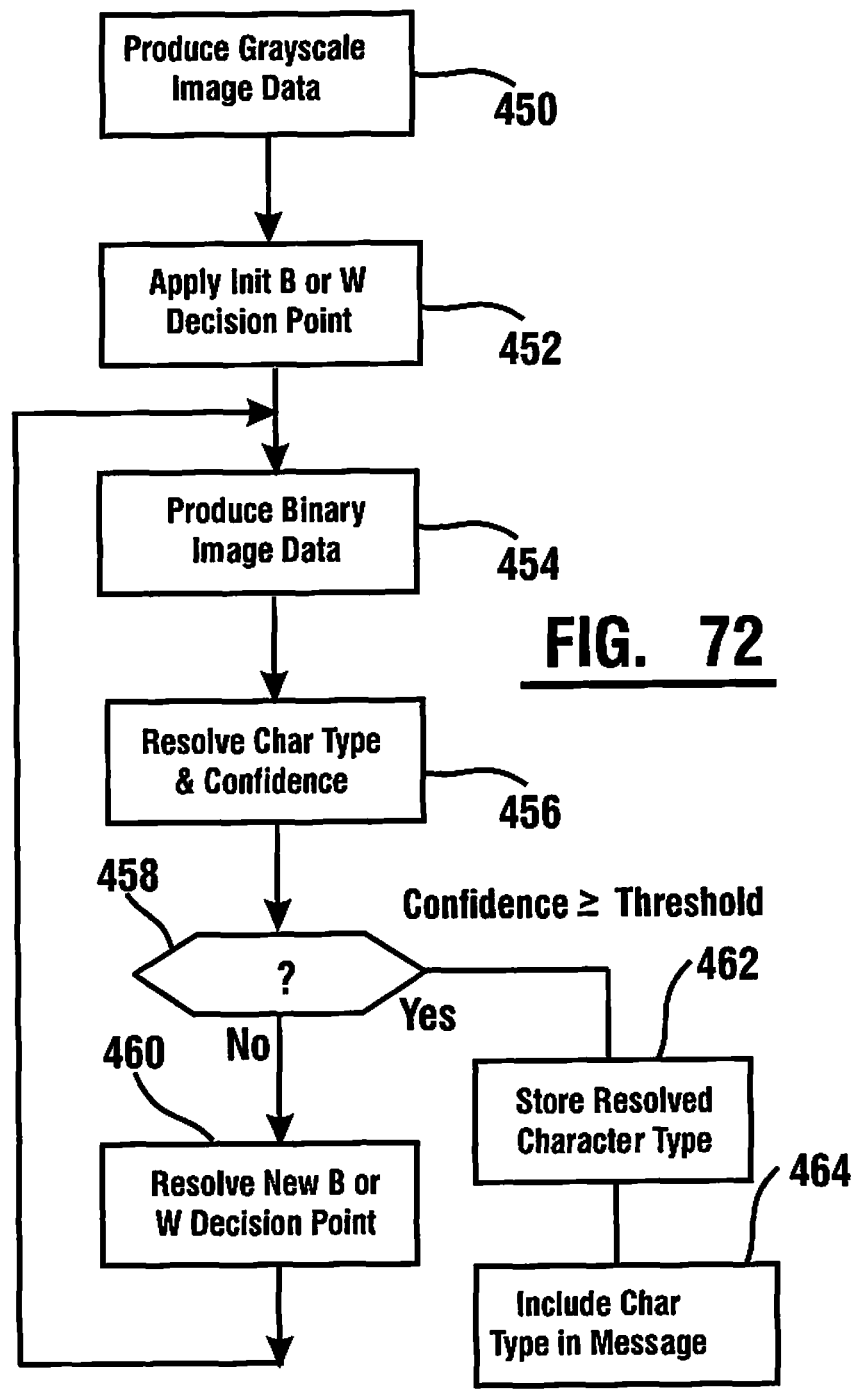
FIG. 72 is a schematic diagram representative of the logic carried out responsive to computer executable instructions by at least one processor in resolving characters included on a document.
Figure 73:
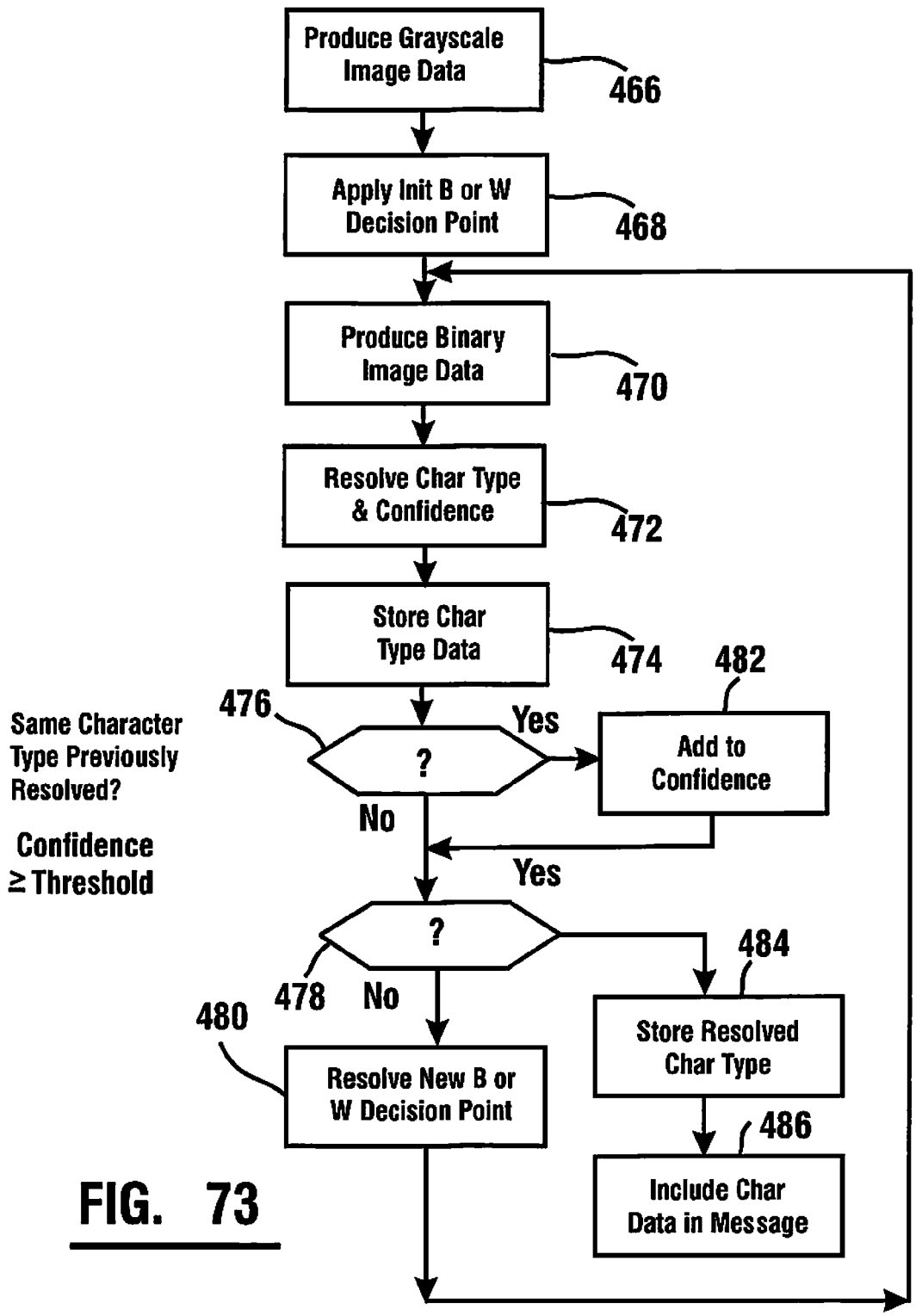
FIG. 73 is a schematic view of an alternative logic flow carried out by at least one processor responsive to computer executable instructions used for resolving characters on a document.

FIGS. 72 and 73 describe an alternative logic flow which is carried out by at least one processor in connection with the ATM in order to resolve characters that may be included on checks and/or other documents. This logic flow which is represented schematically is carried out in response to computer executable instructions which are executed by the at least one processor. The exemplary logic flow begins at a state or step 450. In step 450 the imaging device produces image data that corresponds to the visual appearance of a check or other sheet to be analyzed. In this exemplary embodiment the image data is produced as a plurality of data points referred to as pixels having grayscale values. As can be appreciated, grayscale values correspond to the level of lightness or blackness at a particular point in an image. The grayscale values correspond to the relative lightness or darkness between the extremes of pure white and pure black. Grayscale values can be represented numerically through a number of different conventions which can be used for image processing. In exemplary embodiments, image data may be comprised of 200 pixels per lineal inch in both x and y coordinate directions (200 dpi). In other embodiments images may be comprised of greater or lesser pixel densities.

After producing image data, the computer processor next operates in a step schematically represented 452 to select a black or white decision set point. The black or white decision set point may in some embodiments constitute a single value, on one side of which value the pixel is considered black and at or on the other side of which the pixel is considered white. Alternatively rather than having a single black or white decision set point, some embodiments may have a pair of spaced points with a gap in between. In such embodiments the decision set points may separate what will be considered black from what will be considered white. The area in the gap can be processed as indeterminate points which can be used or disregarded in the analysis depending on the approach taken for analyzing the image data. Of course these approaches are exemplary and in other embodiments other approaches may be used.

In the exemplary embodiment the at least one processor processes the image data using the black or white decision set point to produce appearance data which comprises binary image data based on the grayscale data. This is schematically represented in a step 454. As previously mentioned, the binary image data is data consists of black and white pixels which can be analyzed to determine character values. In the exemplary embodiment a single black or white decision point is applied to produce binary image data corresponding to the image data in which there are only black or white pixels. Of course this approach is exemplary and in other embodiments other approaches may be used, including approaches that include indeterminate pixels. The at least one processor then operates as represented in step 456 to resolve one or more character values (alternatively referred to herein as character types) from the binary image data. This includes operating character recognition software to determine the one or multiple characters represented by the pixel data included in the binary image. Further in the exemplary embodiment the character recognition software operates to provide a degree of confidence concerning the resolved values of character or characters. The degree of confidence corresponds to the level of confidence or level of assurance previously discussed. In some embodiments the software operates to provide a degree of confidence associated with each resolved character value. In other embodiments the character recognition software may operate to provide a degree of confidence associated with multiple characters that are resolved through operation of the software. Of course it should be understood that the characters may include those previously discussed such as micr characters, numerical values, alphabetical characters, symbols or other character types. All such types of resolvable symbols will be considered characters for purposes of this disclosure.

The at least one processor then operates to determine whether the resolved level or degree of confidence for the character or characters that exceed a set threshold. This set threshold is programmed based on the requirements of the machine operator, such as the ATM owner, but in the exemplary embodiment may correspond to numbers as high as 100 percent. The resolution of the degree of confidence and comparison of the confidence level to a threshold is represented in a step 458.

If the degree of confidence is below the threshold, the at least one processor then operates as represented in a step 460 to resolve a new black or white decision set point. In some exemplary embodiments the decision set point may be moved in a direction from the original decision set point toward the pure white or pure black. Thus, for example, if the original black or white decision set point was set in the middle exactly midway between pure white and pure black, the computer may operate to change the decision set point an increment toward pure white or pure black. If for example the initial offset is toward the pure black, the new decision set point that has been incrementally moved towards pure black is used in repeating steps 454, 456 and 458. If the character type and degree of confidence is then determined to be still below the threshold, the at least one processor may then operate in accordance with its programming to repeat step 460 but this time move the decision set point in the opposite direction from the original set point. Thus for example if the decision set point was first moved towards the pure black, the computer may operate in accordance with its programming to move the decision set point from the initial value toward pure white. The process of producing the appearance data which includes the binary image data is then repeated along with the analysis to determine if the character type and degree of confidence has reached the threshold. If the character type and degree of confidence resolved but the degree of confidence is still not at the threshold, the at least one processor may then operate to select yet another set point value based on the trend developed for the prior two. For example if the degree of confidence was higher when shifting the decision point from the original decision set point towards the pure black as opposed toward the pure white, the computer may operate in accordance with its programming to adjust the set point further toward the pure black for a third analysis. Likewise if a higher degree of confidence was achieved shifting toward the pure white, the computer may change the set point further towards the pure white and repeat the analysis. Thus the computer may continue to iteratively select values shifted in a direction that continues to produce a higher degree of confidence until the resolved degree of confidence is at least at the threshold.

Once the character or characters have been resolved with a degree of confidence that is at least at the threshold, the at least one processor then operates to store the resolved character or characters in memory such as a suitable data store. This is represented in a step 462. The at least one processor then operates to include the resolved character data in messages that are sent from the ATM to a remote computer with the corresponding ATM transaction data and/or the check image data. This is represented in a step 464.

Alternative embodiments may employ other approaches towards adjusting the black or white decision point so as to binarize the image data and produce the appearance data for purposes of conducting the character recognition analysis. For example in an alternative approach the at least one processor is programmed to begin the analysis with a black or white decision set point that is offset toward one of the pure black or pure white values, and then incrementally move the decision set point toward the other of the pure black or pure white values, repeating the analysis each time until the threshold is met or exceeded. Alternatively in other approaches the at least one processor may operate to pick an initial decision set point that is offset toward one side of the mid point and conduct the analysis; then move the set point toward the opposite side and repeat the analysis. Based on the degree of confidence achieved with each, the computer may resolve a new set point shifted an amount between the two that should produce the highest degree of confidence. Of course these approaches are exemplary and in other embodiments other approaches may be used.

Further in some example embodiments this approach of producing and analyzing appearance data by changing the black or white decision set point may be applied to a complete image representing an entire sheet side, or images corresponding to both sides of the check or other sheet. In other example embodiments the approach may be applied only to appearance data within selected areas of an image, such as the template windows previously discussed. FIG. 73 represents schematically an alternative approach towards resolving a character or characters through operation of at least one processor in association with the ATM. In this exemplary embodiment the imaging device of the ATM operates to produce image data comprising grayscale values as represented in step 466. As was the case in the prior described approach, the at least one processor is operative to process the grayscale data to produce binary appearance data using an initial black or white decision point. This is represented in a step 468. The initial black or white decision point may be selected by the processor to be at the middle of the range between pure black and pure white or alternatively in one of the ways previously discussed.

The at least one processor operates using the grayscale image data and the decision set point to produce binary image data as represented in a step 470. The binary image data is then used and processed using the character recognition software to resolve character type and confidence data as represented in step 472. The at least one processor then operates to store data corresponding to the type of character or characters resolved through the analysis. This is represented by a step 474.

The at least one processor then operates at a step 476 to determine if the character data resolved through the current analysis corresponds to character data previously determined through a previous analysis. Of course the first time that an analysis is conducted, there will be no such data previously resolved. As a result, the at least one processor proceeds to step 478 in which a determination is made as to whether the degree of confidence is at or above the threshold. If the character data is not resolved with a degree of confidence that is at least at the threshold, a new decision set point is selected through operation of the processor at a step 480.

The computer then operates to repeat the logic associated with steps 470, 472 and 474 using the new decision set point. At step 476 an analysis is made as to whether the character or characters resolved using the new decision set point corresponds to the same character type previously resolved. If the character type that is resolved with the new decision set point is the same as that previously resolved, the at least one processor operates to add additional value to the confidence level that is resolved in step 472. This is represented by a step 482. In situations where the character resolved with the new decision set point is the same as that determined using a different decision set point, the indicated degree of confidence is increased for purposes of considering whether the resolved degree of confidence is at least at the threshold when the analysis is done in step 478. Of course if the resolved character type using the different decision point is different from the character type previously resolved, there is no additional weight accorded to the degree of confidence in step 482. Again if the confidence for the resolved character remains below the threshold in step 478, the at least one processor operates in step 480 to select yet another black or white decision set point. This can be done in one of the ways previously discussed and the process continues to be repeated until the character type that is resolved has a degree of confidence at or above the threshold. Further, in some exemplary embodiments, the at least one processor may operate in accordance with its programming to add an additional amount to the degree of confidence with regard to a currently resolved character or characters, for each of the previous occasions that same character or characters were resolved in the analysis. Thus, the more prior times the same character type or types was previously resolved form the image data, the more that is added to the level of confidence when that same character type or types is subsequently resolved.

Once the analysis associated with step 478 corresponds to resolving a character or characters with a degree of confidence that is at least at the threshold, the at least one processor operates to consider that the character or characters have been properly resolved, and the data is stored as represented in step 484. The stored data is then utilized in the operation of the ATM and is sent to one or more remote computers in messages from the machine as represented in step 486.

It should be appreciated that an aspect associated with the approaches described in FIG. 73 is that the at least one processor operates to accord a greater degree of confidence to character types that are resolved repeatedly despite the change in the black or white decision set point. As the at least one processor may operate to resolve character values more quickly, when the analysis tends to indicate the character type repeatedly despite the different decision points for binarization. Of course it should be understood that the approaches represented are exemplary of various ways for analyzing image data so as to more effectively resolve the characters represented thereby and that the principles disclosed may be used in other schemes for the analysis of image data.

As can be appreciated from the foregoing description, the exemplary form of the deposit accepting apparatus and system and its methods of operation, may provide advantages. The exemplary system may reduce the need to manipulate documents. This results in increased reliability by reducing the risk of document jams or other malfunctions. The exemplary embodiment may further reduce the need to achieve alignment of the document for purposes of reading or analyzing the data thereon. Generally as long as the particular document is presented in an appropriate transport direction the data may be analyzed and manipulated so as to achieve authorization of the document. It should be understood that while the exemplary embodiment shown analyzes indicia on only one side of a document, other embodiments may analyze indicia on both sides of documents. This may be accomplished for example by having analysis modules on both sides of the document path. Such arrangements in some embodiments may enable documents to be reliably read and analyzed regardless of orientation.

It should be understood that while the exemplary embodiment has been described as reading checks and vouchers, other embodiments may be used for reading other document types. Such other document types may include for example statements of charges such as utility bills, credit card bills and other statements of charges. Example embodiments may further be adapted to read other or additional types of coding such as one or two-dimensional bar codes, other character sets, alphabets of various languages or other characters. Some embodiments may accept only one type of item, or a plurality of types of items. Further, while the exemplary embodiment accepts envelopes, other embodiments may not accept such items, or may accept other types of items.

It should be understood that the architecture of the computers and software described is exemplary. Other embodiments may use different computer and/or software architectures to accomplish the functions and methods described. Further the one or more computers operating in connection with an automated banking machine may be programmed by reading through operation of one or more appropriate reading devices, machine readable articles which comprise media with computer executable instructions that are operative to cause the one or more computers (alternatively referred to herein as processors) in the machine to carry out one or more of the functions and method steps described. Such machine readable media may include for example one or more CDs, magnetic discs, tapes, hard disk drives, PROMS, memory cards, flash memory or other suitable types of media.

Some exemplary embodiments further facilitate transaction processing by being able to verify and analyze document images within the ATM. This may avoid the need to transmit entire document images to a remote location for purposes of analysis. Further an exemplary embodiment enables the application of processing rules which facilitates analyzing required data and moving forward with transactions only when such data is read with a sufficient level of assurance that the data has been read accurately.

A feature of the described exemplary embodiment is the ability of a single mechanism to reliably handle both sheet type materials and envelopes. This avoids the need to include multiple depositories within a machine. In addition the embodiment also produces data representative of graphic images of items that have been placed into the depository. Such image data may be analyzed at the machine or forwarded to another device for verification and/or processing purposes. Example embodiments may be used to conduct payor and/or payee signature analysis including analysis for the presence of signatures and/or for the genuineness of cursive signatures.

Another feature of the exemplary embodiment is that items placed in the deposit accepting apparatus may be read through imaging or other methods and then returned to the customer. These may include items such as drivers' licenses, identification cards, passports or other articles that generally will not be retained within the machine. The exemplary depository also has the capability of receiving documents, reading and/or capturing images and/or printing on them for purposes of authentication or cancellation and then returning them to the customer. This may prove advantageous for example in the case of customer bills or payments where the customer is provided with a marking on the particular bill to indicate that payment has been made. In addition some exemplary embodiments may handle numerous different types of items and documents in this manner. For example embodiments may be used in applications such as issuing items such as drivers' licenses, license plate stickers, gaming materials, and other items. Example embodiments may be used for redeeming items and issuing new or replacement items. Further advantages will be apparent, and those having skill in the relevant art may apply the described principles to numerous devices and systems.

Figure 38:
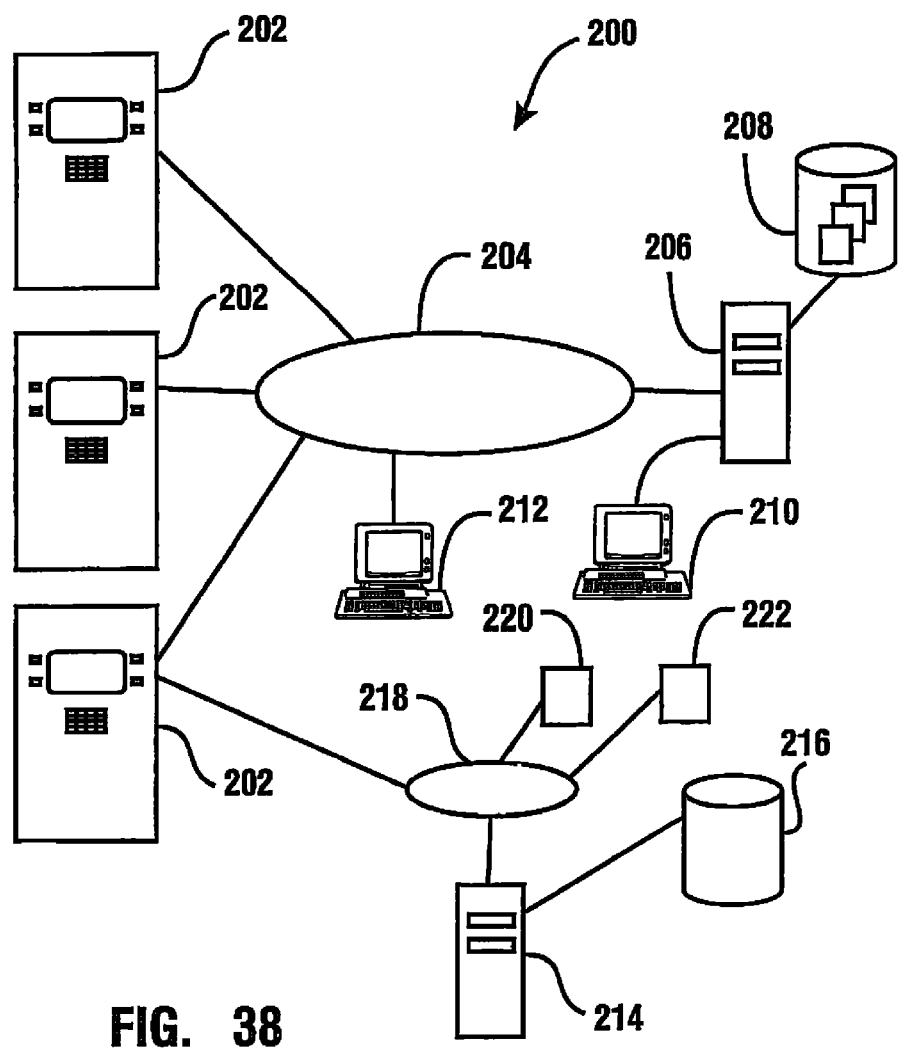
FIG. 38 is a schematic view of an alternative system of an exemplary embodiment including check accepting automated banking machines.

FIG. 38 shows an alternative exemplary embodiment of a system generally indicated 200, in which check cashing is provided through automated banking machines. The system includes automated banking machines 202 which may be automated teller machines of the type previously discussed. ATMs 202 are connected through a network 204, to a host computer or transaction server generally indicated 206. Network 204 may comprise any of a number of public or private networks suitable for communicating between host computer 206 and the ATMs. As schematically represented in FIG. 38, host computer 206 is in operative connection with a data store 208 which includes various types of instructions and stored data. Host 206 is also in operative connection with a host interface terminal 210.

In the exemplary embodiment system 200 includes at least one administrator station 212. Administrator station 212 in the exemplary embodiment is a computer or server in operative connection with the network 204. Administrator station 212 is used by the operator of the ATMs 202 for purposes of configuring the system and monitoring transactions which occur at the ATMs 202.

Exemplary system 200 further includes a check image server 214. As shown schematically, the check image server 214 is in operative connection with a data store 216. Check image server 214 is connected to ATMs 202 through a network 218. Network 218 may be the same or different network than network 204. Other servers 220 and 222 are connected to the network 218. In the exemplary embodiment check image server 214 is operative to receive electronic images of checks that are received at the ATMs 202. The check image server 214 may be used to archive such images and to accomplish settlement among the various entities which hold accounts which must be credited and debited in the conduct of a check cashing transaction.

In the exemplary embodiment of system 200, ATMs 202 are specifically operated for purposes of providing check cashing services. Such check cashing services may be provided for persons holding accounts with the operator of the system such as a financial institution. Alternatively in some embodiments ATMs 202 may be specifically operated to provide check cashing services for persons who do not hold accounts with the operator of the system but who have a need to cash checks drawn by makers who have accounts or other relationships with the operator of the system. This may be, for example, a situation where a particular entity has contracted with the operator of the system to honor checks for which the entity is a maker and which are deposited in a machine. Alternatively, other embodiments may be operative to cash checks for which the particular maker of the check has an account relationship with the operator of the system. As later discussed, in some exemplary embodiments checks may be cashed at the ATMs 202 by users who are associated with the makers of checks and who are correlated with data corresponding to such makers in one or more data stores operatively connected to the system. Of course these approaches are exemplary and in other embodiments other approaches maybe used.

Figure 39:
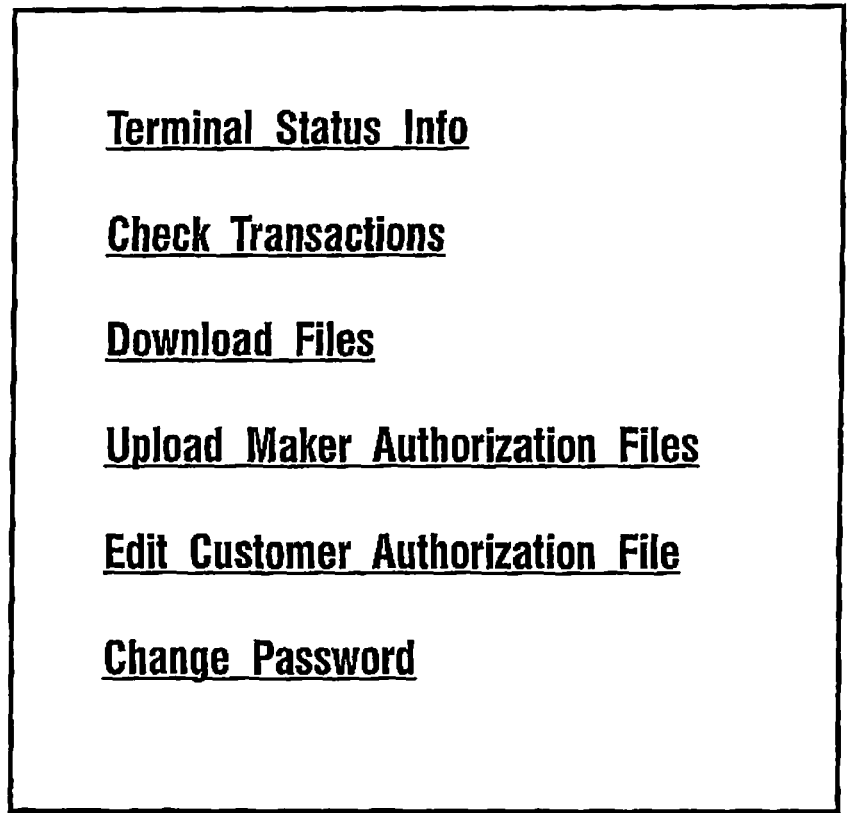
FIG. 39 is an exemplary screen output provided from an administrator station of the system shown in FIG. 38.

In the exemplary embodiment shown, the operator of the system is enabled to configure system parameters through inputs at the administrator station 212. Screen output 214 shown in FIG. 39 is representative of the types of information that a system operator may access through the administrator station 212. Of course it should be appreciated that before the user of the administrator station is able to access these options the user is required to input a password or to satisfy other suitable security requirements of the particular system.

In the exemplary embodiment, administrator personnel are enabled to access various functions of the system by selecting various options on the list. These options may include reviewing terminal status information, reviewing check transactions, downloading file information from the host 206, uploading customer authorization files, editing customer authorization files, and changing user access passwords. Of course, these options are exemplary and in other embodiments other options may be provided.

In the exemplary embodiment, by selecting terminal status information from screen output 224 the administrator personnel are presented at the administrator terminal with output screens showing the status of the ATMs connected in the system, as represented in screen output 226 shown in FIG. 40. Exemplary screen output 226 includes a listing of terminals connected in the system, their type, location and status information. In the exemplary embodiment administrator personnel are enabled to change the status of each terminal between open and closed by selecting the links shown in screen 226. In addition in the exemplary embodiment administrator personnel are enabled to check detailed status information for any selected one of the terminals by selecting the status option associated therewith on screen 226.

Selection of the status option for a particular terminal from screen 226 enables an administrative user in the exemplary embodiment to review detailed status information for the particular terminal as represented by the terminal status screen output 228 shown in FIG. 41. Screen output 228 provides detailed status information with regard to the terminal and the devices included therein. As can be seen in screen 228, in the exemplary embodiment the system provides an administrative user with information concerning the status of various currency dispensers included within the unit as well as amounts of currency remaining therein. Screen output 228 also includes in the exemplary embodiment status information concerning transactions conducted at the terminal. Further in the exemplary embodiment screen output 228 enables the customer to link to more detailed information about transactions conducted at the terminal as well as to obtain information on other terminals connected in the system.

Figure 42:
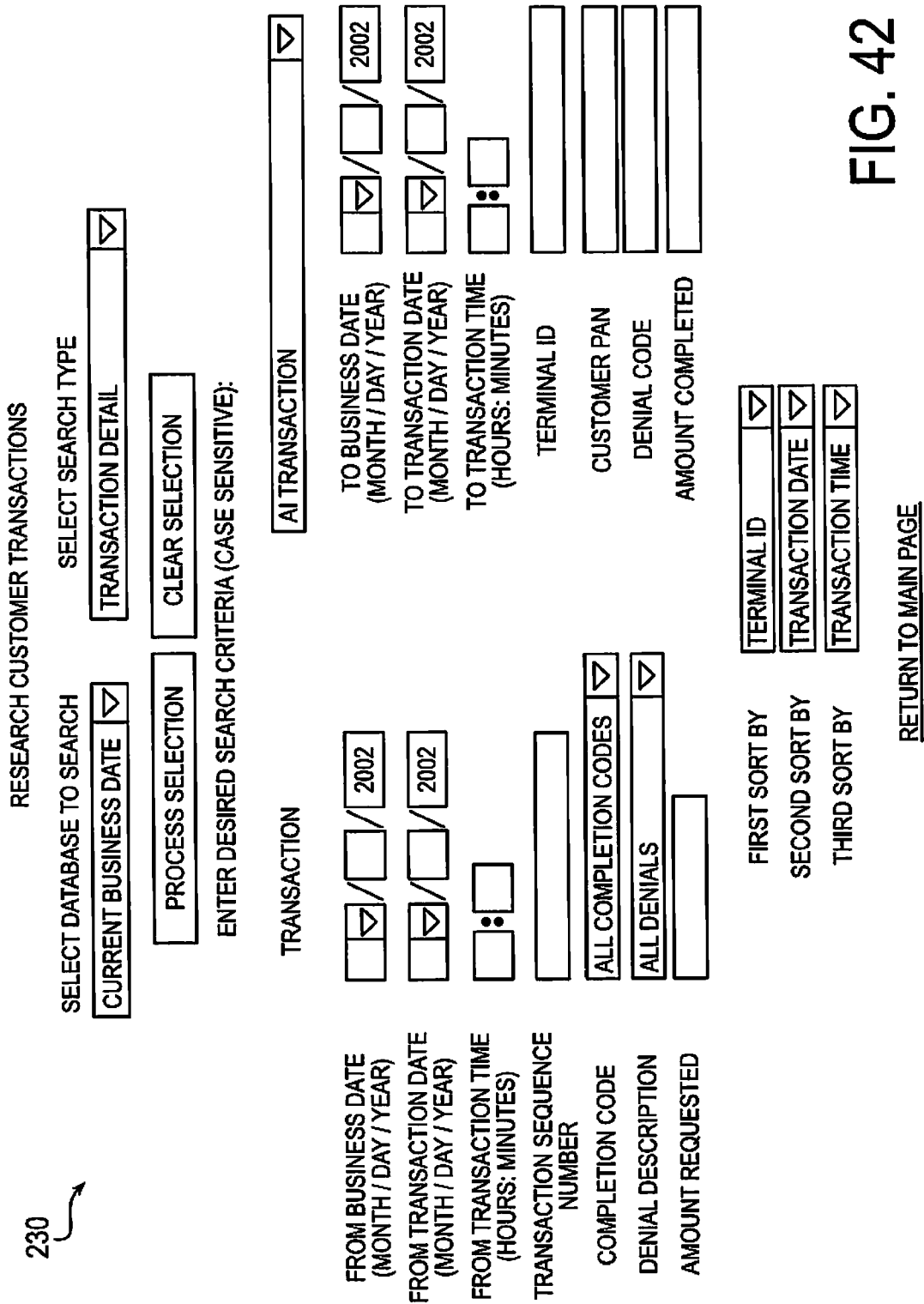
FIG. 42 is an exemplary output from an administrator station which enables an administrator to recover transaction information from the exemplary system.

Referring again to screen output 224 shown in FIG. 39, an administrative user is also enabled to select the option of reviewing the check cashing transactions that have been conducted in the system. Making this selection in the exemplary embodiment causes the system to produce the screen output 230 shown in FIG. 42 at the administrator terminal. Screen output 230 provides various options for the administrative user to obtain data concerning various transactions that have been conducted in the system. For example, as represented in FIG. 42, an administrative user is enabled to conduct the various searches by date, terminal, customer or other information. By setting these parameters, an administrative user is enabled to output various reports related to check cashing transactions that have been conducted in the system. In the exemplary embodiment various drop-down menus and populatable fields are provided within the screen output so as to facilitate the input of data and the making of selections related to searching customer transactions.

Screen output 232 in FIG. 43 represents an exemplary report that may be output through the administrator terminal in response to a search request input in response to screen 230. It should be understood that FIG. 43 is intended only to show the format of search results and the data therein. It is not necessarily complete or representative of data which would be recalled in conducting an actual search. Further as represented by the arrows in FIG. 43, the columns of data are arranged horizontally in the exemplary output and are scrolled to by a user by moving left to right. As can be appreciated from FIG. 43, numerous types of searches can be conducted related to check cashing transactions and the data related thereto displayed to an administrative user at the administrator terminal.

Referring again to screen output 224 in FIG. 39, an administrative user is also enabled to select the option of downloading transaction files from the system. In response to selecting this option, the administrative user is provided in an exemplary embodiment with screen output 234 shown in FIG. 44. Screen output 234 enables an administrative user to select to receive various types of data from the system. For example in the exemplary embodiment, by selecting the available transaction files the user is enabled to receive a report which details all transactions that have been conducted at ATMs connected to the system during the current day and a set number of preceding days. In addition the administrative user is enabled to select various daily and monthly report files that are available in the system. FIG. 45 includes a list 236 of such reports that are available in the exemplary system. Such reports readily enable the administrator of the exemplary system to track activity related to check cashing that has occurred. In addition, such reports enable a system operator to determine the value of checks that have been cashed by a particular maker and to facilitate assessing charges against the maker or their account for checks that have been cashed. In addition, as can be appreciated, such reports also enable the user to determine activity which has occurred at various terminals in the system and to help assure that such systems remain stocked with adequate amounts of cash and supplies to accommodate the transaction volumes. Of course it should be understood that the reports in list 236 are exemplary and in other embodiments other types of reports and functions may be provided.

Returning to the options provided in screen output 224 shown in FIG. 39, another administrator option that is provided in the exemplary embodiment is to upload maker authorization files to the system. In an exemplary embodiment checks drawn on particular check issuers, also referred to as makers, are cashed at ATMs connected to the system. Information concerning the particular maker accounts is included in maker records that are stored in the data store 208 in operative connection with the system. FIG. 48 schematically represents the data which is stored in an exemplary account record. As can be appreciated, in the exemplary account record is stored information on the maker's institution which holds the maker's account. This is indicated as the BIN number. In addition, for each check maker a particular account type and account number are specified in the record. In the exemplary embodiment the account type is characterized as "other" and the maker's account is specifically directed to cashing checks drawn on the maker's account. Also included in the maker account record is account status information. This account status information is enabled to be changed by the administrative user between open and closed. In the open account status, checks are enabled to be cashed that are drawn on the maker's account. The exemplary maker record also includes a text description of the maker account.

In the exemplary embodiment of the maker record, provision is made for specifying a minimum time period between transactions. This delay period is intended to prevent individuals cashing checks at the machine from cashing checks more frequently than the specified delay period. This helps to reduce the risk that particular individuals will not present checks on a more frequent basis than is reasonable under the circumstances and helps to reduce the risk of fraud.

A further aspect of the exemplary maker record shown in FIG. 48 is the specification of a maximum check amount. This data indicates the highest value of check issued by a particular maker that will be cashed at the machine. In addition, in the exemplary embodiment the maker records created at the administrator work station include a command which is utilized by the host computer 206 to determine how the maker record that is delivered to it from the administrator station is to be treated. For example, those commands may include a change, deletion or the addition of a new file. It should be appreciated that the particular structure of the maker records are exemplary and in other embodiments other or different types of data may be included.

In the exemplary embodiment, maker records are populated at the administrator terminal and uploaded to the host. This is done in the exemplary embodiment by selecting the upload maker authorization file options from the output screen 224. Selecting this option causes the administrator station to produce the screen output 238 shown in FIG. 46. From this screen the administrative user is enabled to input the name of the file related to the accounts that the system is to upload to the host. In the exemplary embodiment, after inputting the account name the user selects the verify authorization file option from screen output 238, which causes the administrator station to output the authorization file conversion screen output 240 shown in FIG. 47. Screen output 240 shows the content of the file to be uploaded. In this exemplary situation, the file includes nine maker accounts that are to be applied to the host. To forward this file to the host, the administrative user selects the apply authorization button shown in screen output 240. In the exemplary embodiment when the selected file has applied to the host and is stored in the database, the administrative station is operative to produce the screen output 242 shown in FIG. 49. This screen output is operative to indicate to the administrative user that the maker files uploaded have been applied to the data store in operative connection with the host server.

A further option of the exemplary embodiment for the administrative user from screen output 224 is to edit customer authorization files. Selecting this option in the exemplary embodiment causes the administrative terminal to produce the screen output 244 shown in FIG. 50. Screen output 244 provides the administrative user with options for reviewing, editing, adding and deleting customers from the system. In an exemplary embodiment an administrative user is enabled to input a card number associated with a check cashing user to recover record data and/or to populate record data associated with the card number and the particular user. For example, inputting a particular card number and selecting the get customer information button causes the administrator station to output data in a customer authorization record represented by screen output 246 in FIG. 51. The data in the customer authorization record is enabled to be populated by the administrative user to indicate information related to the user. Further, the record information in screen output 246 enables correlating in the database identifying information concerning the user and specifically the user card number with a particular maker account. Such correlation in the exemplary embodiment causes the authorization record information to be populated with information related to the particular maker, such as the delay period which is referred to as "lock out days" as well as the maximum permitted check amount. Of course it should be understood that in some embodiments maximum amounts permitted to be cashed for particular users may be higher or lower than the maximum amount permitted to be cashed for a particular maker. This will depend on the programming of the particular system and the logic employed. As can be appreciated, it may be desirable for some users to set the maximum check amount lower than for others, based on pay scales or other parameters.

In the exemplary embodiment, from a screen output 246 an administrative user is enabled to review the particular customer's transaction history by selecting the transaction history option. This causes the administrator terminal to output data concerning transactions conducted by the user, as represented by a screen output 248 in FIG. 52. As can be appreciated, in the exemplary embodiment each transaction that is conducted or attempted to be conducted by a user has corresponding information recorded in one or more data stores in operative connection with the system. This enables the system to calculate, for example, whether the specified delay period has passed before the user can cash another check. In addition, this enables the system to monitor transactions and to uncover situations that may involve the theft or improper presentation of checks. As shown in the exemplary transaction history record in FIG. 52, data is recorded related to successful and unsuccessful transactions that have been made by the user. The administrative users are enabled to recover the data related to such transactions and review them at the administrator station. Of course these records are exemplary and in other embodiments other records and data may be provided.

In the exemplary embodiment the host system is programmed to operate in accordance with its configuration to allow check cashing transactions to be conducted under selected appropriate circumstances. As a result, transactions which do not meet particular parameters are denied. Examples of programmed parameters which are bases for denying transactions in the exemplary system are shown in the table 250 in FIGS. 58 through 60. Of course it should be understood that these parameters are merely exemplary and in other systems and embodiments other parameters and criteria may be used.

As shown in the exemplary embodiment, transactions by users may be denied if a check cashing transaction is conducted before the expiration of the "lock out" or delay period that is programmed in the system in connection with the particular maker of checks with which a user is associated.

In some embodiments where users are being enrolled to use the system it may be advisable to enable a particular user to conduct a first transaction to cash a check at a machine without first being enrolled in the system. This would be permitted, for example, if the maker on whose account the check is drawn is a participant in the system and the maker check that is presented is below the maximum amount and meets other criteria for cashing of the check. In some exemplary embodiments, one such transaction may be permitted by a consumer user who is not enrolled with the system. However in such embodiments the record that such a first transaction has been conducted is stored in one or more data stores. Further transactions by such a user are denied until the user is properly enrolled and a record corresponding to the user is added to the database and made active. However in some exemplary embodiments the system may operate to read the maker information on the first check input by the user and to automatically correlate the user and maker data in the database in response to cashing of the first check. This may have the advantage that when the administrator personnel operate the administrator station to modify the record data associated with the user, the correlation between the user and the maker entity is already established and the administrator personnel may verify this information. Of course this approach is exemplary and in other embodiments other approaches may be used.

Also, as represented in FIG. 58, a further reason that a user may be denied a transaction is that the user's card or other identifying data is not defined in the system. A user presenting such a card will not be allowed to conduct check cashing transactions. However, in some embodiments such a user may be permitted to conduct other types of transactions. A further basis for a denial of transactions is that the account of the maker on which the check is drawn has been closed by the administrator of the system. This may occur, for example, when the system administrator no longer is obligated to cash checks for that particular maker.

Also, as represented in FIG. 58, a check cashing transaction may be denied by the system if the check amount exceeds the authorized amount. This may be the maximum check amount associated with the maker or the user in cases where individual users have specified maximum check amounts. As further indicated in FIG. 59, the check cashing transaction may be denied if a check is presented which is drawn on a maker that is not defined in the system. This may occur, for example, when the entity that has issued the check is not defined in the database as one for which checks are cashed. Similarly, the check cashing transaction may be denied if an authorized user attempts to cash a check issued by a maker which, though identified in the system, is not the maker that is associated with that particular user in the system.

As further represented in FIG. 59, check cashing transactions may be denied due to machine malfunctions or the machine's inability to read a valid micr line. This may occur, for example, if the check has been subject to damage or if the check does not conform to one of the templates that is used to identify a valid check by the system.

A further feature of some exemplary embodiments is the ability of the administrator to identify certain user cards as no longer authorized. This may occur, for example, if a user reports their card stolen or if the user is suspected of cashing fraudulent checks. In such circumstances, the card may be listed by the administrator as a "hot" card. In such cases, the system may be programmed to have the ATM reject transactions and/or to capture such cards when they are presented at the ATM.

As further represented in FIG. 59, check cashing transactions may be denied in situations where the system is unable to deliver cash to the user from the machine in an amount close enough to the amount that the user is entitled to receive. This may occur, for example, if the ATM which the user is attempting to operate is out of various denominations of currency and the closest amount that the machine can dispense above the amount of the check is in excess of the programmed limit.

Exemplary embodiments of the system are adapted to require a user to input a corresponding personal identification number (PIN) in order to operate the ATM. A failure to input the proper PIN prevents the user from conducting the transaction. Exemplary forms of the system are programmed so that if a user presenting a card makes three consecutive unsuccessful attempts to input a correct PIN the user card is captured.

Also as represented in FIG. 59, transactions may be denied if the system has a requirement that a particular maker be assigned to the card before it can be used. This might occur, for example, in systems that do not employ the capability for automatically correlating a maker with a user and/or a card upon the cashing of a first check.

Also as shown in FIGS. 59 and 60, check cashing transactions may be denied in situations where data corresponding to a check amount or a maximum check amount is encoded in the micr line and the amount encoded does not correlate properly with the courtesy and/or legal amounts read from the check. Likewise, check cashing transactions may be denied in situations where the particular user card has been deactivated by an administrator or has not been properly activated within the system. It should be understood that these particular reasons for denying check cashing transactions are exemplary. In other embodiments and systems, additional or other reasons may be used for denying check cashing transactions.

An exemplary logic flow associated with a check cashing transaction is represented in FIGS. 53 through 56. It should be understood that this transaction flow is schematic and does not show other or additional steps that may also occur in connection with the steps represented. As represented in a step 252, the ATM receives from a user in a step 252 the account and PIN number data that identifies the user. This is done in an exemplary embodiment by the ATM reading the user's card and receiving the input of the user's PIN through a keypad. Although not represented in FIG. 53, if the user's card number and PIN do not correspond, the user is prevented from conducting further steps within the system. Of course in other embodiments the user may be enabled to conduct transactions without a PIN or may provide other identifying inputs, as previously discussed.

The ATM receives the check through the IDM and reads the account data from the micr line. This is indicated schematically in a step 253. Thereafter the ATM is operative to receive the amount of the check as indicated in a step 256. As previously discussed, in some embodiments receiving the amount of the check may involve reading the courtesy amount and verifying through the operation of the system that the level of assurance (degree of confidence) that the courtesy amount has been properly read is above a set level of confidence. In other embodiments, receiving the check amount may include reading the legal amount along with or in lieu of the courtesy amount. In other embodiments it may include reading data encoded in the micr line which corresponds to the check amount. In still other embodiments, as previously discussed, the user may be requested to input the amount of the check through an input device such as a keypad. In each case, one or more computers in operative connection with the ATM may be operative to verify that the amount of the check has been properly received. Of course these approaches are exemplary, and in other embodiments other approaches may be used.

Figure 53:
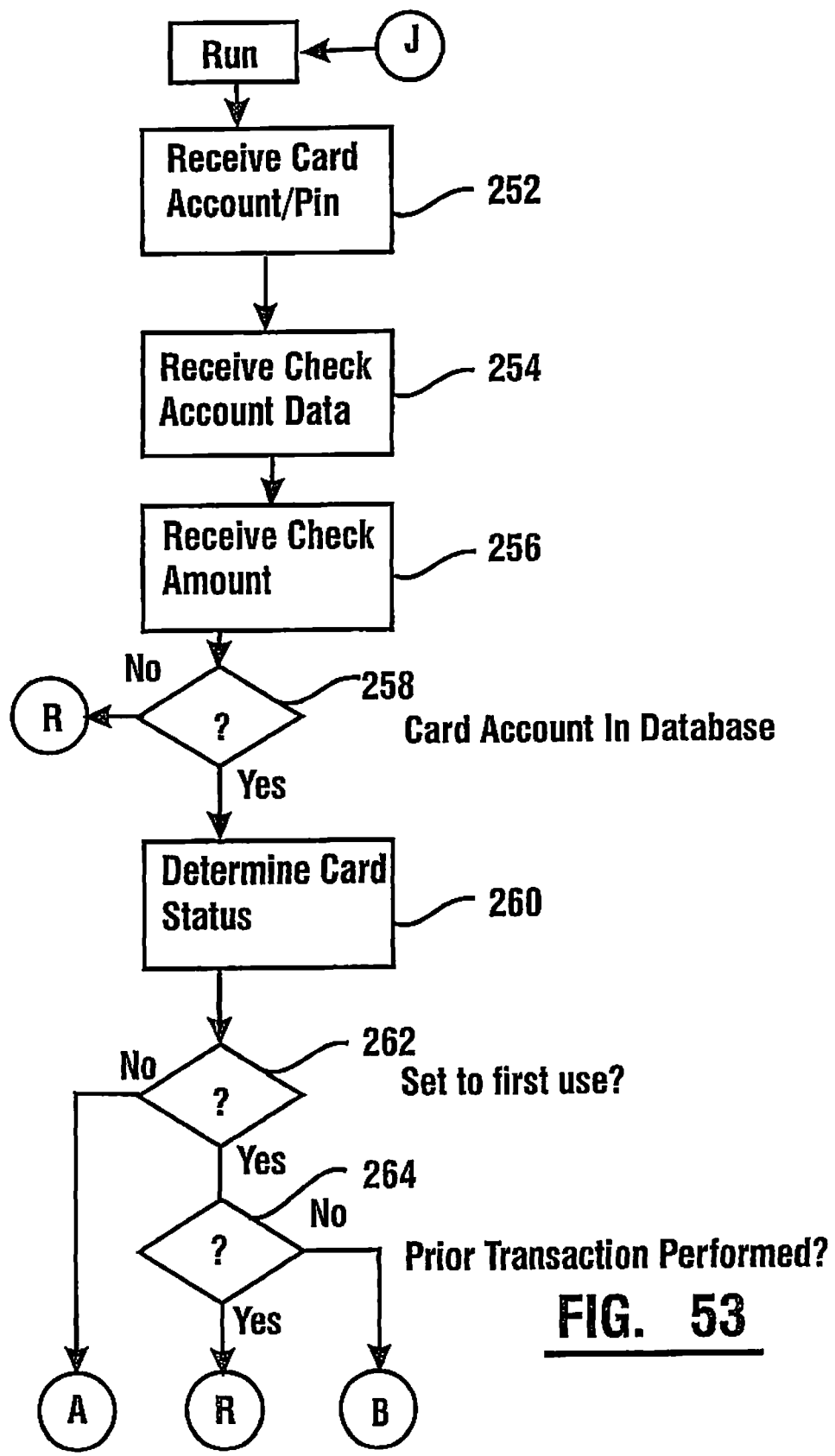
FIGS. 53 through 57 include a schematic representation of the logic flow executed by computers in the exemplary system shown in FIG. 38.
Figure 54:
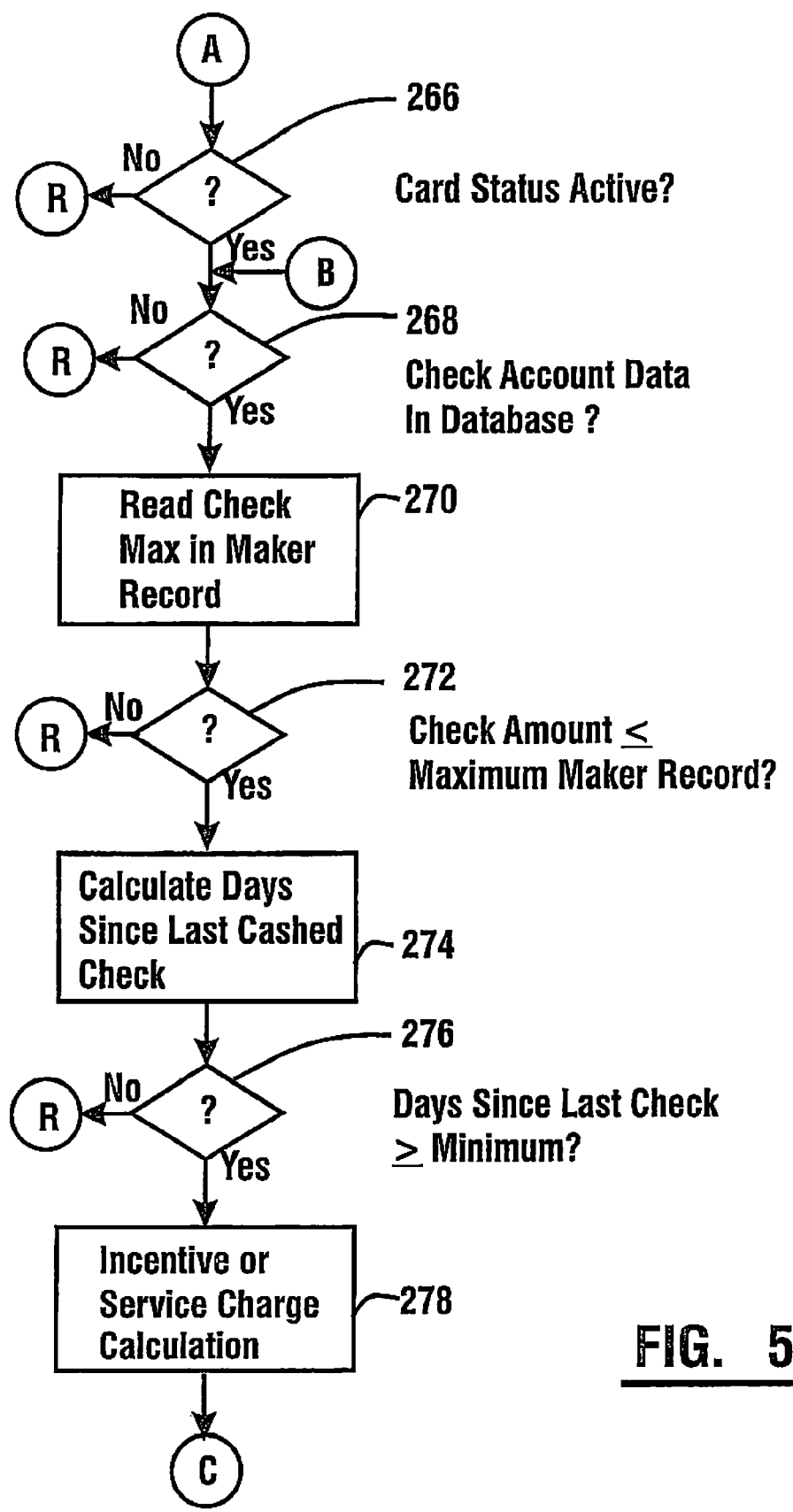
Figure 55:
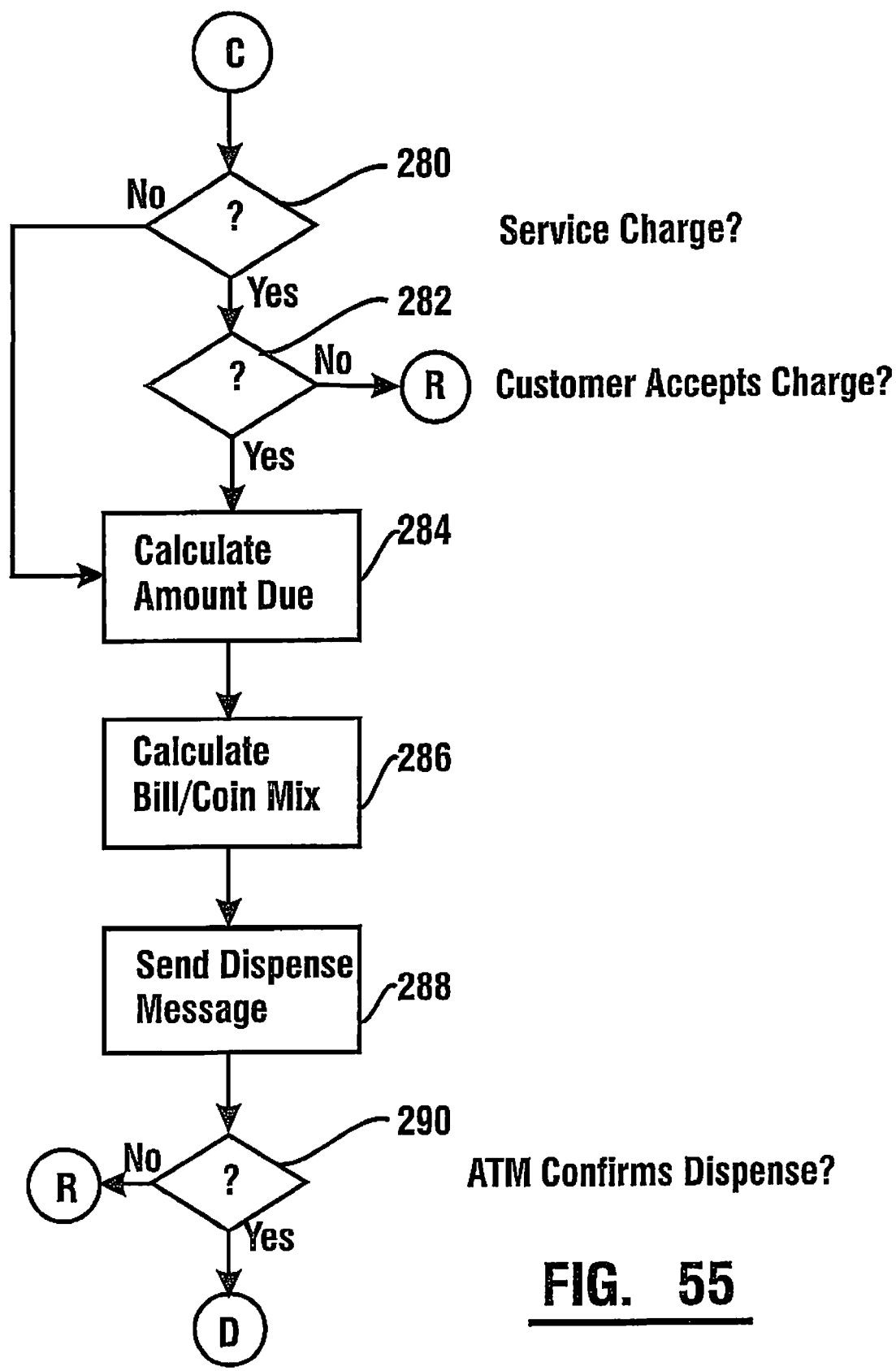

In the exemplary logic shown in FIG. 53, at least one computer in operative connection with the ATM operates to check in a step 258 whether the card data which identifies the user is related in the database. If so, the logic proceeds to a next step 260, where the status of the card based on information in the database is determined. If the card account is not in the database, the computer executes the transaction denial logic shown in FIG. 57, which is later discussed.

After determining the card status in step 260, the system determines if the card status is such that no prior transactions have been conducted with the valid card. This is determined in a step 262. If the system is programmed to allow a first use of valid cards without prior user enrollment, a next step 264 is executed in which it is determined whether a prior transaction has been performed with the particular card. In the exemplary embodiment, if such a prior transaction has been performed with the card, the transaction is rejected. If, however, no prior transaction has been performed, the system moves ahead in the logic flow as indicated.

From step 262, if the card has not been set to a first use but the card nonetheless is a valid card, the system executes a step 266 in which it is determined whether the card status is indicated as active in the database. If not, the transaction is rejected. However, if the card is active, a determination is then made in a step 268 as to whether the data that has been read from the check corresponds to a maker identified in the database as one for whom checks are to be accepted. It will be noted from FIG. 54 that this is also the next step that is executed from step 264 when a first use of a card is allowed without enrollment and no first use has yet been performed.

In step 268 if it is determined that the check is drawn on a maker for whom the system allows the cashing of checks, the system operates to recover information on the maximum check value for which a check will be cashed. This is done in a step 270. Of course, as previously discussed, in some embodiments the system may also include maximum amounts for particular users, and the system may include rules as to which amount controls. In such cases the determination as to the maximum amount of the check that can be accepted may be determined at this point in the logic flow.

After determining the maximum value of a check that may be cashed under the circumstances of the transaction, the system next determines in a step 272 whether the amount of the check being presented is in excess of the maximum permitted amount. This may be done through analysis of image data as described above. If the check amount is greater than the maximum amount permitted, the transaction is rejected. However, if the check is below the maximum, the transaction proceeds.

In a step 274 the system reviews the records related to the particular user and determines the time of the last prior check cashing event by the particular user. The system then calculates the period since the cashing of the last check. In a step 276 the time that has passed since the user's last check cashing transaction is compared to the delay period that is associated with the particular maker of the check that the user is seeking to cash. If the time that has elapsed is beyond the delay period, the transaction proceeds. However if the delay period has not expired the transaction is rejected. In some embodiments, particular users of the system may be entitled to an incentive payment. Such incentive payments may be provided to encourage users to cash their checks through ATMs, or for other reasons. Information about users who are entitled to receive incentives may be included in one or more data stores in the system. Alternatively in some embodiments, particular users may be required to pay a service charge or other fees associated with check cashing transactions. This may depend, for example, on the relationship between the administrator of the system and the particular maker whose checks are to be cashed. As represented in a step 268, one or more computers connected in the system are operative to determine if a particular user is subject to a service charge or is entitled to receive an incentive. In the exemplary embodiment, the system determines if the customer is to be assessed a service charge in a step 280. Thereafter in the exemplary embodiment the ATM that the customer is operating prompts the user to indicate whether they accept the service charge in a step 282. If the user declines to accept the service charge, the transaction is rejected.

If the user accepts the service charge in step 282 or if no service charge is applicable, one or more computers in the exemplary system calculate the amount due to the user in a step 284. This may include in some exemplary embodiments not only the amount of the check but also any incentive payments to which the user may be entitled. After calculating the amount due the user, the system operates to determine the mix of currencies which will be dispensed to the user from the particular ATM. This is represented in a step 286. As previously mentioned, in some exemplary embodiments the system is provided to provide the user with the payment to the exact amount or to an amount which the machine can dispense which is above the exact amount which the user is entitled to receive, provided that the amount dispensed does not exceed a particular limit. Further in exemplary embodiments, one or more computers in the system are operative to determine the mix of bills and coins that will be dispensed to the user. This will be done so as to enable the system to continue to cash checks for as long as possible without the need to replenish the denominations in the ATMs. The message sent from the host may include data corresponding to the number and type of each coin and bill to be dispensed. Alternatively the ATM resident computer may calculate the coin and bill mix. Of course, these approaches are exemplary and in other embodiments other approaches may be used.

In the exemplary embodiment after determining the mix of bills and coins to be dispensed to the user, the host computer sends one or more messages to the ATM being operated by the user, instructing the ATM to dispense currency having a particular value to the user. This is represented in a step 288. In response to these instructions, the ATM is operative to dispense cash value to the user. After dispensing the cash value, the ATM is operative to return a message to the host computer indicating whether or not it was able to accomplish the requested dispense successfully. The system then determines if the dispense was successfully carried out in a step 290. If the dispense could not be successfully carried out, the transaction is rejected.

Figure 56:
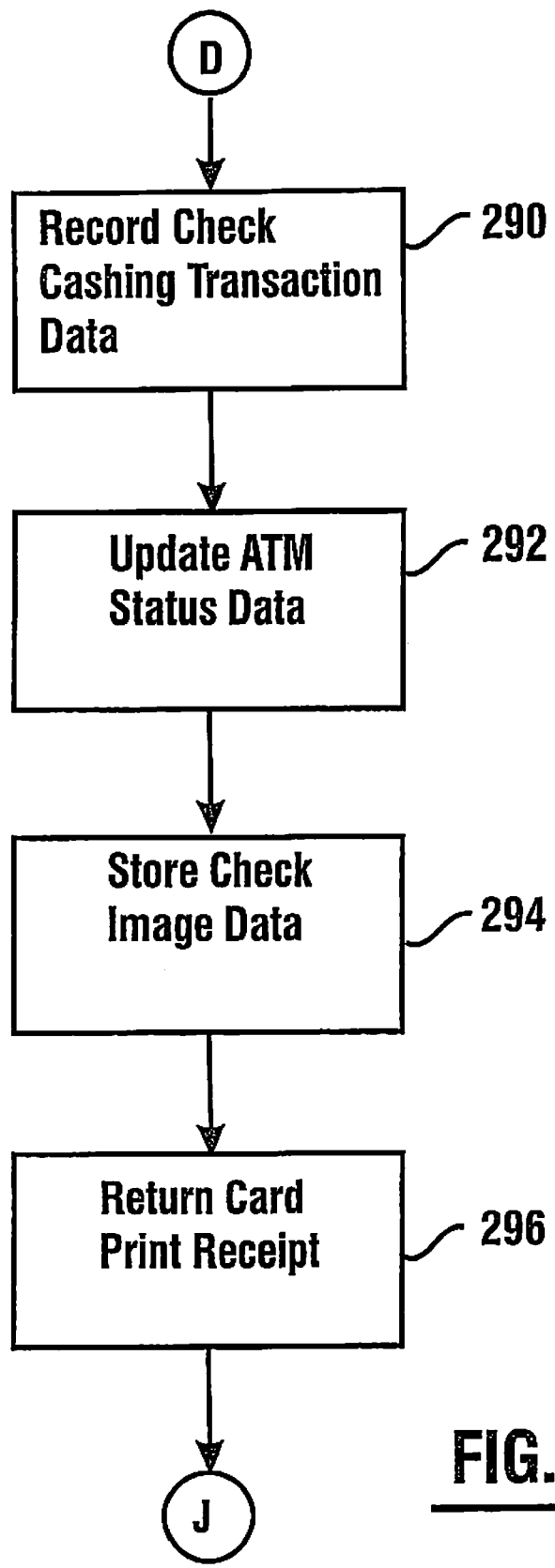

In the exemplary embodiment, if the ATM has successfully dispensed the cash value, one or more computers in the system is thereafter operative to store the information in one or more data stores concerning the check cashing transaction. This is represented in step 290 in FIG. 56. In addition, the ATM status data is also updated, as represented in a step 292. In addition, in exemplary embodiments the ATM may be operative to image the check and to store data representative of the appearance thereof and/or to provide the image data at a point proximate in time or at a later time to a remote computer such as check image server 214 shown in FIG. 38. In addition, the ATM may be operative to conduct printing on the check or to otherwise cancel and/or store the check. This is represented in FIG. 56 by a step 294.

Thereafter, the ATM is operative to close the transaction for the user. This may include, for example, returning the user's card and printing and providing the user with a receipt for the transaction. This is represented in a step 296. Of course in other embodiments additional steps may be taken. Thereafter, as represented in the exemplary transaction flow, the check cashing ATM is ready to conduct another check cashing transaction.

Figure 57:
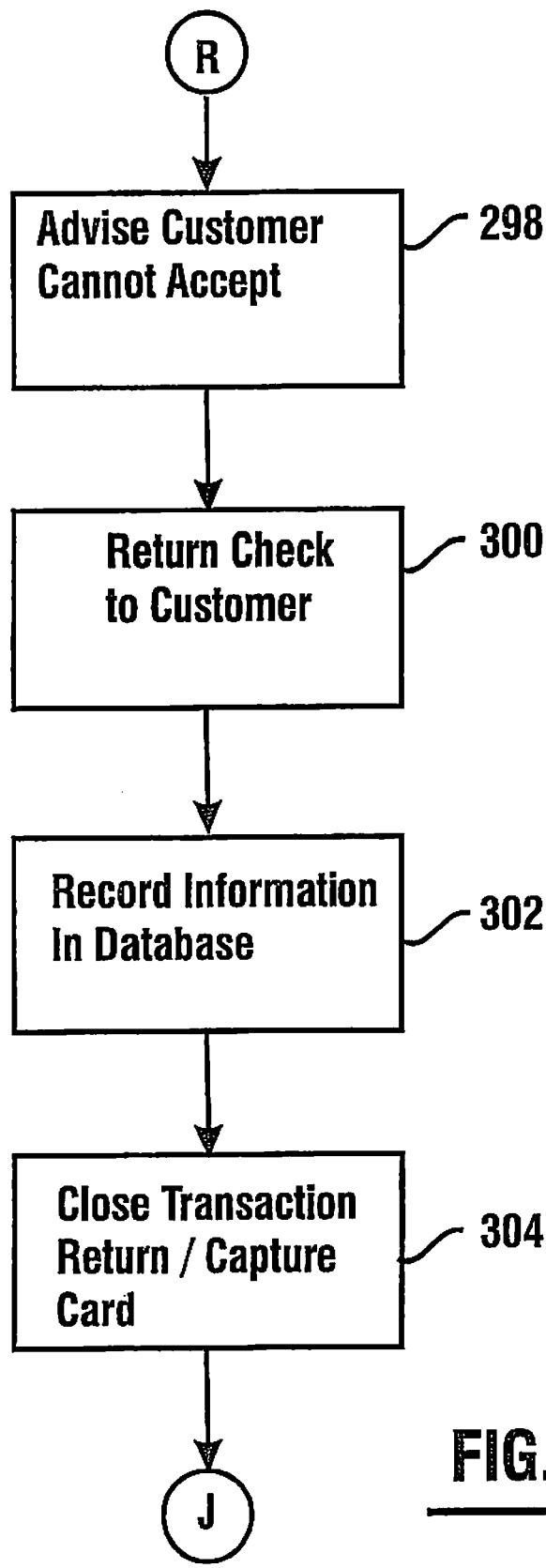

As represented in FIG. 57, if in the exemplary transaction sequence it is determined that the check cashing transaction cannot be conducted, the user is advised through the ATM that the check that they have presented cannot be accepted. This is represented in a step 298. As represented in a step 300, the system then operates to have the check returned to the user by the ATM. It should be understood, however, that in some embodiments where the system determines that the check appears to be fraudulent, the ATM may operate to capture the check to prevent its presentation to other entities.

As represented in a step 302, the exemplary form of the system is operative to record in the database, information concerning the attempted transaction and the reasons for its denial. This is represented in a step 302. Finally, as represented in a step 304, the system operates to close the transaction. Generally this will include returning to the customer their card and indicating reasons through the ATM why the transaction could not be conducted. In some embodiments, however, as previously discussed, if the system determines that it is not appropriate to return the card to the user the card may be retained in the ATM.

It should be understood that the transaction flow shown in FIGS. 53 through 57 is merely exemplary, and other or additional steps may be used. These additional steps may include, without limitation, logic flow associated with determining additional reasons for denying transactions as described in connection with FIGS. 58 through 60. Further in some embodiments additional business logic may be applied in making determinations as to whether the system should cash a particular check.

Figure 61:
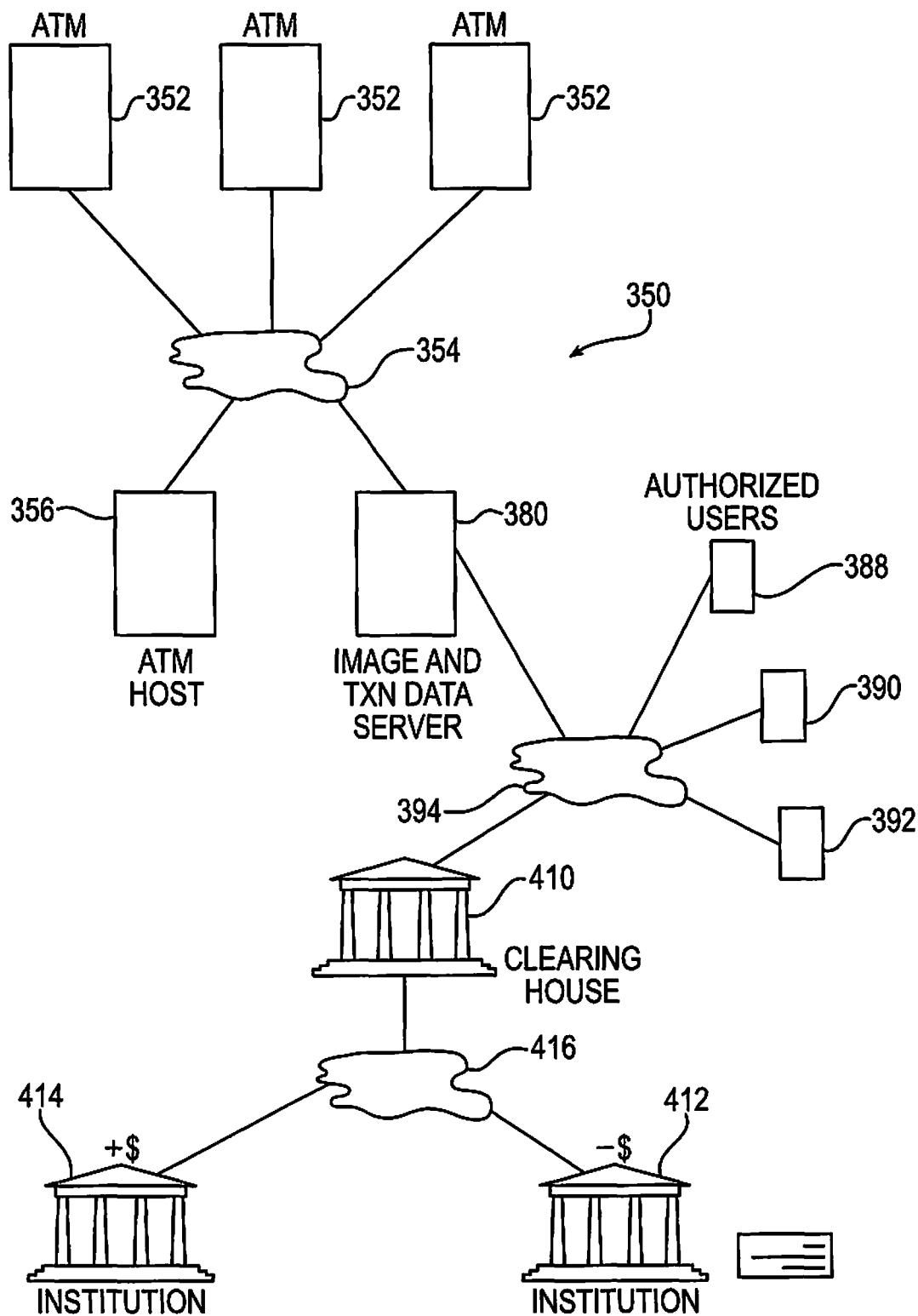
FIG. 61 is a schematic view of an alternative system for processing check transaction data and image data related to checks received through automated banking machines.

An alternative embodiment of a system for cashing checks through ATMs and delivering images of such checks for further processing is represented by a system generally indicated 350 in FIG. 61. System 350 includes a plurality of ATMs 352 which communicate through one or more networks 354 with one or more remote computers represented as an ATM host 356. ATM host 356 communicates with the ATMs to conduct transactions generally in the manner previously described. In the exemplary embodiment the ATM transaction host can communicate with the ATMs 352 for purposes of carrying out a plurality of transactions. These may include cash dispensing transactions that do not involve receipt of a check, deposit accepting transactions which involve receipt of deposit items such as checks, balance inquiries, account transfers and/or other or different transactions depending on the ATM type used and the programming by the operator of the system.

The exemplary system 350 may differ from the systems previously described in that electronic image data corresponding to both the front and the back of each check presented at the machine is delivered remotely from the machine for purposes of further processing. Further processing is facilitated in the exemplary embodiment by the ATM providing image data with transaction identifying data which can be used to facilitate the further processing of the transaction. In the exemplary embodiment the transaction identifying data is provided by the ATM host in the message that the host sends to the ATM authorizing the acceptance of the check. This transaction identifying data may include the information that is needed for further processing of a settlement of the check. In some embodiments this enables the image messages which are delivered by the ATM, to be used to process the check electronically as a substitute for the paper document. This may also avoid the need to recover some additional transaction data from other sources or systems because such data has been associated by the ATM with the image as part of the image message. Of course this approach is exemplary and in other embodiments other approaches may be used.

Figure 62:
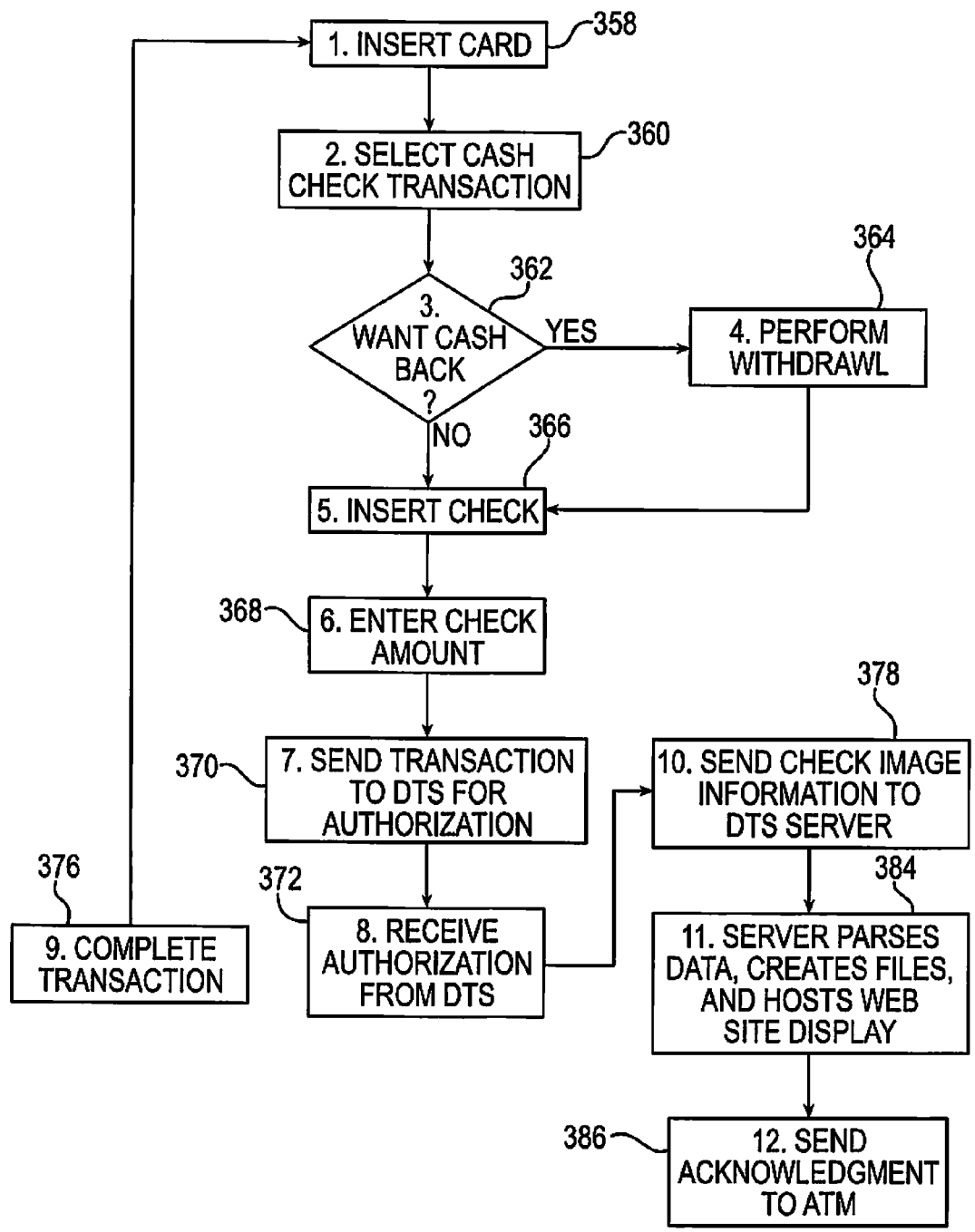
FIG. 62 is a schematic view of the logic flow associated with a check accepting transaction conducted at an exemplary automated banking machine used in connection with the system represented in FIG. 61.

In the exemplary embodiment a check cashing transaction or other transaction including presentation of a check conducted at one of the ATMs 352 proceeds in accordance with the logic schematically represented in FIG. 62. The transaction logic as represented begins at a step 358 in which a user inserts their card. This may include for example a debit card of the user which includes the user's name, primary account number or other user identifying information. In addition it should be understood that although in the schematic representation the user is not indicated as being required to input a PIN or other identifying data such as a biometric input, the input of such data may be required in some embodiments.

After the user has input identifying information to input devices of the user interface of the ATM at which a transaction is being conducted, the logic proceeds to a step 360 in which the user selects a check acceptance transaction. This is generally done in response to outputs through one or more output devices of the ATM such as the display screen. In the exemplary embodiment the option for having checks accepted in the machine is one of several transaction options available to users of the machine.

After the user has selected a check transaction in step 360 the logic flow proceeds to a step 362. In this step the exemplary machine is operative to prompt the user as to whether they wish to receive cash in exchange for the input check or whether they wish to have the value of the check credited to their account. From this step 362 if the user provides one or more inputs to indicate that they wish to receive cash in exchange for the check, the machine executes a step represented in 364 and the terminal processor operates to include in the message an indication that the user is not only seeking to deposit a check but also to make a withdrawal as part of the transaction. In step 364 the terminal processor of the exemplary embodiment is also operative to arrange for the inclusion of appropriate data in messages that are eventually sent to the ATM host so as to indicate the customer's selections.

Once the customer has indicated that they wish to receive cash in exchange for the check or a customer declines to receive such cash and indicates they wish to deposit the amount of the check in their account, the logic next proceeds to a step 366. In step 366 the customer inserts the check into the machine and the check is processed by the IDM in the exemplary embodiment. Of course in other embodiments the check may be received in the ATM by other types of check accepting devices. The check is also imaged by the check imaging device included in the IDM.

In the exemplary embodiment electronic images comprised of image data representing both the front and the rear of the check are produced. In addition in the exemplary embodiment in step 366 the terminal processor is operative to analyze the image data by reading the indicia on the check. This includes analyzing the indicia which corresponds to the micr line and producing the data which corresponds thereto which can be included in an ATM transaction request message. Further in the exemplary embodiment in step 366 the terminal processor is operative to determine an amount associated with the check which can be done in the manner previously discussed such as by using character recognition software to determine the amount of the check based on the courtesy amount, the legal amount or other amounts on the check. Of course these approaches are exemplary and in other embodiments other approaches may be used. In the exemplary embodiment after the check has been inserted in step 366 the terminal processor is operative to prompt the user to input the amount of the check in a step 368. This may serve to assure that the character recognition software has analyzed the amount of the check correctly. As previously discussed, in some embodiments an image of the face of the check may be displayed to the user through an output device on the ATM at the time the request is input so that the user can review the amount as they are providing the input rather than having to remember the exact amount of the check. Of course various approaches may be used.

The transaction logic next proceeds to a step 370 in which a transaction request message is sent to the ATM host 356. This may be done in the manner previously discussed by sending one or more messages to the ATM host. Generally such messages will include an indication of the identity of the customer and/or their account, encrypted verification data such as a PIN number or biometric identifier, an indication of the nature of the transaction that the customer wishes to conduct and the amount involved. Further in the exemplary embodiment the message sent to the ATM host includes data corresponding to the micr line data, the amount of the check and the terminal identifier associated with the ATM at which the customer is conducting the transaction. Of course additional information may also be included in the one or more messages.

In response to receiving the one or more messages in step 370 the ATM host 356 is operative to determine whether the transaction should be permitted and to generate a response message. The response message in the exemplary embodiment generally includes instruction data which is operative to cause devices in the ATM to operate appropriately as determined by the ATM transaction host. This may include for example in the case of a check cashing transaction, accepting the check into a storage area in the machine and if appropriate dispensing cash from the machine to the user. Alternatively the instruction data may include information indicating that the check will not be accepted, and the instruction data may cause the machine to indicate to the customer that the transaction is denied and in appropriate cases the check may be captured by the machine or returned to the customer. The receipt of the response message from the ATM host by the ATM is represented in a step 372.

Figure 63:
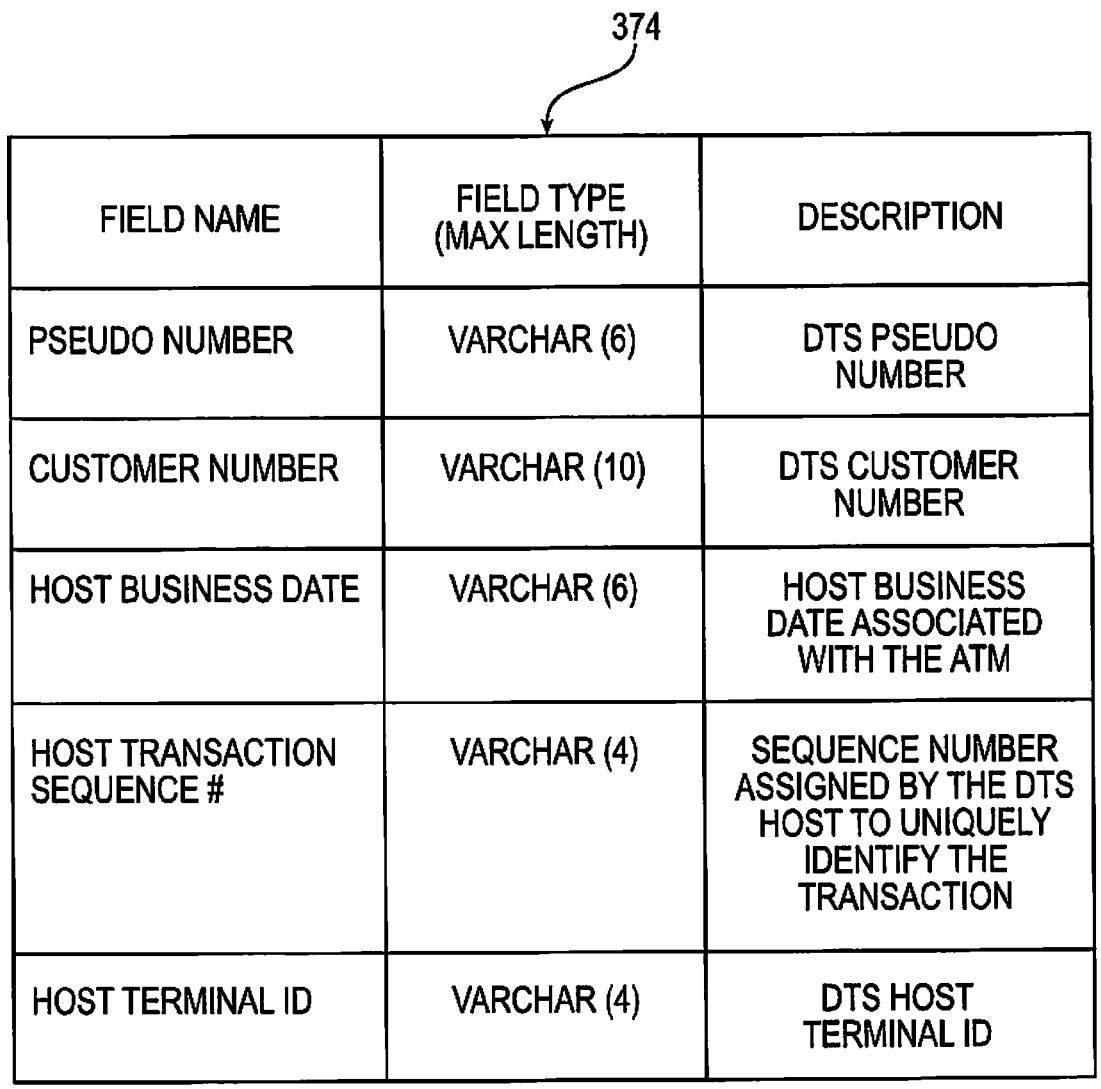
FIG. 63 is a table showing exemplary transaction identifying data associated with check images in an exemplary embodiment.

In the exemplary embodiment the ATM host 356 is operative to include in the responsive message sent to the ATM, transaction identifying data. The transaction identifying data in the exemplary embodiment is represented in the table 374 shown in FIG. 63. The transaction identifying data includes data representative of information that is useful by being correlated with an electronic image of the check for purposes of further processing the check image. In the exemplary embodiment the transaction identifying data includes five fields. Of course in other embodiments greater or lesser amounts or other types of transaction identifying data may be included. In the exemplary embodiment the transaction identifying data includes a pseudo number. The pseudo number in the exemplary embodiment is an identifier which is useable by the operator of the system to identify particular aspects of the transaction. In the exemplary embodiment the pseudo number is representative of the particular entity which is the owner or otherwise responsible for the ATM at which the check is being cashed by the user. The transaction identifying data further includes a field which is a customer number corresponding to the customer of the entity providing the service. In some cases the customer number may correspond to the same entity as the pseudo number in that the customer of the service is the same entity as the entity responsible for the ATM. However, in many situations the customer number is the particular entity that offers the service related to cashing the check but is not the entity who owns the terminal. For example the check cashing terminal may be located at a convenience store and the pseudo number may be associated with the convenience store. The check cashing service may be offered by a particular financial institution such as the bank, credit union, insurance company or other entity that has decided to offer check cashing services. In the exemplary embodiment this entity may be represented by the customer number. Of course this approach is exemplary and in other embodiments other approaches may be used.

The transaction identifying data in the exemplary embodiment includes a host business date. The host business date of the exemplary embodiment includes time and date data at the location of the ATM host and reflects the time at which the transaction request was received. Exemplary transaction data also includes a sequence number. The sequence number is a number assigned by the ATM host to uniquely identify the particular transaction. Of course as can be appreciated, numerical identifiers have a practical limit as to size and in exemplary embodiments sequence identifiers may eventually be reused because the sequence number is associated with other identifying data such as the time and date data.

The exemplary transaction identifying data further includes a terminal identifier associated with the ATM at which the transaction is conducted. As previously mentioned, in the exemplary embodiment the message received by the ATM host from the ATM includes data corresponding to the particular ATM. In the exemplary embodiment this data corresponding to that received from the ATM is sent back to the ATM as part of the transaction identifying data. As can be appreciated additional or other data may be used as transaction identifying data in alternative embodiments. This may include data that was included in the transaction request message received from the ATM. Such data may include information such as the customer, account number data, amount data, certain data from the micr line that identifies the institution on which the account is drawn and/or other data that may be useful in terms of processing the check image or the settlement of the transaction. Of course the transaction identifying data may vary in some embodiments due to the needs of the particular system operator and the system configuration.

It should also be understood that in some embodiments the ATM processor may operate to produce or populate directly some or all of the transaction identifying data. For example in some embodiments information that is included in the transaction request message may be populated in one or more records or files at the ATM and be associated with image data along with data that is received from the host. Alternatively all image associated data may be generated by the ATM based on ATM programming independently of information received from the host. Of course various approaches may be used.

Returning to the discussion of the exemplary logic represented in FIG. 62, it will be assumed that in step 372 the ATM host authorizes the transaction. In response thereto the ATM proceeds to a step 376. In step 376 the ATM terminal processor causes the ATM to operate in accordance with the instruction data. This may include for example cancelling the check and accepting it for storage in the ATM. Alternatively or in addition if the customer has requested to receive cash in exchange for the check the ATM operates in accordance with the instructions included in the message received from the host to cause the cash dispenser in the ATM to operate to dispense to the user an appropriate amount of cash.

Although it is not shown in the exemplary logic flow, in the exemplary embodiment part of the activities conducted as part of step 376 to complete the transaction is for the ATM to indicate back to the ATM host through one or more messages whether the transaction was able to be completed successfully. In the exemplary embodiment the ATM sends one or more messages to the ATM host indicating whether the ATM was able to carry out the transaction successfully responsive to the instruction data. In situations where the ATM is not able to carry out the transaction, appropriate measures are taken by the ATM host and/or the ATM depending on the nature of the failure. This may include for example not crediting the user's account in cases where the check is returned to the user, or crediting a user's account for the check in a case where cash is not dispensed. Of course this is exemplary of many steps that may be taken in response to a malfunction.

In the exemplary embodiment once the ATM has received the transaction identifying data, the ATM is operative to send data corresponding to an electronic image of the front and back of the check as well as the transaction identifying data to a remote computer. The ATM taking this action is represented in a step 378. In the exemplary embodiment the ATM is operative to send an image message including image data comprising the electronic image(s) and transaction identifying data to an image and transaction server represented 380 in FIG. 61. In the exemplary embodiment the image and transaction server 380 is a different computer than the ATM host. Of course in other embodiments other approaches may be used.

In carrying out step 378 the ATM is operative to send to the server 380 an image message including the data represented in table 382 shown in FIG. 64. In the exemplary embodiment the image message sent by the ATM to server 380 includes data corresponding to each of the items of transaction identifying data received by the ATM in step 372. Although in the exemplary embodiment all of the transaction identifying data is part of the image message, in other embodiments only the portions of the data may be included or additional or other forms of data may be included. Further in alternative embodiments the data may be delivered in multiple messages.

In the exemplary image message there is also included data corresponding to the indicia in the micr line of the check. This may include an alphanumeric or other character representation as determined by the character recognition software operating in the ATM, of the indicia included in the micr line portion of the image on the check. Also included in the image message is data representative of the length of the images of the front and back of the check. In addition the exemplary image message includes the image data for the front and the back of the check. In the exemplary embodiment the image data is provided in the message in a bitmap format, and in some embodiments may be provided as a TIFF file. Of course as previously discussed other or additional information may be included in the image message. Further although in the exemplary embodiment the image message is sent as a single message in other embodiments the necessary data may be provided as multiple messages. Further in the exemplary embodiment while it is shown that the image message is dispatched to a single image server, in alternative embodiments messages may be dispatched to multiple servers or different messages may be sent to different remote servers depending on the nature of the processing to be done with regard to the check.

In the exemplary embodiment the ATM is operative to contact the image server which operates to listen for a socket connection from the ATM. The image server operates in response to establishing a socket connection with the ATM to spawn a new image socket thread to handle the check image message and for the transaction identifying data to be received. The exemplary image socket thread operates to parse the image message into its individual fields and to check the parsed fields for appropriate syntax and validity. The exemplary socket thread further creates the directory structure for the transmitted check images and saves the front and back electronic images as part of this process. The image server operates in accordance with this programming to change the front and back images of the check from the bitmap format to a different format. In the exemplary embodiment the image data is converted to a JPEG file which compresses the image data and which may facilitate its use and transmission to other connected computers. Of course this approach is exemplary and in other embodiments other approaches may be used. In addition the server is operative to create a new entry in the database with the fields parsed from the check, which enables the production of tabularized data which can be accessed and utilized in a manner later discussed. The exemplary image socket thread is further operative to acknowledge receipt of the message to the ATM to close the socket connection and to the image socket thread.

The activity by the image and transaction server 380 in processing the data through the image socket thread is represented in a step 384 in FIG. 62. The activity executed by the software which produces the thread in sending an acknowledgment back to the ATM, is also represented in FIG. 62 by a step 386. Of course it should be understood that these processes and steps are exemplary and in other embodiments other approaches may be used.

The image and transaction server 380 of the exemplary embodiment operates to provide authorized users with access to transaction data and images related to check cashing transactions that are conducted at ATMs. This may be done in a manner similar to that previously discussed in connection with the cashing of checks that are drawn on particular accounts. Specifically in some embodiments users that have contracted for processing services are enabled to find information concerning transactions that have been conducted, analyze transactions and conduct other activities as may be appropriate for purposes of managing their business activities and/or the ATMs for which they may be responsible. As represented in FIG. 61 access to data which is resident on the imaging transaction server 380, may be authorized to remote computers operated by authorized users represented 388, 390 and 392. Client computers 388, 390 and 392 are enabled to communicate with imaging transaction server 380 through a network 394. Network 394 may constitute a variety of different types of public or private networks. It should further be understood that in some cases, such as when a public network such as the Internet is used to access server 380, security measures in addition to those specifically discussed herein may be appropriate to assure the privacy and integrity of the data.

Figure 65:
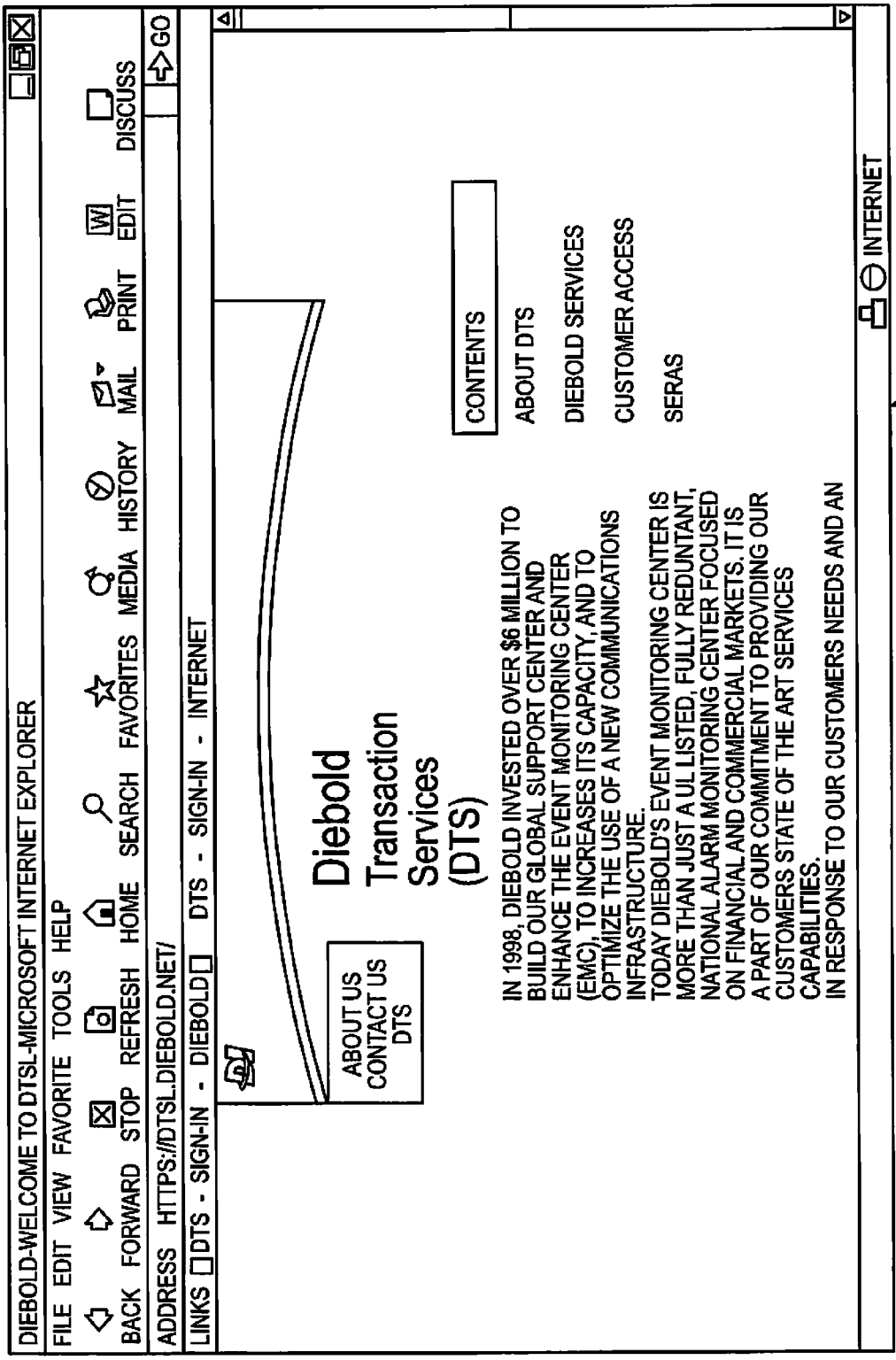
FIG. 65 is an exemplary interface screen presented by an image server to persons who may be seeking to access transaction and image data in an exemplary embodiment.

In the exemplary embodiment of the system 350 the ATM host and image and transaction server are operated by Diebold Transaction Services, Inc. (DTS), a wholly owned subsidiary of the assignee of the present invention. In the exemplary embodiment the DTS services include operating a service bureau environment for driving ATMs and processing transactions for third parties. Authorized individuals at such third parties are enabled to access the data from the server 380. It should be understood that numerous types of data may be processed and presented, and that the nature of the data discussed herein is exemplary the discussion and is generally limited to transaction data associated with check processing transactions. It should be understood that additional types of transactions may be conducted and that other or additional types of data may be accessed and utilized by individuals who require such services. FIG. 65 shows an exemplary output screen 396 of a type which can be accessed by a user at a remote client computer through a network 394. Screen 396 explains information about the entity operating the image server and provides options for users to select.

Figure 66:
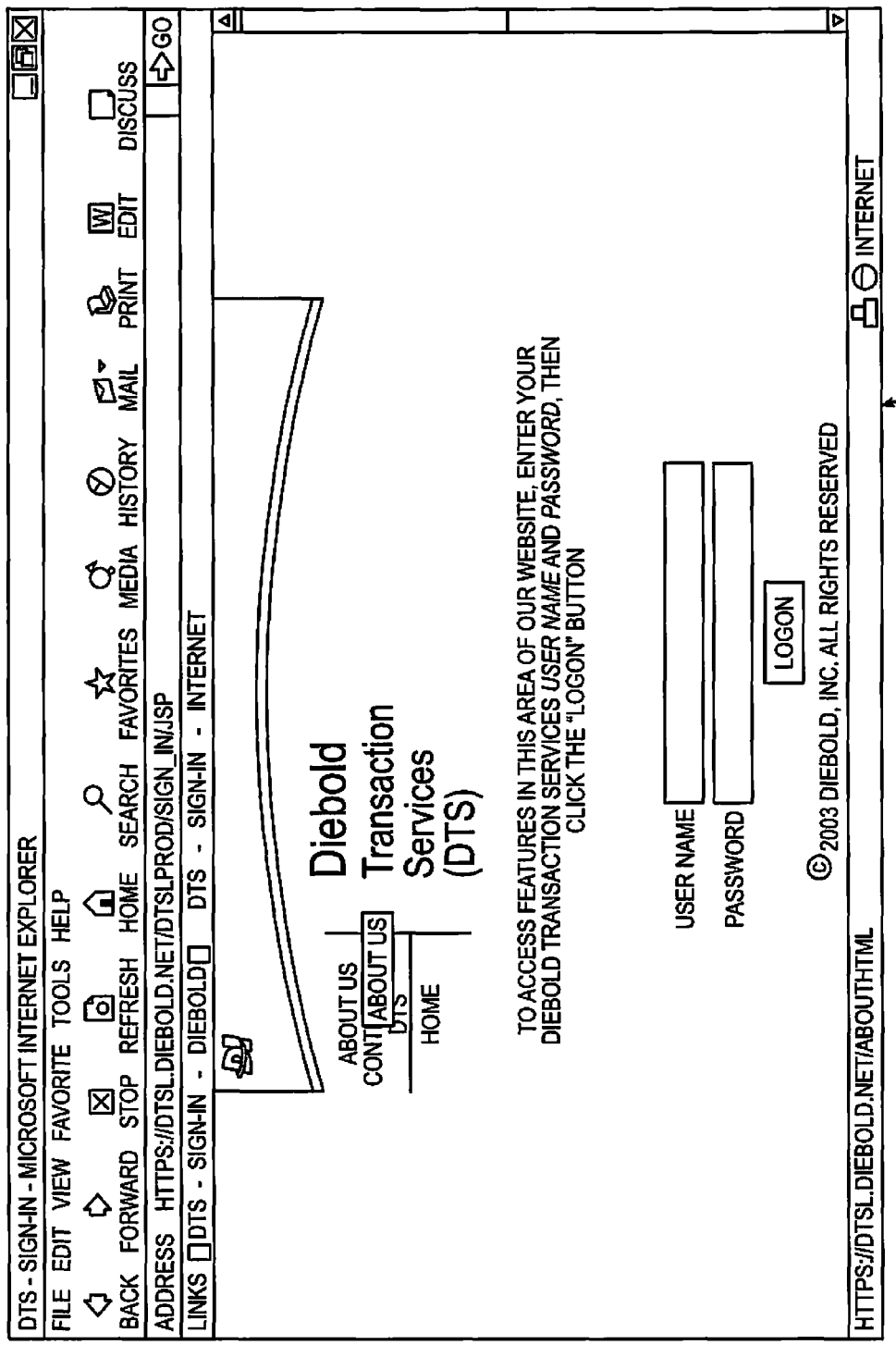
FIG. 66 is an exemplary interface screen presented by the image server to require users to identify themselves as properly authorized to access transaction and image data.

In response to selecting customer access from the screen 396, the image server 380 is operative to present to the user a login screen 398 represented in FIG. 66. Screen 398 requires the user to input name and password information so as to verify that they are an authorized user. Of course this approach is exemplary and as discussed other or additional procedures may be implemented to assure that any authorized persons may review the data.

Figure 67:
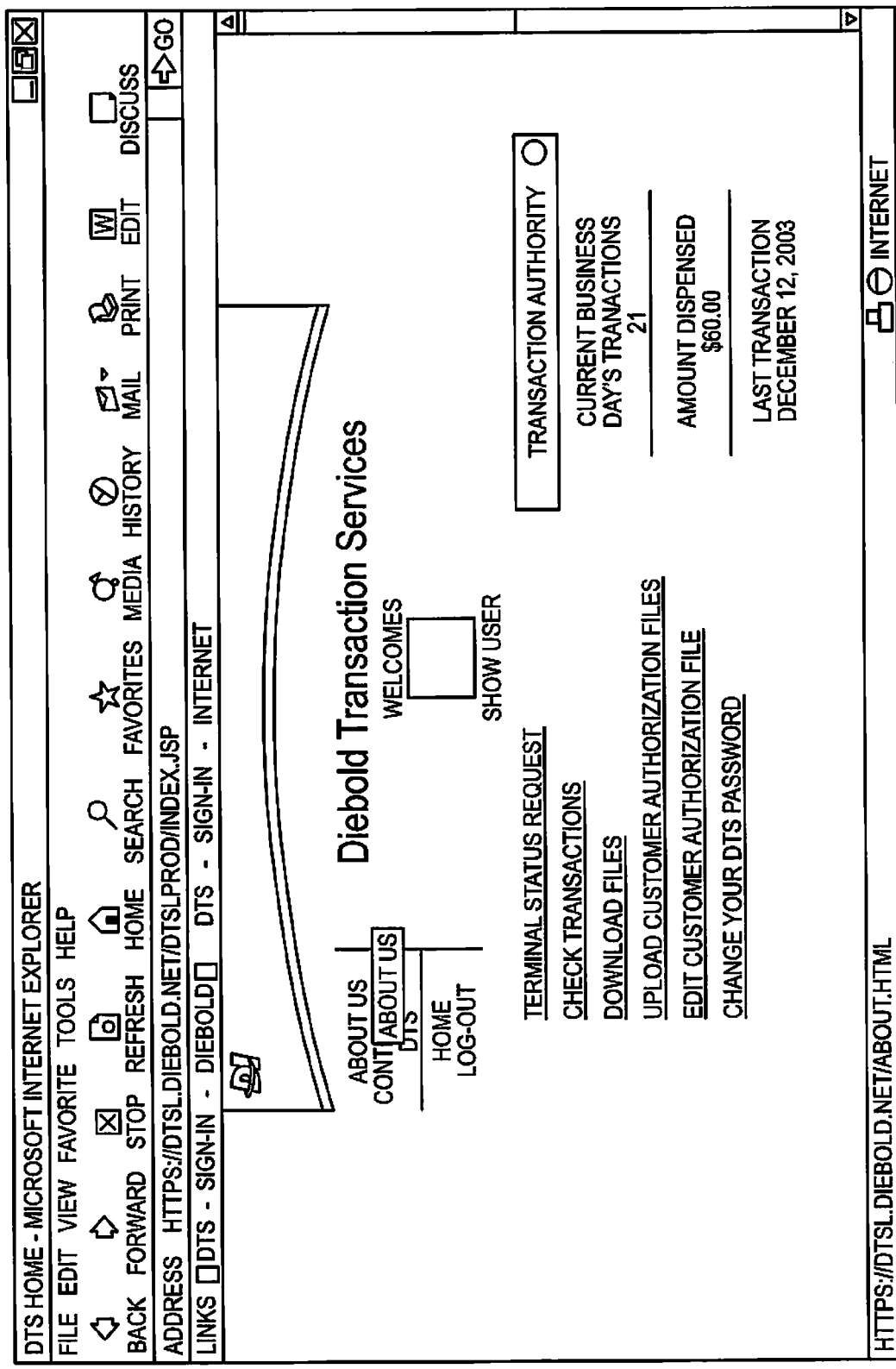
FIG. 67 is an exemplary output from the image server through which a user is enabled to access check transaction and image data.

In response to an input by an authorized user, the image server 380 is operative to present to the user a screen which includes the data which the user is authorized to access. In the case of a user who is authorized to access data regarding check cashing transactions, a screen 400 shown in FIG. 67 is presented. Exemplary screen 400 is operative to display a summary of check cashing transactions associated with the user's institution, to provide the user with a number of selections that may be made in order to obtain information about the transactions as well as to change certain parameters, to update information, to find out information about the status of ATM terminals for which they are responsible, and to conduct other activities. Of course these selections are exemplary and in other embodiments other approaches may be used.

Figure 68:
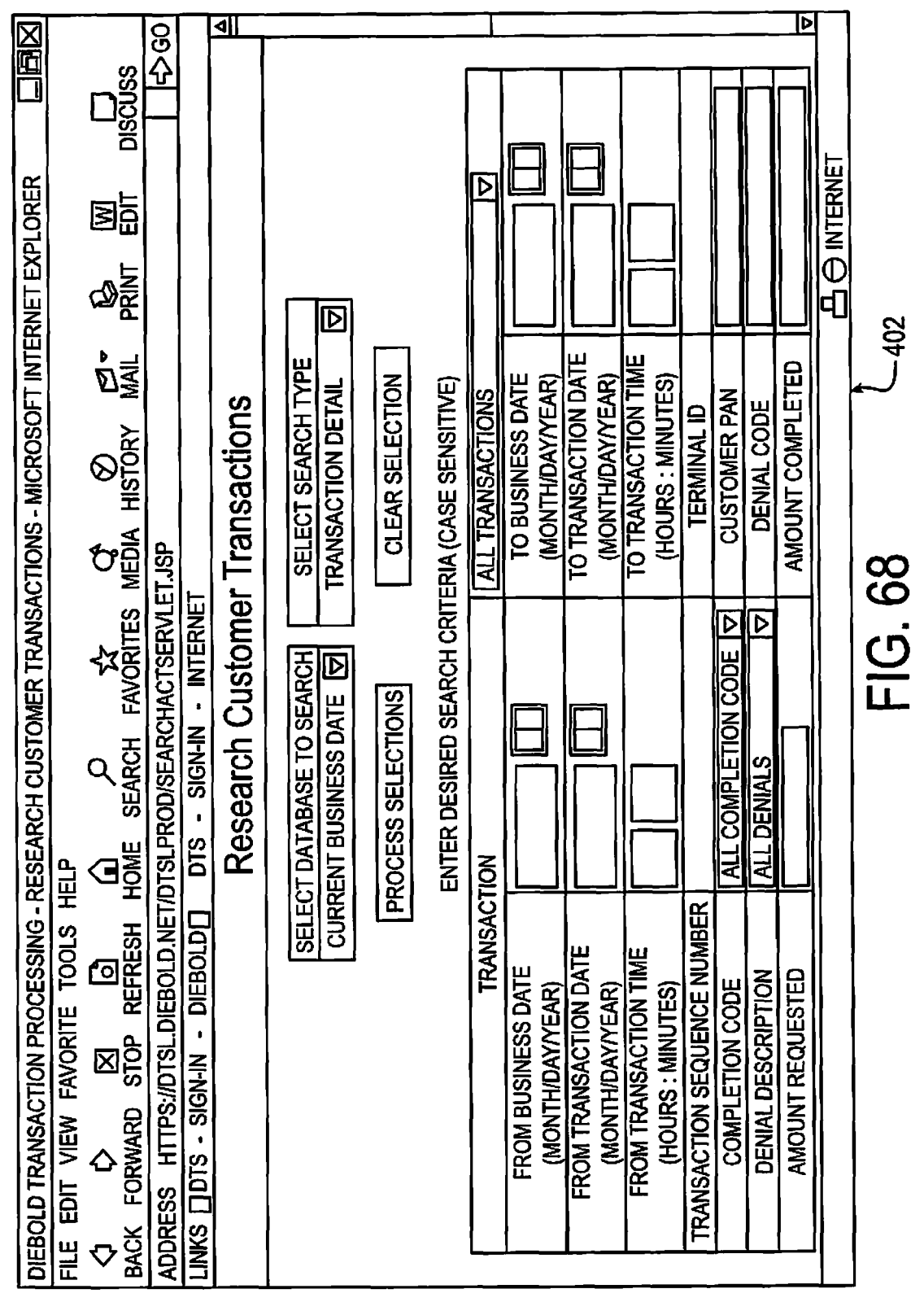

From screen 400 if the customer selects to review transaction information and the imaging transaction server is operative to cause the user to be presented with a screen 402 shown in FIG. 68. Screen 402 is similar to screen 230 previously discussed. Screen 402 enables the customer to sort through transactions and to locate transactions of interest for which data is available on server 380.

Responsive to customer inputs placed in the fields represented in screen 402, server 380 is operative to process data stored in one or more data stores and to provide an output in a tabularized format to the user responsive to the data requested. An exemplary output is table 404 shown in FIG. 69. Table 404 is somewhat similar in format to the table shown in FIG. 43 previously discussed and includes some of the same types of data. In the exemplary embodiment however table 404 also includes icons 406. Icons 406 are associated with the data for transactions in which electronic check images are available through server 380. Icons 406 of the exemplary embodiment comprise a graphic representation of a face of the check. This conveys to the user that a check image for the transaction is available. Of course this approach is exemplary and in other embodiments other approaches may be used.

In the exemplary embodiment an authorized user accessing the tabularized data in table 404 may review check images by selecting the icon 406 associated with a particular transaction. Selecting such an icon for a transaction is operative to cause the server 380 to produce an output including the check image associated with that transaction. This is represented in FIG. 70 by an image 408. Check image 408 in the exemplary embodiment comprises a graphical representation produced on the output device of a client computer showing visual representations of the front and back of the associated check. This enables an authorized user to review the check in conjunction with the transaction data so as to facilitate further processing or other related transaction activities.

As can be appreciated authorized users may wish to download transaction data and check image data for purposes of processing transactions. In some situations authorized users may employ the check image data as a substitute for the paper check for purposes of achieving settlement. For example if the authorized user is the drawer institution which holds the account on which the check is drawn, the drawer institution may operate to archive the check image along with the other transaction data. The drawer institution may utilize the data associated with the check and/or information received through communication with the ATM host, for purposes of making the appropriate debits and credits to the respective accounts. The institution may also make the electronic image of the check available as a substitute for the paper document to the particular entity which is the maker of the check. Of course these activities are exemplary of many that may be conducted.

In addition as represented in FIG. 61, in some embodiments or situations the entity operating the ATM receives checks that are drawn on accounts for which the entity is not responsible. In such cases the checks may need to be processed through a clearing house. Such a clearing house processes the transactions to assure that the institutions are appropriately credited and debited with regard to check transactions. This is represented in FIG. 61 by a clearing house 410. In some exemplary embodiments the data available through the image server which includes the transaction data and the associated check images may be sent pursuant to the direction of an authorized user or automatically to an appropriate clearing house in an electronic format. The data associated with the check images may enable the clearing house to utilize the data to accomplish settlement electronically between the particular institution upon which the check has been drawn, schematically represented 412, and an institution holding the account of the entity to which the check is payable. This is represented by an institution 414. This may be done electronically through communications by the clearing house through one or more networks schematically represented 416.

In addition the clearing house may be operative to forward electronically to the institution upon which the check is drawn, the electronic representation of the check which may serve as an electronic replacement document. The drawer institution in some embodiments may further provide the electronic replacement document comprising the image of the check to its customer either in hard copy or electronic format for purposes of enabling the maker of the check to balance their accounts.

Of course it should be understood that the system represented in FIG. 61 is exemplary and represented schematically. However, it will be appreciated that the exemplary embodiment of the system enables the image of the check to be captured at the ATM and associated with appropriate transaction identifying data which facilitates the further processing of the check. Further in the exemplary embodiment, because the image data is associated by the ATM with the necessary transaction data for processing, the image messages which include such data can be more readily processed and forwarded to the appropriate entities which may utilize them to complete the transactions and to accomplish the necessary settlement functions. In still other embodiments the ATM may operate to produce additional image data to facilitate the processing and settlement of checks. For example it may be desirable in some embodiments for the ATM to produce image data which corresponds to a deposit ticket of the type that would be generated if a user were to deposit a check at a bank branch. Such a virtual electronic deposit ticket can be generated responsive to operation of at least one processor associated with the ATM in accordance with programmed instructions stored in at least one data store. For example in some embodiments the at least one processor may operate to produce image data that includes an account number associated with the particular individual conducting the transaction at the ATM and presenting the checks. The account data may be based on data read from the user's card. Further the deposit ticket may also include the amount of each check that is presented by the particular user during the transaction. In addition in some embodiments the deposit ticket may also include other information including transaction codes or other information that is suitable for routing and settling the check transactions.

In exemplary embodiments when the ATM operates to produce the check data that is sent along with the image data to a remote server for processing, the sent data may also include data corresponding to an image of a deposit ticket that has been produced through operation of the ATM. The deposit ticket may then be processed so as to indicate the account of the ATM user that has presented the particular checks. The data and the account information associated with the user also can be used to identify the check and also to indicate the ATM user's bank so that the bank may be credited for the funds represented by the check for which it has given credit to the ATM user either by crediting their account or by dispensing cash from the ATM. Further, in some embodiments an image of the deposit ticket may also be utilized for record keeping purposes to facilitate the tracking and settlement of the transactions.

Alternatively or in addition one or more processors associated with the ATM may operate to produce electronic image data that corresponds to "cash in" tickets. Such tickets are usable in connection with transactions so as to indicate when amounts or items are received by a financial institution as well as when amounts are paid out. Such a cash in ticket may include, for example, an indication where the user has presented checks in a certain amount, and which amount should be credited by the bank in a way which would provide the user's account with a credit for those checks received. The cash in ticket may also indicate amounts of cash paid out to the user. This may include, for example, amounts dispensed from the ATM. Further in still other embodiments cash in tickets may indicate cash amounts received from a user in an ATM transaction. Such cash received amounts may be applicable in situations where the user has operated a machine with a cash acceptor and where the user has presented cash for deposit into their account. The cash in ticket may provide a reconciliation associated with particular transactions that may be conducted by a user. An electronic representation of such a cash in ticket may also be useful in processing transactions so as to indicate the amounts to be credited to the institution as well as the user.

In some embodiments at least one processor associated with an ATM may operate to produce images which include the data which corresponds to the various value additions and reductions associated with a user's transactions. The electronic image data corresponding to the cash in ticket may also be sent along with electronic file data so as to facilitate the processing and settlement of the user transactions.

In various embodiments the messages which include the check data and images as well as the produced image data corresponding to a deposit ticket and/or a cash in ticket may be sent as image data attached to messages including markup language documents. This may include, for example, XML data and SOAP protocol messages including SOAP message transmission optimization mechanisms to facilitate the sending and analysis of included image data. The use of generated deposit ticket and cash in ticket images along with image data corresponding to checks may particularly facilitate the handling of check transactions by third party processors. Such use is facilitated because the operation of ATMs may present image and other data in a manner similar to that produced in branch banking operations by conforming the ATM transaction processing so it is comparable and includes the same types of documents as branch banking. The processors of the transaction information can avoid using different processes when checks are presented at ATMs. Of course these approaches is exemplary, and in other embodiments other approaches may be used.

Figure 71:
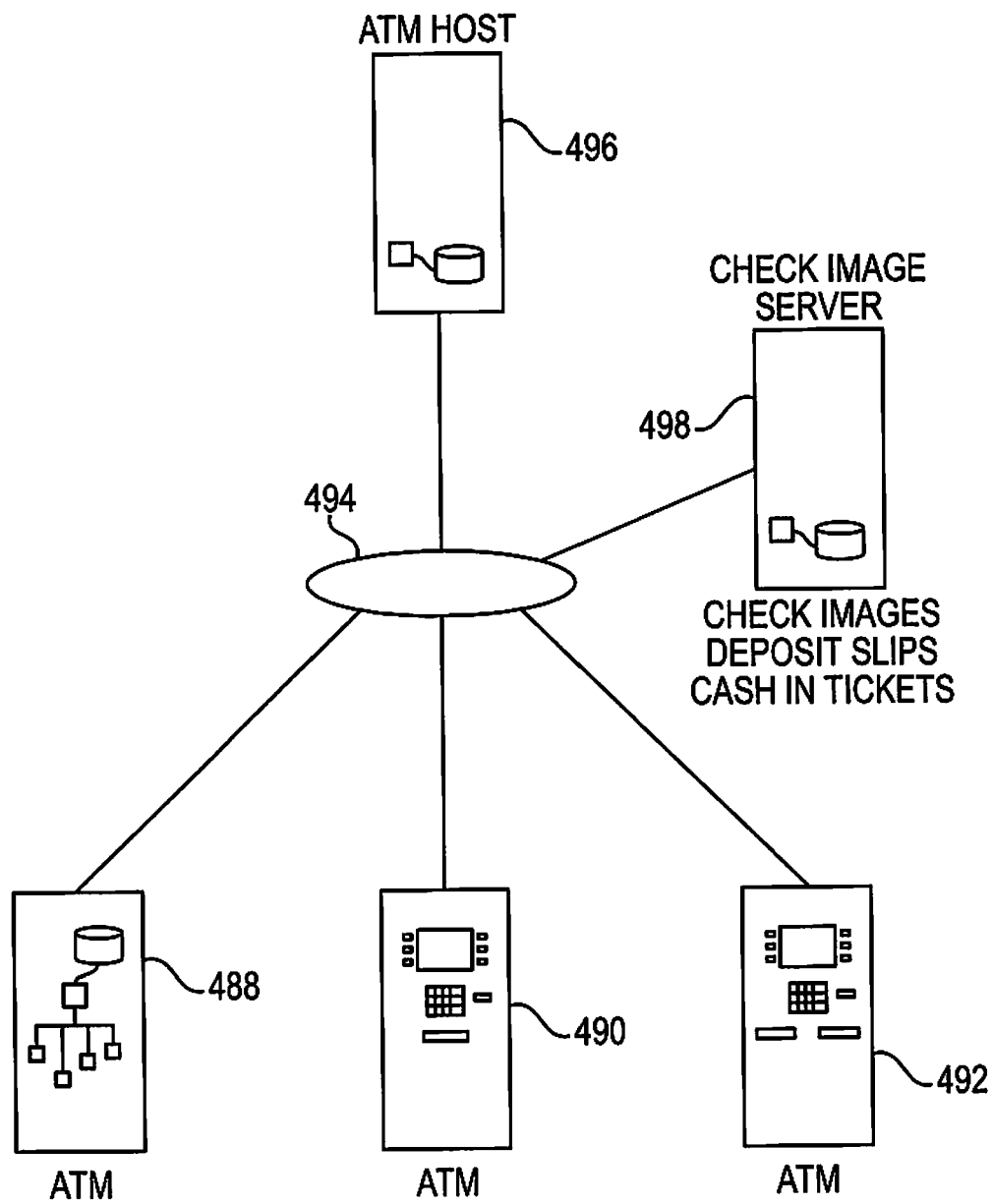
FIG. 71 is the schematic view of an alternative exemplary embodiment of a system in which checks or other instruments are processed.

In still other exemplary embodiments ATMs that are operative to accept checks may have increased reliability by assuring that the ATM remains in connection with both the host ATM and the ATM check image server. This is represented schematically in FIG. 71 in which a plurality of ATMs 488, 490 and 492 are schematically shown. The ATMs communicate through one or more networks 494 with an ATM host computer 496. The ATM host computer may operate in the manner previously discussed to authorize transactions at the various ATMs. The ATMs are also in operative connection with one or more check image servers schematically indicated 498. The check image server is operative to receive check transaction data as well as data corresponding to images of checks, deposit slips and cash in tickets in the manner previously discussed.

In the exemplary embodiment the ATMs communicate with the ATM host during each transaction. This is because as previously discussed, the ATM host is operative to receive transaction requests from the ATMs and to communicate messages to the ATMs to indicate that the transactions are to be carried out. This is true of all transactions including those that do not involve receiving checks. In some exemplary embodiments the ATMs may only communicate with the check image server on a periodic basis so as to deliver check image data and other data from the ATM on a programmed schedule or when the number of checks that have been received by the ATM reaches a particular limit. Thus for example in some embodiments the ATMs may operate to only deliver the check image data to the check image server 498 on a daily basis.

Occasionally due to malfunctions such as a malfunction of the check image server, networks, communication equipment or other conditions, the ATM may not be able to communicate the check image data to the check image server. This may present a problem in that the check image data cannot be reported. Further, because generally the check image data will not be sent from the ATM except at a programmed time, it cannot be known in advance that the communication cannot be successfully accomplished. In order to minimize the risk of being unable to report and deliver check image data, the exemplary system represented in FIG. 71 operates to assure that the ATM can communicate check image data to the check image server when necessary. This is accomplished by programming the check image server to periodically send a message to each ATM. Each ATM has its associated at least one processor programmed to receive such messages and to note the receipt thereof on a periodic basis. If an ATM does not receive the periodic message from the check image server, the ATM operates in accordance with its programming to determine that a malfunction has occurred in its connection to the check image server. In response to resolving an indication of such a malfunction, the ATM operates to send a status message to the ATM host. The ATM host operates to resolve information about the condition and can take appropriate steps. Such appropriate steps may include sending a notification to the operator of the check image server to resolve the condition.

Alternatively in some embodiments the ATM host may operate in response to receiving an indication from an ATM that it cannot communicate with its check image server, to download data to the ATM so as to enable the ATM to communicate with a different check image server. This may include, for example, sending secure messages to the ATM which cause the ATM to change network address data to which the check image messages will be sent. The ATM may then communicate to the server at the alternative network address, which in response to receiving such messages causes periodic communications to then be sent to the ATM so as to assure communication with the alternative server. The exemplary system can operate to assure that the ATM can communicate the check image data when necessary to an appropriate server. Further the ATM can modify the destination of the check image data in the event that there is a malfunction. Further the ATM host can monitor the fact that the ATMs in connection therewith that are capable of receiving checks, are able to report the check image data for processing and are reliable in a consistent manner. Of course these approaches is exemplary, and in other embodiments other approaches may be used.

In still other embodiments the ATMs that operate to receive checks assure the check image data is not lost. This is accomplished in some exemplary embodiments by the ATMs continuing to store the check image data (and in some cases other data) that has been sent for processing after the data has been sent. Thus, for example, even though image data corresponding to the check transactions that were conducted on a given day has been sent to the appropriate server for processing, the ATM may continue to hold the data regarding those checks and/or transactions for a set period of time on the hard drive or other suitable data storage device at the ATM. This data may be stored in an encrypted manner in a file that is separate from the current transaction data that is being accumulated by the ATM to be sent to the check image server. The duration that the data is stored may be determined through the programming of the ATM and may be based on the size of the available storage space.

In the event that check image data is lost from the check processing systems after it has been sent from the ATM, the ATM may serve as a repository for the recovery of such data. This may be accomplished, for example, by the ATM host or the ATM check image server securely communicating with the ATM and requesting the repeat delivery of prior check image transaction and/or image data. This can be done through requesting suitable data ranges or other values that correspond to the stored data. The ATM may then operate in accordance with its programming to recover the data and send the data to the check image server. In this way the need to send personnel to the ATM to recover the physical checks or to locate the physical checks from storage in a storage facility to which they are taken from the ATM, can often be avoided. This may substantially reduce cost and inconvenience in the event there is a malfunction in the check image processing systems. Of course these approaches is exemplary, and in other embodiments other approaches may be used.

In still other embodiments the risk of lost check image data is reduced by including features in each ATM so as to prevent the loss of image and transaction data. This may be done for example by including programs in the ATM so that check image data may be delivered from the ATM to the check image server earlier than might be otherwise contemplated in situations where conditions are occurring which may otherwise cause the check image data to be lost. This may occur, for example, when a servicer is about to take the ATM out of service for purposes of conducting repairs. The activities associated with taking the machine out of service may result in the loss or corruption of data, particularly if the servicer has to change computer components of the ATM such as a hard drive. In order to reduce the risk of any data being lost, the at least one processor associated with the ATM is operative to cause the ATM to deliver check transaction data and images to the check image server whenever steps are being taken by a servicer to take the ATM out of service. Thus for example when the ATM servicer proceeds to provide one or more inputs to request that the machine go into in a service mode, the at least one processor indicates to the servicer that check image data is present. The ATM then automatically operates to deliver that data from the machine to the check image server so that the data is available for processing regardless of the status of the machine. After the check image data is sent, the machine will then go into its normal service mode so as to enable the servicer to conduct the service activities. Thus if the servicer has to conduct an activity that may result in loss of data, such as the replacement of a hard drive or other storage media within the ATM, there is less risk that the check data will be lost. Of course these approaches are exemplary, and in other embodiments other approaches may be used.

Thus the deposit accepting apparatus and system of the exemplary embodiments achieve at least some of the above stated objectives, eliminate difficulties encountered in the use of prior devices and systems, and attain the useful results described herein. In the foregoing description certain terms have been described as exemplary embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the invention is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the invention, the manner in which it is constructed and operated, any of the advantages and useful results attained; the new and useful structures, devices, elements, arrangements, parts, combinations, systems, equipment, operations, methods, processes and relationships are set forth in the appended claims.

The invention claimed is:

1. Apparatus comprising:
an automated banking machine operable to cause financial transfers responsive at least in part to data read from data bearing records, including:
a card reader, wherein the card reader is operative to read card data from user cards, wherein the card data corresponds to financial accounts;
an imaging device, wherein the imaging device is operable to cause check image data to be produced, wherein the check image data corresponds to at least a portion of a visual image of a check received in the machine;
a sheet dispenser, wherein the sheet dispenser is operable to selectively provide paper sheets from the machine;
at least one processor associated with the automated banking machine, wherein the at least one processor is communicatively coupled with the card reader, the imaging device and the sheet dispenser;
wherein the at least one processor is operable to communicate with a first computer remote from the machine and a second computer remote from the machine, wherein the second computer differs from the first computer;
wherein the at least one processor is operable through communication with the first computer to cause a computer determination to be made that the card data read from a user card corresponds to an authorized financial account, and cause responsive at least in part to the determination, one of a group consisting of a financial transfer to the financial account and a financial transfer from the financial account;
wherein the at least one processor is operable through communication with the second computer to cause the check image data to be sent to the second computer;
wherein the at least one processor is operable using the check image data, to determine at least one numerical value included on the check, wherein the at least one processor is operable to cause the at least one numerical value to be sent to the second computer in associated relation with the check image data;
wherein the at least one processor is operable to generate deposit ticket data, wherein the deposit ticket data includes the at least one numerical value and at least a portion of the card data;
wherein the deposit ticket data corresponds to an image of a deposit ticket; and
wherein the at least one processor is operable to cause the deposit ticket data to be sent to the second computer.

2. The apparatus according to claim 1 wherein the at least one processor is operable to cause the check image data to be sent to the second computer responsive at least in part to the determination that the card data corresponds to an authorized financial account.

3. The apparatus according to claim 2 wherein the at least one processor is operable to cause the imaging device to cause check image data to be produced for each of a plurality of checks received by the machine during a single transaction session conducted at the machine in association with the financial account corresponding to the card data, wherein the at least one processor is operable to determine at least one numerical value from the respective check image data corresponding to each of the plurality of checks, wherein the at least one processor is operable to cause at least one numerical value determined for each of the plurality of checks to be included in the deposit ticket data.

4. The apparatus according to claim 3 wherein the at least one numerical value from each check includes at least one of a courtesy amount value, a legal amount value and a Magnetic Ink Character Recognition (MICR) line character value or any combination thereof.

5. The apparatus according to claim 4 wherein the at least one processor is operable to generate cash-in ticket data, and to cause the cash-in ticket data to be sent to the second computer.

6. The apparatus according to claim 5 wherein the cash-in ticket data corresponds to a visual image of a cash-in ticket.

7. The apparatus according to claim 6 wherein the cash-in ticket data includes data corresponding to at least a portion of the card data.

8. The apparatus according to claim 4 wherein the automated banking machine further includes a cash acceptor,
wherein the cash acceptor is operable to receive cash,
wherein the cash acceptor is in operable connection with the at least one processor,
wherein the at least one processor is operable to determine a cash value associated with received cash received through operation of the cash acceptor, and
wherein the at least one processor is operable to include data corresponding to the cash value in the cash-in ticket data.

9. The apparatus according to claim 8 wherein the at least one processor is operable to periodically receive, at least one message from the second computer,
wherein the at least one message is indicative that the second computer is in operable condition to receive check images,
wherein the at least one processor is operable responsive at least in part to non-receipt of the at least one message from the second computer, to cause at least one status message to be sent to the first computer.

10. The apparatus according to claim 9 wherein the at least one processor is operable to receive at least one change message from the first computer subsequent to causing the at least one status message, to be sent to the first computer,
wherein the at least one processor is operable responsive at least in part to receiving the at least one change message to cause check image data to be sent to a further remote computer wherein the further remote computer differs from the first computer and second computer.

11. Apparatus comprising:
an automated banking machine operable to cause financial transfers responsive at least in part from data read from data bearing records, including:
a card reader, wherein the card reader is operable to read card data from user cards, wherein the card data corresponds to financial accounts;
an imaging device, wherein the imaging device is operable to cause check image data to be produced, wherein the check image data corresponds to at least a portion of a visual image of a check received in the machine;
a sheet dispenser, wherein the sheet dispenser is operable to selectively provide paper sheets from the machine;

at least one processor associated with the automated banking machine, wherein the at least one processor is communicatively coupled with the card reader, the imaging device and the sheet dispenser;

wherein the at least one processor is operable to communicate with a first computer remote from the machine and a second computer remote from the machine, wherein the second computer differs from the first computer;

wherein during a transaction session, the at least one processor is operable to: cause card data to be read from a user card, cause a computer determination to be made at least in part through communication with the first computer, that the card data corresponds to a financial account, cause to be produced check image data corresponding to a check received in the machine and scanned through operation of the imaging device;

determine a value associated with the check;

cause responsive at least in part to the determination, at least a portion of the value to be transferred into the financial account, cause at least a portion of the image data and the card data to be sent to the second computer; and wherein the at least one processor is operable to produce deposit ticket data including data corresponding to the value, cause the deposit ticket data to be sent to the second computer.

12. The apparatus according to claim 11 wherein the deposit ticket data includes data corresponding to a processor generated deposit ticket image.

13. The apparatus according to claim 12 wherein the deposit ticket image includes at least a portion of the card data.

14. An apparatus, comprising:

a processor associated with an automated banking machine that includes a data reader operable to obtain user data associated with an account number and an instrument acceptor operable to receive financial instruments;

wherein the processor is operable to cause user data obtained by the data reader during a user session with the automated banking machine to be sent to a transaction authorizing host computer;

wherein the processor is operable to generate an electronic deposit slip that includes an account number associated with the user data obtained by the data reader during the user session, and an amount corresponding to a value of a financial instrument received by the instrument acceptor during the user session; and wherein the processor is operable to cause the electronic deposit slip to be sent to a server that is remotely located from the automated banking machine and the host computer.

15. The apparatus according to claim 14, wherein the instrument acceptor includes a check acceptor that is operable to receive a check during a deposit transaction; and wherein the processor is operable to generate an electronic deposit slip that includes an amount comprising the value of the check received by the check acceptor during the deposit transaction.

16. The apparatus according to claim 14, wherein the at least one instrument acceptor includes a cash acceptor;

wherein the cash acceptor is operable to receive cash during a deposit transaction; and wherein the processor is operable to generate an electronic deposit slip that includes an amount comprising a value of the cash received by the cash acceptor during the deposit transaction.

17. The apparatus according to claim 14, wherein the processor is operable to periodically receive operational status messages when the server is operable to receive electronic deposit slips; and wherein the processor is operable to determine that the server is operable to receive electronic deposit slips responsive at least in part to receipt of an operational status message.

18. The apparatus according to claim 14, wherein the processor is operable to periodically receive operational status messages when the server is operable to receive electronic deposit slips; and wherein the processor is operable to determine that the server is inoperable to receive electronic deposit slips responsive at least in part to failure to receive an operational status message;

wherein the server is associated with a network address;

wherein the processor is operable to cause electronic deposit slips to be sent to the network address while the server is determined to be operable to receive electronic deposit slips;

wherein the processor is operable to cause electronic deposit slips to be sent to an alternative network address associated with an alternate server while the server is determined to be inoperable to receive electronic deposit slips.

19. The computer readable medium according to claim 14, wherein the instructions are operable to:

periodically receive operational status messages when the server is operable to receive electronic deposit slips, wherein the server is associated with a network address; and determine that the server is inoperable to receive electronic deposit slips responsive at least in part to failure to receive an operational status message;

cause electronic deposit slips to be sent to the network address while the server is determined to be operable to receive electronic deposit slips; and cause electronic deposit slips to be sent to an alternative network address associated with an alternate server while the server is determined to be inoperable to receive electronic deposit slips.

20. A non-transitory, tangible computer readable of instructions having instructions encoded thereon for execution by a processor, and when executed operable to:

obtain user data associated with an account number from a data reader associated with an automated banking machine;

cause user data obtained by the data reader during a user session to be sent to a transaction authorizing host computer;

generate an electronic deposit slip that includes an account number associated with the user data obtained by the data reader during the user session, and an amount corresponding to a value of a financial instrument received by an instrument acceptor during the user session; and cause the electronic deposit slip to be sent to a server that is remotely located from the automated banking machine and the host computer.

21. The computer readable medium according to claim 20, wherein the instrument acceptor includes a check acceptor that is operable to receive a check during a deposit transaction; and wherein the instructions are operable to generate an electronic deposit slip that includes an amount comprising the value of the check received by the check acceptor during the deposit transaction.

22. The computer readable medium according to claim 20, wherein the at least one instrument acceptor includes a cash acceptor;
- wherein the cash acceptor is operable to receive cash during a deposit transaction; and
- wherein the instructions are operable to generate an electronic deposit slip that includes an amount comprising a value of the cash received by the cash acceptor during the deposit transaction.

23. The computer readable medium according to claim 20, wherein the instructions are further operable to:
- periodically receive operational status messages when the server is operable to receive electronic deposit slips; and
- determine that the server is operable to receive electronic deposit slips responsive at least in part to receipt of an operational status message.

\* \* \* \* \*